US012676426B2

(12) United States Patent

Ni et al.

(10) Patent No.: US 12,676,426 B2

(45) Date of Patent: Jul. 7, 2026

(54) COMMUNICATION METHOD AND RELATED APPARATUS

(71) Applicant: HUAWEI TECHNOLOGIES CO., LTD., Shenzhen (CN)

(72) Inventors: Rui Ni, Shenzhen (CN); Qian Zhu, Shenzhen (CN); Yi Lv, Shenzhen (CN); Kai Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 768 days.

(21) Appl. No.: 18/073,610

(22) Filed: Dec. 2, 2022

(65) Prior Publication Data

US 2023/0096819 A1 Mar. 30, 2023

Related U.S. Application Data

(63) Continuation of application No. PCT/CN2021/097688, filed on Jun. 1, 2021.

(30) Foreign Application Priority Data

Jun. 3, 2020 (CN) .......................... 202010496943.3

(51) Int. Cl.
    *H04B 7/06* (2006.01)
    *H01Q 21/24* (2006.01)
    *H04L 5/00* (2006.01)

(52) U.S. Cl.
    CPC .......... *H01Q 21/24* (2013.01); *H04L 5/0048* (2013.01)

(58) Field of Classification Search
    None
    See application file for complete search history.

(56) References Cited

U.S. PATENT DOCUMENTS

2016/0127073 A1* 5/2016 Ashrafi ................ H04B 10/516
                                                    398/44
2017/0117626 A1* 4/2017 Sajuyigbe .............. H01Q 1/523
                        (Continued)

FOREIGN PATENT DOCUMENTS

CN          104956604 A      9/2015
CN          111133698 A      5/2020

OTHER PUBLICATIONS

Chinese Office Action issued in corresponding Chinese Application No. 202010496943.3, dated Apr. 6, 2022, pp. 1-11.

*Primary Examiner* — Minh Trang T Nguyen
(74) *Attorney, Agent, or Firm* — HAUPTMAN HAM, LLP

(57) ABSTRACT

A method includes sending a first orbital angular momentum (OAM) reference signal in a first beam direction. The first OAM reference signal is used to determine a second beam direction from the first beam direction. The method also includes receiving first indication information. The first indication information includes information about the second beam direction. The method also includes sending a second OAM reference signal in the second beam direction. The second OAM reference signal is used to determine antenna information and a second channel response of the second OAM reference signal. The method also includes receiving second indication information. The second indication information is determined based on the second channel response and the antenna information. The second indication information is used to determine a transmission manner. The transmission manner includes OAM wave transmission, plane wave transmission, or joint transmission of OAM and a plane wave.

20 Claims, 18 Drawing Sheets

(56) References Cited

U.S. PATENT DOCUMENTS

2018/0123659 A1* 5/2018 Qian ........................ H04B 7/06
2020/0296599 A1* 9/2020 Sasaki .................. H04B 7/0469

* cited by examiner

Waveforms of different OAM modes (1)

(2)

(3)

(4)

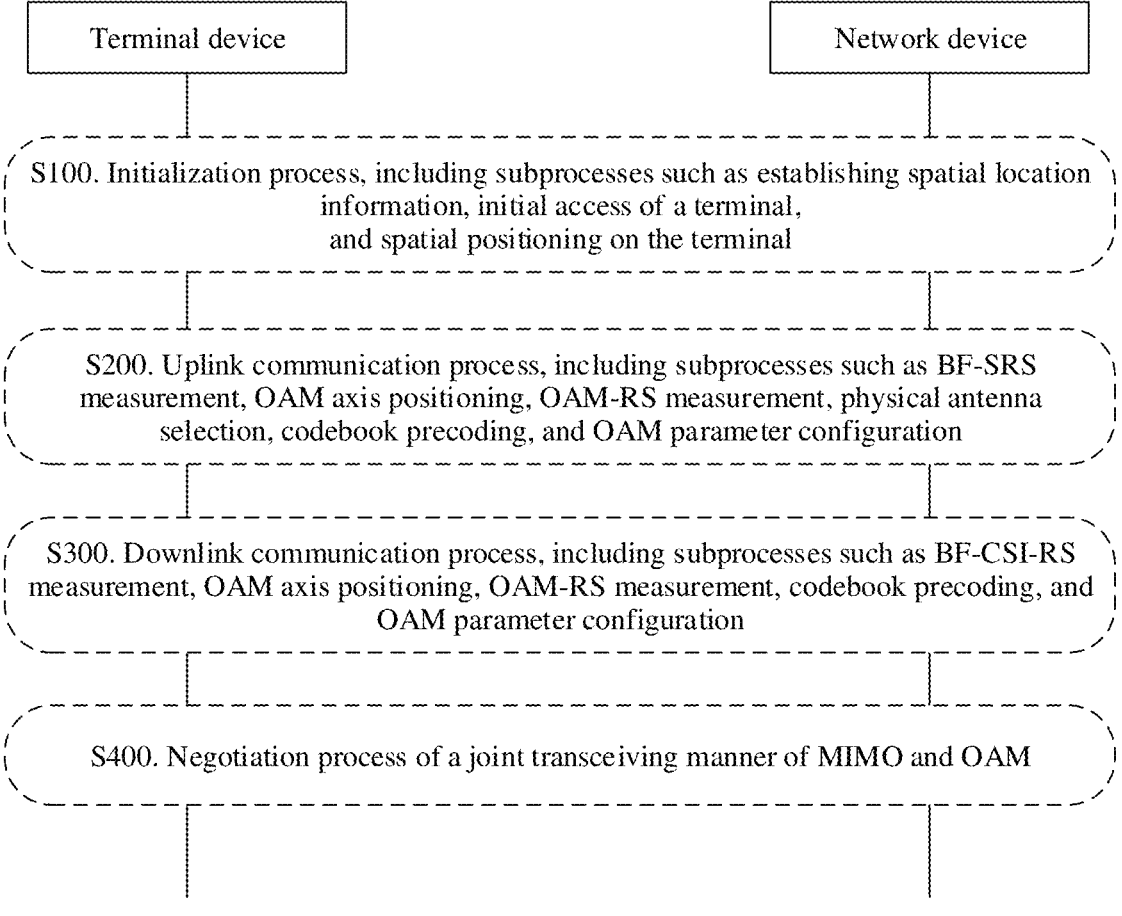

Terminal device                                    Network device

S100. Initialization process, including subprocesses such as establishing spatial location
information, initial access of a terminal,
and spatial positioning on the terminal S200. Uplink communication process, including subprocesses such as BF-SRS
measurement, OAM axis positioning, OAM-RS measurement, physical antenna
selection, codebook precoding, and OAM parameter configuration S300. Downlink communication process, including subprocesses such as BF-CSI-RS
measurement, OAM axis positioning, OAM-RS measurement, codebook precoding, and
OAM parameter configuration S400. Negotiation process of a joint transceiving manner of MIMO and OAM

FIG. 10

1. A mode and power factor module 116 of a transmit end generates, based on a known OMI and a known OPI, a matrix G corresponding to a OAM mode modulation module 112

2. A precoding weight matrix module 115 of the transmit end obtains an equivalent channel response matrix $H2$ of an OAM vortex wave based on known matrices F and G and by listening to an OAM-RS sounding channel 3. The precoding weight matrix module 115 of the transmit end performs a singular value decomposition operation on the equivalent channel matrix H2 to obtain $svd(H2)=U \cdot D \cdot V$, and then enables a precoding codebook to be equal to a conjugate transposed matrix of the right-most matrix V of the equation

FIG. 19

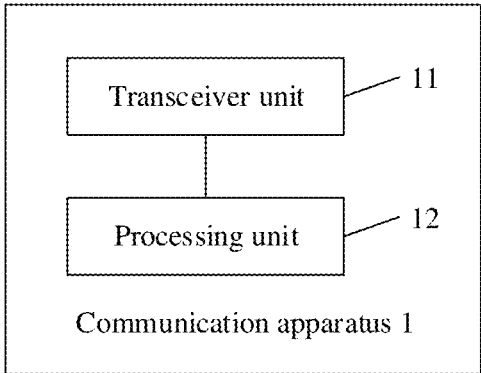

FIG. 20

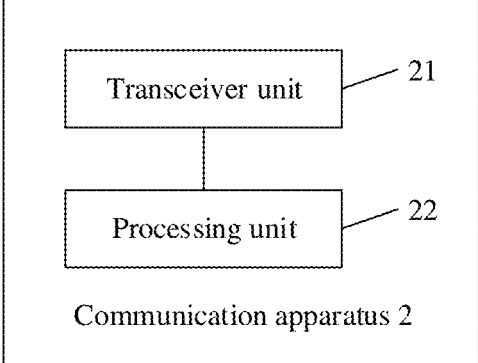

FIG. 21

COMMUNICATION METHOD AND RELATED APPARATUS

CROSS-REFERENCE TO RELATED APPLICATIONS

This application is a continuation of International Application No. PCT/CN2021/097688, filed on Jun. 1, 2021, which claims priority to Chinese Patent Application No. 202010496943.3, filed on Jun. 3, 2020. The disclosures of the aforementioned applications are hereby incorporated by reference in their entireties.

TECHNICAL FIELD

This application relates to the field of communication technologies, and in particular, to a communication method and a related apparatus.

BACKGROUND

Multiple-input multiple-output (multiple input multiple output, MIMO) is a classical method in which a plurality of antennas are deployed at a transmit end and a receive end to use resources in space domain. Generally, in a MIMO algorithm, it is assumed that there are very rich phenomena such as multipath reflection, scattering, and diffraction in a process in which an electromagnetic wave that bears a signal propagates on a radio channel, to ensure that a sufficient quantity of independent and uncorrelated subchannels are generated between antenna element pairs of the transmit end and the receive end.

In an open line-of-sight (line-of-sight, LOS) propagation environment, there is no sufficiently rich phenomenon such as multipath reflection, scattering, or diffraction on the radio channel. For example, in a large shopping mall, a ladder classroom, or a large assembly hall, an extremely large aperture array (extra large aperture array, ELAA) or a reconfigurable intelligent surface (reconfigurable intelligent surface, RIS) is generally a large-scale antenna array hung on a ceiling or a wall of a building. When there is a small quantity of obstacles and space is open, in a process of propagating in space, a plane electromagnetic wave generally propagates from the transmit end to the receive end through direct irradiation and/or a small amount of ground reflection, that is, the plane electromagnetic wave received by the receive end is generally a composite wave of a direct wave and a small amount of wave reflected from the ground. Therefore, in the open LOS propagation environment, a channel response difference between two antenna elements closely adjacent to in space based on the plane electromagnetic wave is very small, and it is difficult to generate a plurality of independent and uncorrelated subchannels that are suitable for the MIMO algorithm. In other words, a rank of a channel matrix generated in communication between the ELAA (and/or the RIS) and a terminal in the open LOS propagation environment is small, and a spatial degree of freedom of the radio channel cannot be fully used. Consequently, actually achieved spectral efficiency is lower than theoretically optimal spectral efficiency.

Currently, in an LOS-MIMO technology, a transmit end divides a to-be-sent data signal into a plurality of data streams, and maps, through space-time mapping, the plurality of data streams to a plurality of antennas for sending. A receive end performs space-time decoding on a signal received on each antenna, that is, generates a signal phase difference by using a path difference that is of each signal and that exists when the signal arrives at the antenna of the receive end, to implement interference channel cancellation and data signal composition, so as to improve a signal gain and a channel capacity. However, a spacing between adjacent antenna elements of the transmit end or the receive end in the LOS-MIMO technology needs to meet a Rayleigh distance $d_{optimal}=\sqrt{(D \times c)/2f}$ (where d represents a spacing between antenna elements, D represents a link distance between the transmit end and the receive and, c represents the speed of light, and f represents a carrier frequency), to implement mutual cancellation between a plurality of signals, and complete transmission of the plurality of signals. Therefore, when a location of a user terminal changes due to movement, the link distance between the transmit end and the receive and also changes, and the spacing between the antenna elements also needs to correspondingly change to maintain interference channel cancellation and data signal composition. However, when a physical antenna array (such as the ELAA or the RIS) is manufactured, delivered from a factory, mounted, and fastened, it is difficult to dynamically adjust the spacing between the antenna elements. Therefore, the LOS-MIMO technology is not applicable to a mobile scenario, that is, when the user terminal moves to different locations, a rank of a channel matrix of LOS-MIMO fluctuates. Consequently, spectral efficiency of LOS-MIMO has a large performance loss.

SUMMARY

Embodiments of this application provide a communication method and a related apparatus. A plurality of times of channel measurement are performed by using a plurality of sounding signals that carry orbital angular momentum (Orbital Angular Momentum, OAM), and whether data of a transmit end is transmitted by using an OAM beam is determined based on channel response features obtained through the plurality of times of channel measurement, so that space-domain independence and uncorrelatedness can be actively constructed at the transmit end based on OAM, without depending on space-domain independence and uncorrelatedness of multipath reflection, scattering, and diffraction generated in a surrounding environment, to increase a rank of a channel matrix in a mobile scenario, and improve spectral efficiency of wireless communication.

The following describes this application from different aspects. It should be understood that implementations and beneficial effects of different aspects below may be mutually referenced.

According to a first aspect, an embodiment of this application provides a communication method, applied to a first communication apparatus. The first communication apparatus may be a terminal device in uplink communication or a first network device in backhaul (backhaul) communication. The communication method includes: The first communication apparatus sends a first OAM reference signal to a second communication apparatus in a first beam direction; the first communication apparatus receives first indication information from the second communication apparatus, where the first indication information includes a second beam direction;

the first communication apparatus sends a second OAM reference signal to the second communication apparatus in the specified second beam direction; and the first communication apparatus receives second indication information from the second communication apparatus, where the second indication information includes OAM matrix indicator information and OAM power indicator information, and the second indication information is used to determine that a transmission manner is OAM transmission, plane wave transmission, or joint transmission of OAM and a plane wave. The second communication apparatus is a network device in uplink communication or a second network device in backhaul communication.

The first OAM reference signal is borne on a first beam. The first beam is a composite beam of a circularly polarized beam and an OAM beam. The first OAM reference signal may be used to determine a first spatial location of a propagation axis of the first OAM reference signal. The first spatial location is used to determine the second beam direction from the first beam direction. The second OAM reference signal is borne on a second beam. The second beam is a composite beam of a linearly polarized beam and an OAM beam. The second OAM reference signal is used to determine antenna information and a second channel response of the second OAM reference signal. The second channel response and the antenna information are used to determine the second indication information.

Optionally, the transmission manner may alternatively mean a joint transceiving manner of MIMO and OAM, for example, MIMO sending and MIMO receiving, OAM sending and OAM receiving, OAM sending and joint receiving of MIMO+OAM, MIMO sending and joint receiving of MIMO+OAM, and joint sending of MIMO+OAM and joint receiving of MIMO+OAM.

With reference to the first aspect, in a possible design, before the first communication apparatus sends the first OAM reference signal to the second communication apparatus in the first beam direction, the method further includes: The first communication apparatus may send, to the second communication apparatus in a plurality of beam directions, a plurality of sounding reference signals that do not carry OAM; and the first communication apparatus receives third indication information from the second communication apparatus, where the third indication information includes the first beam direction and a circular polarization direction.

The plurality of beam directions are different, one sounding reference signal corresponds to one beam direction, the sounding reference signal is used to determine a first channel response of the sounding reference signal, and the first channel response is used to determine the first beam direction from the plurality of beam directions. A circular polarization direction of the foregoing circularly polarized beam is the circular polarization direction indicated by the third indication information.

In this solution, a plurality of times of channel measurement are performed by using a plurality of sounding signals that carry and do not carry OAM, a location of an OAM propagation axis is estimated by using a sounding signal that carries circularly polarized OAM, and a beam direction is selected. Then, a joint transceiving combination manner of MIMO and OAM is selected based on a channel response feature of the sounding signal. Finally, an OAM mode and a power factor are negotiated and configured by using control signaling exchanged between a transmit end and a receive end. Therefore, space-domain independence and uncorrelatedness can be actively constructed at the transmit end based on OAM, without depending on space-domain independence and uncorrelatedness of multipath reflection, scattering, and diffraction generated in a surrounding environment, to increase a rank of a channel matrix in a mobile scenario, and improve spectral efficiency of wireless communication.

With reference to the first aspect, in a possible design, before the first communication apparatus receives the second indication information from the second communication apparatus, the method further includes: The first communication apparatus receives a joint transceiving request from the second communication apparatus, where the joint transceiving request is used to request to send/receive data in a first transceiving manner; and the first communication apparatus feeds back a joint transceiving response to the second communication apparatus for the joint transceiving request, where the joint transceiving response is used to agree to or refuse to send/receive data in the first transceiving manner.

With reference to the first aspect, in a possible design, after the first communication apparatus feeds back the joint transceiving response to the second communication apparatus for the joint transceiving request, the method further includes: The first communication apparatus receives joint transceiving acknowledgement information from the second communication apparatus, where the joint transceiving acknowledgement information is used to acknowledge the joint transceiving response.

The first transceiving manner may be the foregoing transmission manner, namely, the joint transceiving manner of MIMO and OAM.

In this embodiment of this application, communication modules of the transmit end and the receive end are configured by using a negotiation process of the joint transceiving manner of MIMO and OAM, so that data can be sent/received in different transceiving manners in different radio channel environments, to improve communication quality.

With reference to the first aspect, in a possible design, after the first communication apparatus receives the second indication information from the second communication apparatus, the method further includes: The first communication apparatus may generate a data signal based on the OAM matrix indicator information and the OAM power indicator information that are indicated by the second indication information, and may send the data signal to the second communication apparatus by using a physical uplink shared channel.

With reference to the first aspect, in a possible design, the second indication information further includes rank indicator information and precoding matrix indicator information.

With reference to the first aspect, in a possible design, the OAM power indicator information includes an OAM mode parameter and a power parameter corresponding to each OAM mode in the OAM mode parameter.

According to a second aspect, an embodiment of this application provides a communication method, applied to a second communication apparatus. The second communication apparatus may be a network device in uplink communication or a second network device in backhaul (backhaul) communication. The communication method includes: The second communication apparatus receives a first OAM reference signal in a first beam direction from a first communication apparatus; the second communication apparatus sends first indication information to the first communication apparatus, where the first indication information includes a second beam direction; the second communication apparatus receives a second OAM reference signal in the second beam direction from the first communication apparatus; and the second communication apparatus sends second indication information to the first communication apparatus, where the second indication information includes OAM matrix indicator information and OAM power indicator information, and the second indication information is used to determine that a transmission manner is OAM transmission, plane wave transmission, or joint transmission of OAM and a plane wave. The first communication apparatus is a terminal device in uplink communication or a first network device in backhaul communication.

The first OAM reference signal is borne on a first beam. The first beam is a composite beam of a circularly polarized beam and an OAM beam. The first OAM reference signal may be used to determine a first spatial location of a propagation axis of the first OAM reference signal. The first spatial location is used to determine the second beam direction from the first beam direction. The second OAM reference signal is borne on a second beam. The second beam is a composite beam of a linearly polarized beam and an OAM beam. The second OAM reference signal is used to determine antenna information and a second channel response of the second OAM reference signal. The second channel response and the antenna information are used to determine the second indication information.

Optionally, the transmission manner may alternatively mean a joint transceiving manner of MIMO and OAM, for example, MIMO sending and MIMO receiving, OAM sending and OAM receiving, OAM sending and joint receiving of MIMO+OAM, MIMO sending and joint receiving of MIMO+OAM, and joint sending of MIMO+OAM and joint receiving of MIMO+OAM.

With reference to the second aspect, in a possible design, before the second communication apparatus receives the first OAM reference signal in the first beam direction from the first communication apparatus, the method further includes: The second communication apparatus receives a plurality of sounding reference signals in a plurality of beam directions from the first communication apparatus; and the second communication apparatus sends third indication information to the first communication apparatus, where the third indication information includes the first beam direction and a circular polarization direction.

The plurality of beam directions are different, one sounding reference signal corresponds to one beam direction, the sounding reference signal is used to determine a first channel response of the sounding reference signal, and the first channel response is used to determine the first beam direction from the plurality of beam directions. A circular polarization direction of the foregoing circularly polarized beam is the circular polarization direction indicated by the third indication information.

With reference to the second aspect, in a possible design, before the second communication apparatus sends the second indication information to the first communication apparatus, the method further includes: The second communication apparatus sends a joint transceiving request to the first communication apparatus, where the joint transceiving request is used to request to send/receive data in a first transceiving manner; and the second communication apparatus receives a joint transceiving response from the first communication apparatus, where the joint transceiving response is used to agree to or refuse to send/receive data in the first transceiving manner.

With reference to the second aspect, in a possible design, after the second communication apparatus receives the joint transceiving response from the first communication apparatus, the method further includes: The second communication apparatus sends joint transceiving acknowledgement information to the first communication apparatus, where the joint transceiving acknowledgement information is used to acknowledge the joint transceiving response.

The first transceiving manner may be the foregoing transmission manner, namely, the joint transceiving manner of MIMO and OAM.

With reference to the second aspect, in a possible design, after the second communication apparatus sends the second indication information to the first communication apparatus, the method further includes: The second communication apparatus receives a data signal from the first communication apparatus based on the receive antenna information.

With reference to the second aspect, in a possible design, the second indication information further includes rank indicator information and precoding matrix indicator information.

With reference to the second aspect, in a possible design, the OAM power indicator information includes an OAM mode parameter and a power parameter corresponding to each OAM mode in the OAM mode parameter.

According to a third aspect, an embodiment of this application provides a communication method, applied to a second communication apparatus. The second communication apparatus may be a network device in downlink communication or a second network device in backhaul communication. The communication method includes: The second communication apparatus sends a third OAM reference signal to a first communication apparatus in a third beam direction; and the second communication apparatus receives fourth indication information from the first communication apparatus, where the fourth indication information includes OAM matrix indicator information and OAM power indicator information, and the fourth indication information is used to determine that a transmission manner is OAM transmission, plane wave transmission, or joint transmission of OAM and a plane wave. The first communication apparatus is a terminal device in downlink communication or a first network device in backhaul communication.

The third OAM reference signal is used to determine a third channel response of the third OAM reference signal. The third channel response is used to determine the fourth indication information. The third OAM reference signal is borne on a third beam. The third beam is a composite beam of a linearly polarized beam and an OAM beam.

Optionally, the transmission manner may alternatively mean a joint transceiving manner of MIMO and OAM, for example, MIMO sending and MIMO receiving, OAM sending and OAM receiving, OAM sending and joint receiving of MIMO+OAM, MIMO sending and joint receiving of MIMO+OAM, and joint sending of MIMO+OAM and joint receiving of MIMO+OAM.

With reference to the third aspect, in a possible design, before the second communication apparatus sends the third OAM reference signal to the first communication apparatus in the third beam direction, the method further includes: The second communication apparatus sends a plurality of channel state information-reference signals to the first communication apparatus in a plurality of beam directions; and the second communication apparatus receives fifth indication information from the first communication apparatus, where the fifth indication information includes the third beam direction.

The plurality of beam directions are different, one channel state information-reference signal corresponds to one beam direction, the channel state information-reference signal is used to determine a fourth channel response of the channel state information-reference signal, and the fourth channel response is used to determine the third beam direction from the plurality of beam directions.

With reference to the third aspect, in a possible design, the fifth indication information further includes a layer 1 reference signal received power corresponding to each channel state information-reference signal, and the layer 1 reference signal received power is used to determine a power used by the second communication apparatus when transmitting data.

With reference to the third aspect, in a possible design, before the second communication apparatus receives the fourth indication information from the first communication apparatus, the method further includes: The second communication apparatus receives a joint transceiving request from the first communication apparatus, where the joint transceiving request is used to request to send/receive data in a first transceiving manner; and the second communication apparatus feeds back a joint transceiving response to the first communication apparatus for the joint transceiving request, where the joint transceiving response is used to agree to or refuse to send/receive data in the first transceiving manner.

With reference to the third aspect, in a possible design, after the second communication apparatus feeds back the joint transceiving response to the first communication apparatus for the joint transceiving request, the method further includes: The second communication apparatus receives joint transceiving acknowledgement information from the first communication apparatus, where the joint transceiving acknowledgement information is used to acknowledge the joint transceiving response.

The first transceiving manner may be the foregoing transmission manner, namely, the joint transceiving manner of MIMO and OAM.

With reference to the third aspect, in a possible design, after the second communication apparatus receives the fourth indication information from the first communication apparatus, the method further includes: The second communication apparatus generates a data signal based on the OAM matrix indicator information and the OAM power indicator information that are indicated by the fourth indication information, and sends the data signal to the first communication apparatus by using a physical downlink shared channel.

With reference to the third aspect, in a possible design, the fourth indication information further includes rank indicator information and precoding matrix indicator information.

With reference to the third aspect, in a possible design, the OAM power indicator information includes an OAM mode parameter and a power parameter corresponding to each OAM mode in the OAM mode parameter.

According to a fourth aspect, an embodiment of this application provides a communication method, applied to a first communication apparatus. The first communication apparatus may be a terminal device in downlink communication or a first network device in backhaul communication. The communication method includes: The first communication apparatus receives a third OAM reference signal in a third beam direction from a second communication apparatus; and the first communication apparatus sends fourth indication information to the second communication apparatus, where the fourth indication information includes OAM matrix indicator information and OAM power indicator information, and the fourth indication information is used to determine that a transmission manner is OAM beam transmission, plane wave transmission, or joint transmission of OAM and a plane wave. The second communication apparatus is a network device in downlink communication or a second network device in backhaul communication.

The third OAM reference signal is used to determine a third channel response of the third OAM reference signal. The third channel response is used to determine the fourth indication information. The third OAM reference signal is borne on a third beam. The third beam is a composite beam of a linearly polarized beam and an OAM beam.

Optionally, the transmission manner may alternatively mean a joint transceiving manner of MIMO and OAM, for example, MIMO sending and MIMO receiving, OAM sending and OAM receiving, OAM sending and joint receiving of MIMO+OAM, MIMO sending and joint receiving of MIMO+OAM, and joint sending of MIMO+OAM and joint receiving of MIMO+OAM.

With reference to the fourth aspect, in a possible design, before the first communication apparatus receives the third OAM reference signal in the third beam direction from the second communication apparatus, the method further includes: The first communication apparatus receives a plurality of channel state information-reference signals from the second communication apparatus; and the first communication apparatus sends fifth indication information to the second communication apparatus, where the fifth indication information includes the third beam direction.

The plurality of beam directions are different, one channel state information-reference signal corresponds to one beam direction, the channel state information-reference signal is used to determine a fourth channel response of the channel state information-reference signal, and the fourth channel response is used to determine the third beam direction from a plurality of beam directions.

With reference to the fourth aspect, in a possible design, the fifth indication information further includes a layer 1 reference signal received power corresponding to each channel state information-reference signal, and the layer 1 reference signal received power is used to determine a power used by the second communication apparatus when transmitting data.

With reference to the fourth aspect, in a possible design, before the first communication apparatus sends the fourth indication information to the second communication apparatus, the method further includes: The first communication apparatus sends a joint transceiving request to the second communication apparatus, where the joint transceiving request is used to request to send/receive data in a first transceiving manner; and the first communication apparatus receives a joint transceiving response from the second communication apparatus, where the joint transceiving response is used to agree to or refuse to send/receive data in the first transceiving manner.

With reference to the fourth aspect, in a possible design, after the first communication apparatus receives the joint transceiving response from the second communication apparatus, the method further includes: The first communication apparatus sends joint transceiving acknowledgement information to the second communication apparatus, where the joint transceiving acknowledgement information is used to acknowledge the joint transceiving response.

The first transceiving manner may be the foregoing transmission manner, namely, the joint transceiving manner of MIMO and OAM.

With reference to the fourth aspect, in a possible design, after the first communication apparatus sends the fifth indication information to the second communication apparatus, the method further includes: The first communication apparatus receives a data signal from the second communication apparatus.

With reference to the fourth aspect, in a possible design, the fourth indication information further includes rank indicator information and precoding matrix indicator information.

With reference to the fourth aspect, in a possible design, the OAM power indicator information includes an OAM mode parameter and a power parameter corresponding to each OAM mode in the OAM mode parameter.

According to a fifth aspect, an embodiment of this application provides a communication apparatus. The communication apparatus may be a terminal device or a first network device, or a chip or a circuit disposed in the terminal device or the first network device. The communication apparatus includes units and/or modules configured to perform the communication method provided in the first aspect and/or any one of the possible implementations of the first aspect, and therefore can also implement beneficial effects (or advantages) of the communication method provided in the first aspect.

According to a sixth aspect, an embodiment of this application provides a communication apparatus. The communication apparatus may be a network device or a second network device, or a chip or a circuit disposed in the network device or the second network device. The communication apparatus includes units and/or modules configured to perform the communication method provided in the second aspect and/or any one of the possible implementations of the second aspect, and therefore can also implement beneficial effects (or advantages) of the communication method provided in the second aspect.

According to a seventh aspect, an embodiment of this application provides a communication apparatus. The communication apparatus may be a network device or a second network device, or a chip or a circuit disposed in the network device or the second network device. The communication apparatus includes units and/or modules configured to perform the communication method provided in the third aspect and/or any one of the possible implementations of the third aspect, and therefore can also implement beneficial effects (or advantages) of the communication method provided in the third aspect.

According to an eighth aspect, an embodiment of this application provides a communication apparatus. The communication apparatus may be a terminal device or a first network device, or a chip or a circuit disposed in the terminal device or the first network device. The communication apparatus includes units and/or modules configured to perform the communication method provided in the fourth aspect and/or any one of the possible implementations of the fourth aspect, and therefore can also implement beneficial effects (or advantages) of the communication method provided in the fourth aspect.

According to a ninth aspect, an embodiment of this application provides a first communication apparatus. The first communication apparatus may be a terminal device or a first network device. The first communication apparatus may include a processor, a transceiver, and a memory. The memory is configured to store a computer program. The transceiver is configured to send/receive various signals, information, signaling, or the like. The computer program includes program instructions. When the processor runs the program instructions, the first communication apparatus is enabled to perform the communication method according to any one of the first aspect or the possible implementations of the first aspect. The transceiver may be a radio frequency module in the first communication apparatus, or a combination of a radio frequency module and an antenna, or an input/output interface of a chip or a circuit.

According to a tenth aspect, an embodiment of this application provides a second communication apparatus. The second communication apparatus may be a network device or a second network device. The second communication apparatus may include a processor, a transceiver, and a memory. The memory is configured to store a computer program. The transceiver is configured to send/receive various signals, information, signaling, or the like. The computer program includes program instructions. When the processor runs the program instructions, the second communication apparatus is enabled to perform the communication method according to any one of the second aspect or the possible implementations of the second aspect. The transceiver may be a radio frequency module in the second communication apparatus, or a combination of a radio frequency module and an antenna, or an input/output interface of a chip or a circuit.

According to an eleventh aspect, an embodiment of this application provides another second communication apparatus. The second communication apparatus may be a network device or a second network device. The second communication apparatus may include a processor, a transceiver, and a memory. The memory is configured to store a computer program. The transceiver is configured to send/receive various signals, information, signaling, or the like. The computer program includes program instructions. When the processor runs the program instructions, the second communication apparatus is enabled to perform the communication method according to any one of the third aspect or the possible implementations of the third aspect. The transceiver may be a radio frequency module in the second communication apparatus, or a combination of a radio frequency module and an antenna, or an input/output interface of a chip or a circuit.

According to a twelfth aspect, an embodiment of this application provides another first communication apparatus. The first communication apparatus may be a terminal device or a first network device. The first communication apparatus may include a processor, a transceiver, and a memory. The memory is configured to store a computer program. The transceiver is configured to send/receive various signals, information, signaling, or the like. The computer program includes program instructions. When the processor runs the program instructions, the first communication apparatus is enabled to perform the communication method according to any one of the fourth aspect or the possible implementations of the fourth aspect. The transceiver may be a radio frequency module in the first communication apparatus, or a combination of a radio frequency module and an antenna, or an input/output interface of a chip or a circuit.

According to a thirteenth aspect, an embodiment of this application provides a communication system, including a first communication apparatus and a second communication apparatus. The first communication apparatus is the communication apparatus described in the fifth aspect/the eighth aspect or the ninth aspect/the twelfth aspect. The second communication apparatus is the communication apparatus described in the sixth aspect/the seventh aspect or the tenth aspect/the eleventh aspect.

According to a fourteenth aspect, an embodiment of this application provides a readable storage medium. The readable storage medium stores instructions. When the instructions are run on a computer, the computer is enabled to perform the communication method according to any one of the first aspect or the possible implementations of the first aspect.

According to a fifteenth aspect, an embodiment of this application provides a readable storage medium. The readable storage medium stores instructions. When the instructions are run on a computer, the computer is enabled to perform the communication method according to any one of the second aspect or the possible implementations of the second aspect.

According to a sixteenth aspect, an embodiment of this application provides a readable storage medium. The readable storage medium stores instructions. When the instructions are run on a computer, the computer is enabled to perform the communication method according to any one of the third aspect or the possible implementations of the third aspect.

According to a seventeenth aspect, an embodiment of this application provides a readable storage medium. The readable storage medium stores instructions. When the instructions are run on a computer, the computer is enabled to perform the communication method according to any one of the fourth aspect or the possible implementations of the fourth aspect.

According to an eighteenth aspect, an embodiment of this application provides a program product including instructions. When the program product runs, the communication method according to any one of the first aspect or the possible implementations of the first aspect is performed.

According to a nineteenth aspect, an embodiment of this application provides a program product including instructions. When the program product runs, the communication method according to any one of the second aspect or the possible implementations of the second aspect is performed.

According to a twentieth aspect, an embodiment of this application provides a program product including instructions. When the program product runs, the communication method according to any one of the third aspect or the possible implementations of the third aspect is performed.

According to a twenty-first aspect, an embodiment of this application provides a program product including instructions. When the program product runs, the communication method according to any one of the fourth aspect or the possible implementations of the fourth aspect is performed.

According to a twenty-second aspect, an embodiment of this application provides a chip, including a processor. The processor is configured to read and execute a program stored in a memory, to perform the communication method provided in one or more of the first aspect to the fourth aspect or one or more of any one of the possible implementations of the first aspect, the second aspect, the third aspect, or the fourth aspect. Optionally, the chip further includes a memory, and the memory is connected to the processor by using a circuit or a wire. Further, optionally, the chip further includes a communication interface, and the processor is connected to the communication interface. The communication interface is configured to receive a signal and/or information that need/needs to be processed. The processor obtains the signal and/or the information from the communication interface, processes the signal and/or the information, and outputs a processing result by using the communication interface. The communication interface may be an input/output interface.

Optionally, the processor and the memory may be physically independent units, or the memory and the processor may be integrated together.

In embodiments of this application, space-domain independence and uncorrelatedness can be actively constructed at the transmit end, without depending on space-domain independence and uncorrelatedness of multipath reflection, scattering, and diffraction generated in a surrounding environment, to increase a rank of a channel matrix, and improve spectral efficiency.

BRIEF DESCRIPTION OF DRAWINGS

FIG. 10 is a schematic diagram of a wireless communication process according to an embodiment of this application;

FIG. 19 is a schematic flowchart of a method for selecting a matrix G and a matrix W according to an embodiment of this application;

FIG. 20 is a schematic diagram of a first structure of a communication apparatus according to an embodiment of this application;

FIG. 21 is a schematic diagram of a second structure of a communication apparatus according to an embodiment of this application;

DESCRIPTION OF EMBODIMENTS

The following clearly and completely describes the technical solutions in embodiments of this application with reference to the accompanying drawings in embodiments of this application.

To facilitate understanding of a communication method provided in embodiments of this application, the following briefly describes some terms (nouns) used in the communication method provided in embodiments of this application:

1. Orbital Angular Momentum (Orbital Angular Momentum, OAM) Beam

Figure 1:
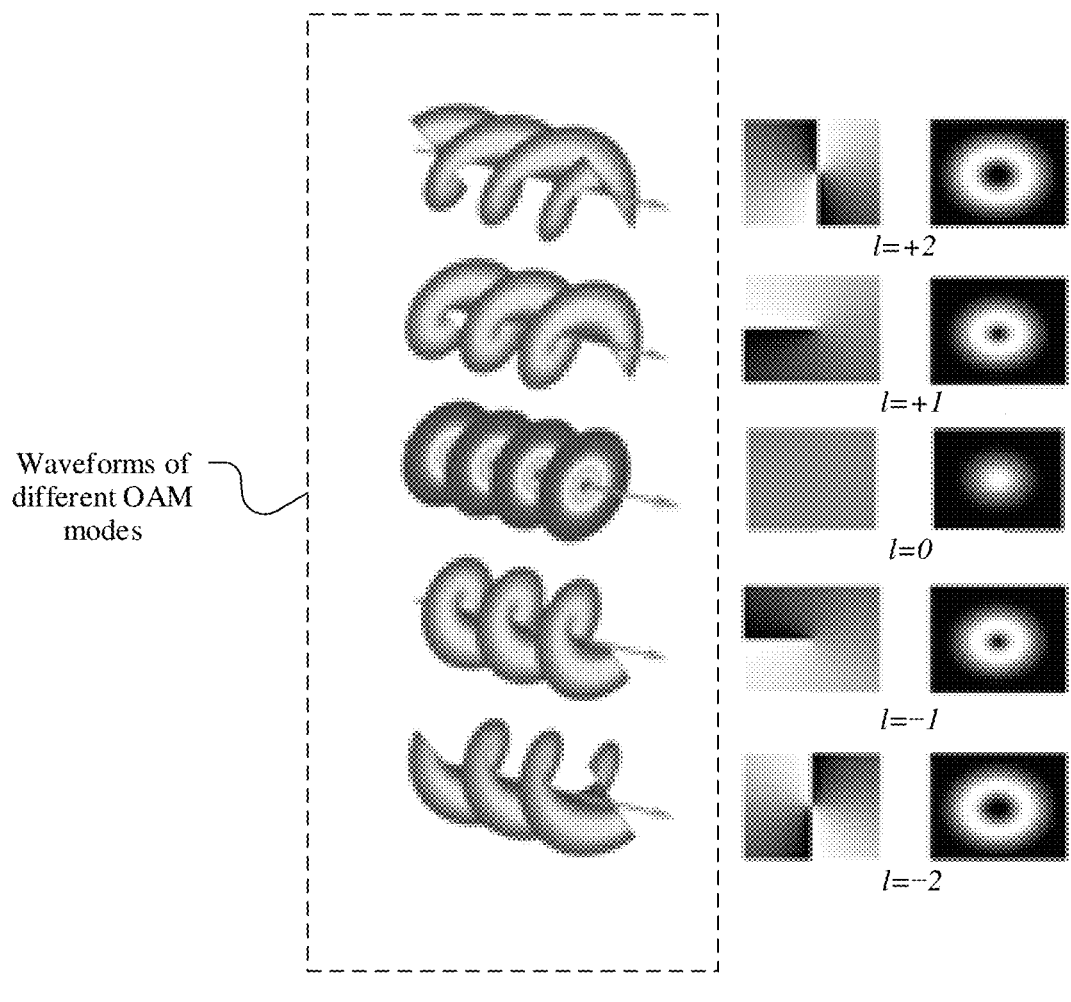
FIG. 1 is a schematic diagram of OAM beams in different OAM modes.

When a light beam contains phase distribution (twisting phase or helical phase) related to an azimuth, the light beam has angular momentum related to phase distribution of the azimuth, and the momentum is referred to as orbital angular momentum OAM. In a wireless OAM technology, a phase distribution function of an electromagnetic wave with a helical phase wavefront and a phase singularity carries a phase factor of $\exp(il\varphi)$, where l is referred to as a mode value or a topological charge quantity of OAM (for ease of description, the mode value or the topological charge quantity of OAM is referred to as an OAM mode below in this application), and may be any integer theoretically, and $\varphi$ is an azimuth. The helical phase causes coherence and cancellation of energy amplitudes, and a beam that carries OAM (for ease of description, the beam that carries OAM is referred to as an OAM beam below in this application) has a center phase singularity, so that ring field strength distribution with zero strength at a center location of the OAM beam is presented. Therefore, the OAM beam is also referred to as a vortex wave. FIG. 1 is a schematic diagram of OAM beams in different OAM modes. As shown in FIG. 1, helical phases of OAM beams in different OAM modes cause coherence and cancellation of energy amplitudes, so that field strength at a center location of the OAM beam is zero, that is, the OAM beam has a center phase singularity.

In a wireless communication system, phase orthogonality between different OAM modes is generally used to implement interference channel cancellation and data signal synthesis, to improve a signal gain and a channel capacity. In a cylindrical coordinate system, a typical OAM beam meets the following Formula (1-1), and phase orthogonality between different OAM modes is shown by the following Formula (1-2):

$$U_l(\rho, \varphi, z) = A J_{|l|}(k_\rho \rho) e^{il\varphi} e^{-ik_z z} \qquad (1\text{-}1)$$

$$\int_0^{2\pi} U_{l1} U_{l2}^* = \begin{cases} 0, & l1 \neq l2 \\ A_1 A_2^*, & l1 = l2 \end{cases} \qquad (1\text{-}2)$$

where $\rho$ represents a radius of a circle of an antenna array of a receive end, tri represents an azimuth of an antenna element of the receive end relative to a center of the circle of the antenna array of the receive end, z represents a distance between a center of a circle of an antenna array of a transmit end and the center of the circle of the antenna array of the receive end, A represents an amplitude constant, $J_x$ (*) represents a Bessel function of the first kind of an order x, $k_\rho$ represents a wave number (wavenumber) in a radial direction of the radius $\rho$, and $k_z$ represents a wave number in an electromagnetic wave propagation direction on the z-axis.

Figure 2:
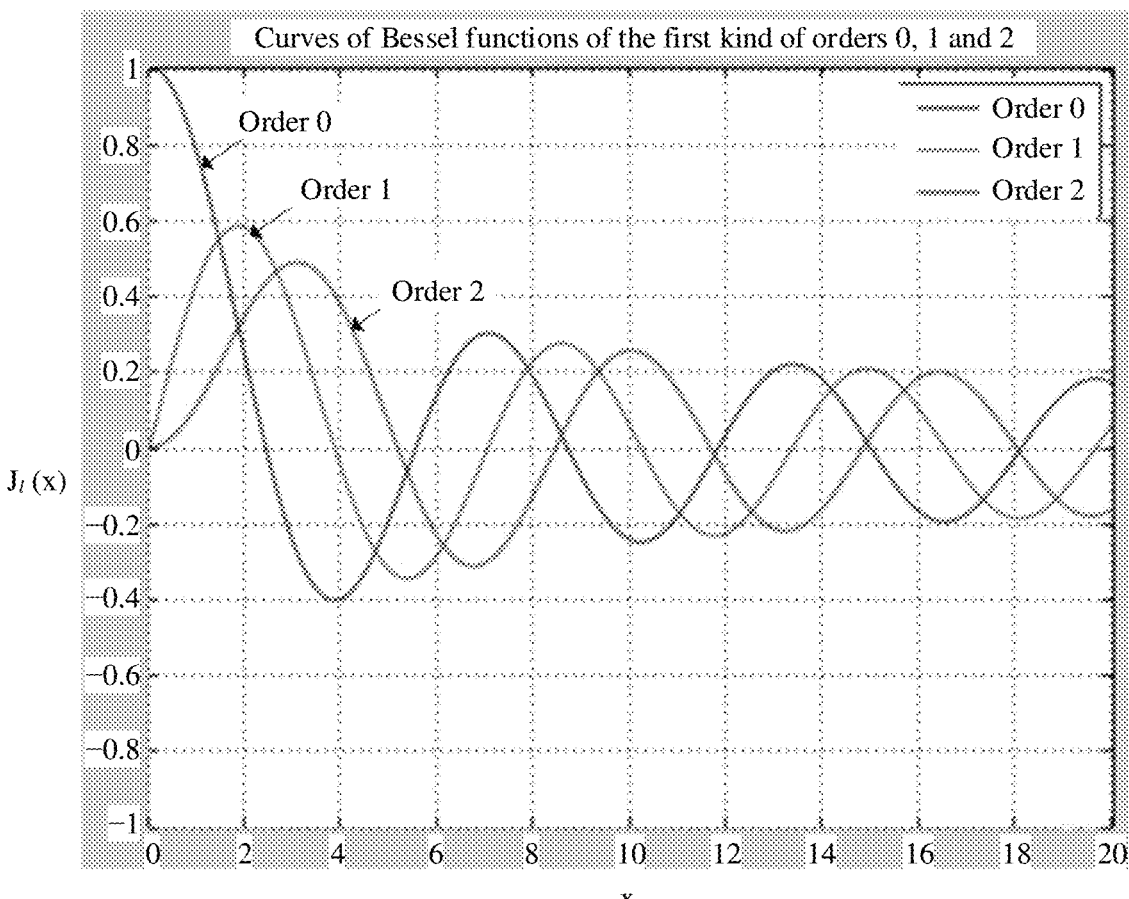
FIG. 2 is a schematic diagram of curves of Bessel functions of the first kind of different orders.

FIG. 2 is a schematic diagram of curves of Bessel functions of the first kind of different orders. As shown in FIG. 2, an amplitude is the largest when a value of a Bessel function of the first kind of an order 0 on the x-axis is equal to 0, an amplitude is the largest when a value of a Bessel function of the first kind of an order 1 on the x-axis is near 2, and an amplitude is the largest when a value of a Bessel function of the first kind of an order 2 on the x-axis is near 3. It may be learned from Formula (1-1) and a waveform feature of the Bessel function of the first kind that, when an absolute value of an OAM mode is 0, an energy amplitude of an OAM beam near a center of a circle is the largest; when an absolute value of an OAM mode is 1, an energy amplitude of an OAM beam near a radius of 2 is the largest; or when an absolute value of an OAM mode is 2, an energy amplitude of an OAM beam near a radius of 3 is the largest. Therefore, energy amplitudes of OAM beams in different OAM modes at different locations vary with a waveform of the Bessel function of the first kind.

2. Angle of Arrival (Angle of Arrive, AoA) Ranging

When a signal passes through an antenna array of a receiver, the antenna array of the receiver receives the transmission signal at different angles and in different directions. There is a phase difference between transmission signals received by all antenna elements. Therefore, an incident angle of the transmission signal may be calculated by using the phase difference, and the incident angle is an angle of arrival AoA of the transmission signal.

AoA ranging is a positioning algorithm based on an angle of arrival of a signal. An antenna of a receive end senses an arrival direction of a signal of a transmit node, calculates a relative direction or angle between the receive node and the transmit node, and then calculates a location of an unknown node by using a triangulation method or in another manner.

Figure 3:
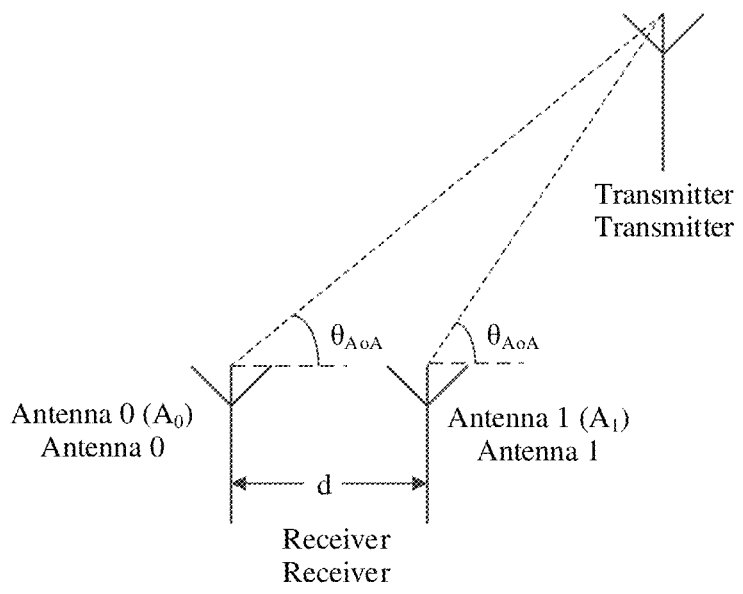
FIG. 3 is a schematic diagram of AoA positioning according to an embodiment of this application.

FIG. 3 is a schematic diagram of AoA positioning according to an embodiment of this application. As shown in FIG. 3, it is assumed that a receiver has two antenna elements $A_0$ and $A_1$ that are at different locations and between which a spacing is d, and angles of arrival are $\theta_{AoA}$. The antenna element $A_1$ is used as a reference antenna, and frequency locking is performed on a received signal $e^{j\omega_c t}$ within a reference period (reference period) of 8 µs, to generate a local oscillator signal $e^{j\omega_c t}$ that is coherent with the received signal. Because a signal arriving at the antenna element $A_0$ is $\Delta t$ later than a signal arriving at the antenna element $A_1$, a signal received by the antenna element $A_0$ is $e^{j\omega_c(t-\Delta t)}$, and $y = e^{-j\omega_c\Delta t}$ is obtained through demodulation by using the local oscillator signal. In this case, the angle of arrival may be represented as the following Formula (1-3). Then, a location of the transmit node is estimated by using an intersection point of extension lines along the two AoA angles, where c represents the speed of light:

$$\theta_{AoA} = \arccos\left(-\frac{c \arg[y]}{d\omega_c}\right) \qquad (1\text{-}3)$$

It may be understood that, to facilitate understanding of AoA ranging, the foregoing description is an example for description. In practice, to improve estimation precision of the angle of arrival, a plurality of antennas may be configured. The antenna array may be arranged in a shape such as a straight line, a ring, or a sphere, and a corresponding method for calculating an angle of arrival is also more complex. For the corresponding method for calculating an angle of arrival when the antenna array is arranged in different manners, refer to an existing calculation method. Details are not described herein.

3. Elevation Angle and Azimuth

Figure 4:
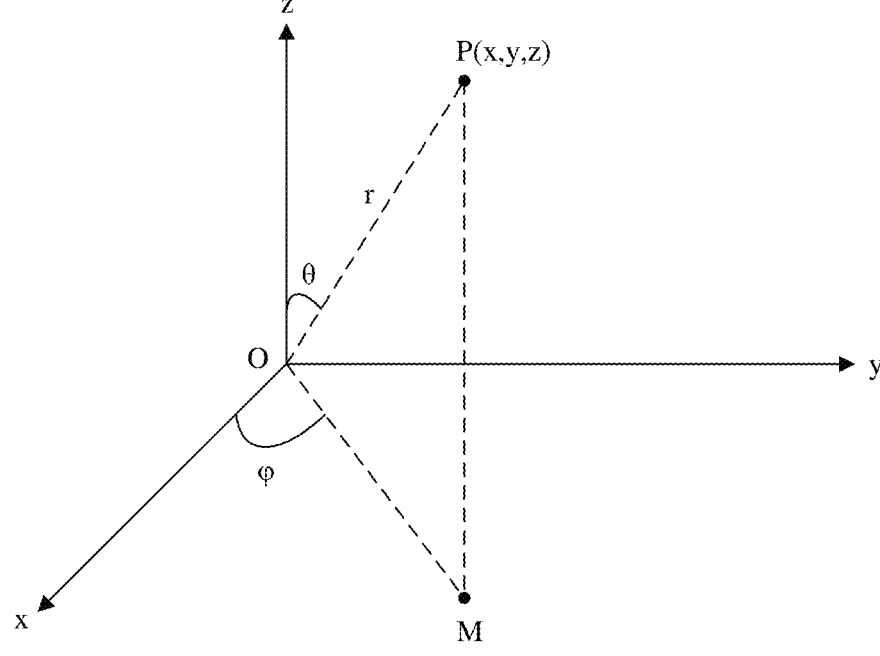
FIG. 4 is a schematic diagram of geometric meanings of spherical coordinates.

A spherical coordinate system is a type of three-dimensional coordinate system, and is used to determine locations of a point, a line, a surface, and a volume in three-dimensional space. The system uses the coordinate origin as a reference point, and includes an azimuth tp, an elevation angle θ, and a distance r. FIG. 4 is a schematic diagram of geometric meanings of spherical coordinates. As shown in FIG. 4, a point P (x, y, z) in space may also be determined by using three parameters (r, θ, φ), where r is a distance between the origin O and a point P, θ is an angle between a directional line segment OP and the positive z-axis, φ is an angle obtained through rotation from the x-axis to a line segment OM in a counterclockwise direction from the perspective of the positive z-axis, and a point M is a projection point of the point P on a plane xOy. Herein, (r, θ, φ) is referred to as spherical coordinates of the point P, where a value of r is [0, +∞), a value of θ is [0, π], and a value of φ is [0, 2π].

It may be understood that the spherical coordinate system (r, θ, φ) and a rectangular coordinate system (x, y, z) may be mutually converted. A conversion relationship between the spherical coordinate system (r, θ, φ) and the rectangular coordinate system (x, y, z) is shown in the following Formulas (1-4) to (1-9):

$$x = r \sin \theta \cos \varphi \qquad (1\text{-}4)$$

$$y = r \sin \theta \sin \varphi \qquad (1\text{-}5)$$

$$z = r \cos \theta \qquad (1\text{-}6)$$

$$r = \sqrt{x^2 + y^2 + z^2} \qquad (1\text{-}7)$$

$$\theta = \arccos \frac{z}{r} \qquad (1\text{-}8)$$

$$\varphi = \arctan \frac{y}{x} \qquad (1\text{-}9)$$

4. Uplink (Uplink) Communication, Downlink (Downlink) Communication, and Backhaul (Backhaul) Communication It may be understood that uplink (uplink) communication mentioned in embodiments of this application is a communication process in which a terminal device performs sending and a network device performs receiving, downlink (downlink) communication is a communication process in which a network device performs sending and a terminal device performs receiving, and backhaul (backhaul) communication is a communication process between a plurality of network devices, for example, a communication process in which one network device performs sending and another network device performs receiving.

The foregoing content briefly describes some terms (nouns) used in the communication method provided in embodiments of this application. The following describes a system architecture provided in embodiments of this application.

Embodiments of this application provide a communication method for actively constructing a radio channel response by using an OAM vortex wave. A plurality of times of channel measurement are performed by using a plurality of sounding signals that carry and do not carry OAM, a spatial location of an OAM propagation axis is determined by using a sounding signal that carries circularly polarized OAM, and a beamforming direction is selected. A joint transceiving combination manner of MIMO and OAM is selected based on a channel response feature. An obtaining manner of the channel response feature includes sounding signal measurement and electromagnetic calculation. An OAM mode and a power factor are negotiated and configured by using control signaling exchanged between a transmit end and a receive end. A system and signaling that match the communication method in this application include: adding, between a MIMO coding/decoding module and a spatial filter module in a conventional multi-antenna communication system, an OAM modulation/demodulation module, an OAM reference signal introduced to the transmit end, and feedback control signaling of an OAM matrix indicator and an OAM power indicator that are introduced to the receive end; and adding, on a physical antenna array of the conventional receive end, a physical antenna selection and configuration module introduced to a network side, to adapt to a feature that a spatial amplitude and phase distribution of the OAM vortex wave is uneven, so as to improve a power of a wanted signal on the network side, and reduce independence and uncorrelatedness of channel responses at adjacent spatial locations.

Figure 5:
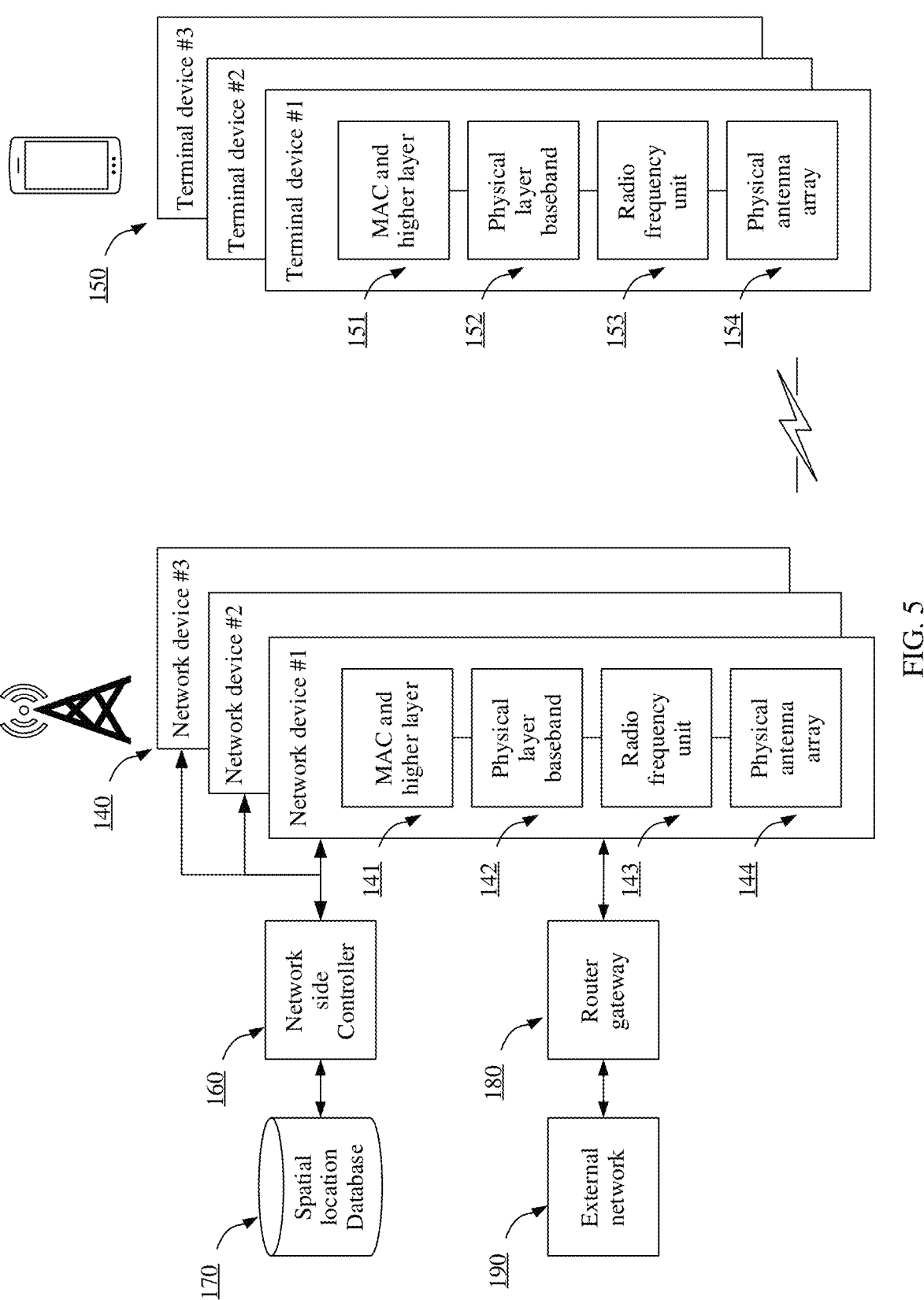
FIG. 5 is a system block diagram of a wireless communication system according to an embodiment of this application.

The communication method in embodiments of this application may be applied to a wireless communication system. FIG. 5 is a system block diagram of a wireless communication system according to an embodiment of this application. As shown in FIG. 5, the wireless communication system may include at least one network device (a network device 140 in FIG. 5), at least one terminal device (a terminal device 150 in FIG. 5), a network side controller 160, a spatial location database 170, and the like. Optionally, the wireless communication system may further include a router gateway 180, an external network 190, and the like. The router gateway 180 is configured to access the external network 190. The network device 140 may include a media access control (media access control, MAC) and higher layer 141, a physical layer baseband 142, a radio frequency unit 143, a physical antenna array 144, and the like. The terminal device 150 may also include a MAC and higher layer 151, a physical layer baseband 152, a radio frequency unit 153, and a physical antenna array 154. Data/signaling may be sent/received between the physical antenna array 144 of the network device 140 and the physical antenna array 154 of the terminal device 150 by using a radio channel or a radio electromagnetic wave. The physical antenna array 144 of the network device 140 may include one or more antenna elements, or may include one or more antenna boards that include a plurality of antenna elements. Due to a limited size of a component, the physical antenna array 154 of the terminal device 150 may include one or more antenna elements. Optionally, in this embodiment of this application, a quantity of antenna elements included in the physical antenna array of the network device may be far greater than a quantity of antenna elements included in the physical antenna array of the terminal device.

Optionally, in actual application, the wireless communication system may include a plurality of network devices, and may also include a plurality of terminal devices. One network device may serve one or more terminal devices. One terminal device may also access one or more network devices. The network side controller 160 may control one or more network devices.

Optionally, in actual application, the network device may mainly include a combination form of a remote radio unit (remote radio unit, RRU) or an active antenna unit (active antenna unit, AAU) and a baseband unit (baseband unit, BBU). The terminal device may mainly include a screen transparent antenna array/terminal frame antenna array and a baseband communication chip. One or more physical antenna array boards of the network device may be continuous in space in a centralized arrangement manner, or may be discontinuous in space in a distributed arrangement manner. A geometric topology of antenna elements on the antenna array board may be deployed on a same plane, or may be deployed in a three-dimensional manner. Specifically, each antenna element may be a single polarization element, a dual polarization element, or a triple polarization element. A space distance between adjacent antenna elements may be equal to a half wavelength, or may be less than or far less than a half wavelength. Optionally, in addition to a discrete physical antenna array, the network device and the terminal device in this embodiment of this application may also use a continuous artificial antenna such as a parabolic artificial antenna, a helical phase artificial antenna, a cylindrical artificial antenna, and a resonant cavity artificial antenna. Forms of the antennas of the network device and the terminal device are not limited in this embodiment of this application, but the antennas used in the network device and the terminal device need to meet the following: An OAM vortex wave can be sent and received by using the antenna.

It may be understood that the foregoing content briefly describes the system architecture in this application with reference to the system block diagram (or the component) of the wireless communication system. To facilitate better understanding of the system architecture in this application, the following further describes the system architecture in this application by using physical layer implementations of the transmit end and the receive end.

Figure 6:
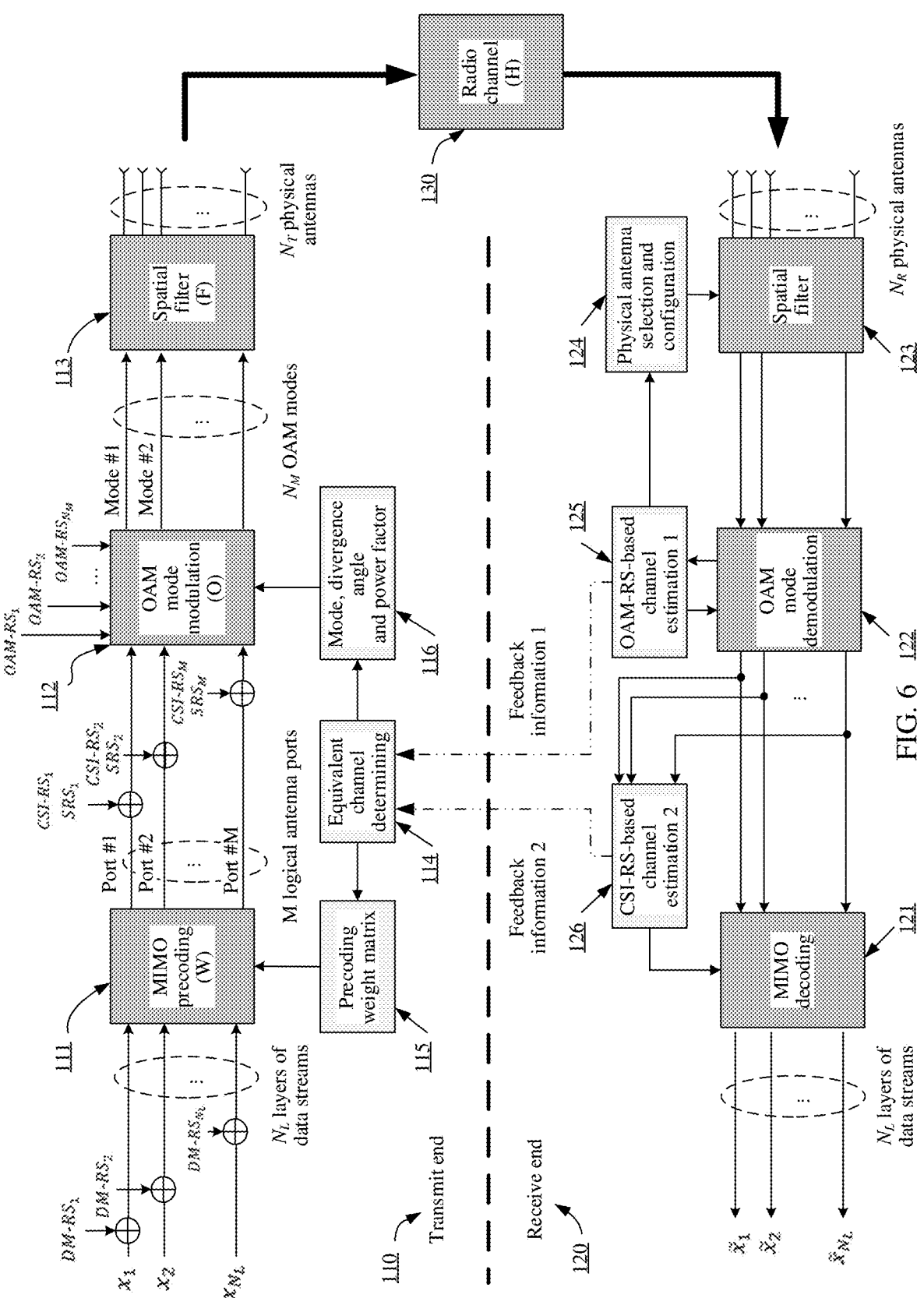
FIG. 6 is an architectural block diagram of a physical layer baseband system according to an embodiment of this application.

FIG. 6 is an architectural block diagram of a physical layer baseband system according to an embodiment of this application. As shown in FIG. 6, the physical layer baseband system may include three parts: a transmit end 110, a receive end 120, and a radio channel 130. The transmit end 110 may include a MIMO precoding module 111, an OAM mode modulation module 112, a spatial filter module 113, an equivalent channel determining module 114, a precoding weight matrix module 115, and a mode and power factor module 116. Correspondingly, the receive end 120 may include a MIMO decoding module 121, an OAM mode demodulation module 122, a spatial filter module 123, a physical antenna selection and configuration module 124, an orbital angular momentum-reference signal (OAM reference signal, OAM-RS)-based channel estimation module 125, and a channel state information-reference signal (channel state information-reference signal, CSI-RS) or sounding reference signal (sounding reference signal, SRS)-based channel estimation module 126. A connection manner of these functional modules may be shown in FIG. 6.

Specifically, an input parameter of the MIMO precoding module 111 may be $N_L$ layers of data streams from a module prior to the transmit end, may be $N_L$ layers of demodulation reference signals (demodulation reference signal, DM-RS) known by the transmit end and the receive end, and may be precoding codebook information from the precoding weight matrix module 115. An output parameter of the MIMO precoding module 111 may be M-port data streams after a precoding operation, and the M-port data streams are transmitted to/input to the OAM mode modulation module 112. Correspondingly, an input parameter of the MIMO decoding module 121 may be M-port data streams from the OAM mode demodulation module 122 and channel response information from the CSI-RS or SRS-based channel estimation module 126. An output parameter thereof may be $N_L$ layers of data streams after a decoding operation, and the $N_L$ layers of data streams are transmitted to/input to a module following the receive end. The MIMO precoding module 111 is controlled by the precoding weight matrix module 115, for example, completes a precoding process of the MIMO precoding module 111 based on a matrix specified by the precoding weight matrix module 115.

An input parameter of the OAM mode modulation module 112 may be M-port data streams from the MIMO precoding module 111, may be M CSI-RS or SRS sounding signals known by the transmit end and the receive end by default, may be $N_M$ OAM-RS sounding signals known by the transmit end and the receive end by default, and may be OAM parameter information from the mode and power factor module 116. Herein, $N_M$ represents a quantity of types of OAM modes supported by the transmit end. An output parameter of the OAM mode modulation module 112 may be $N_M$ data streams. Correspondingly, an input parameter of the OAM mode demodulation module 122 may be $N_M$ data streams from the spatial filter module 123. An output parameter thereof may be M-port data streams that are transmitted to/input to the MIMO decoding module 121, and may be $N_M$ received OAM-RS sounding signals. The $N_M$ received OAM-RS sounding signals are transmitted to/input to the OAM-RS-based channel estimation module 125. The OAM mode modulation module 112 is controlled by the mode and power factor module 116, for example, completes a mode modulation process of the OAM mode modulation module 112 based on an OAM parameter specified by the mode and power factor module 116.

An input parameter of the spatial filter module 113 of the transmit end may be $N_M$ data streams from the OAM mode modulation module 112, and an output parameter thereof may be $N_T$ data streams that are transmitted to physical antennas. Herein, $N_T$ represents a quantity of physical antennas of the transmit end. Correspondingly, an input parameter of the spatial filter module 123 of the receive end may be $N_R$ data streams obtained by a receive antenna from the radio channel, and an output parameter thereof may be $N_M$ data streams that are transmitted to the OAM mode demodulation module 122. Herein, $N_R$ represents a quantity of physical antennas of the receive end. Values of $N_T$ and $N_R$ may be equal, or may not be equal. The spatial filter module 123 of the receive end is controlled by the physical antenna selection and configuration module 124, for example, selects a part of physical antennas based on an antenna set specified by the physical antenna selection and configuration module 124, to execute a wireless signal receiving process.

An input parameter of the equivalent channel determining module 114 may be feedback information 1 and feedback information 2 from the receive end, and an output parameter thereof may be a precoding codebook selection policy that is transmitted to/input to the precoding weight matrix module 115, and an OAM parameter selection policy that is transmitted to/input to the mode and power factor module 116.

An input parameter of the precoding weight matrix module 115 may be the feedback information 1 from the CSI-RS or SRS-based channel estimation module 126 and the precoding codebook selection policy from the equivalent channel determining module 114. An output parameter thereof may be a precoding codebook that is transmitted to/input to the MIMO precoding module 111.

An input parameter of the mode and power factor module 116 may be the feedback information 2 from the OAM-RSbased channel estimation module 125 and the OAM parameter selection policy from the equivalent channel determining module 114. An output parameter thereof may be an OAM parameter that is transmitted to/input to the OAM mode modulation module 112.

An input parameter of the physical antenna selection and configuration module 124 may be channel response information from the OAM-RS-based channel estimation module 125, and an output parameter thereof may be a physical antenna parameter that is transmitted to/input to the spatial filter module 123.

An input parameter of the OAM-RS-based channel estimation module 125 may be $N_M$ received OAM-RS sounding signals from the OAM mode demodulation module 122, and an output parameter thereof may be channel response information that is transmitted to/input to the physical antenna selection and configuration module 124 and the OAM mode demodulation module 122.

An input parameter of the CSI-RS or SRS-based channel estimation module 126 may be M CSI-RS or SRS signals from the OAM mode demodulation module 122, and an output parameter thereof may be the feedback information 1 that is transmitted to the equivalent channel determining module 114 and the channel response information that is transmitted to the MIMO decoding module 121.

It may be understood that the modules included in the transmit end and the receive end shown in FIG. 6 is merely obtained through division based on a function of each module. For example, the functional modules may be obtained through division based on each corresponding function, or two or more functions may be integrated into one processing module. The integrated module may be implemented in a form of hardware, or may be implemented in a form of a software functional module. It should be noted that, in embodiments of this application, module division in FIG. 6 is an example, and is merely a logical function division. During actual implementation, another division manner may be used. It may be further understood that a name of each module in FIG. 6 is merely obtained based on a function of the module. In actual application, the functional module may be described by using another name Specific names of the modules included in the transmit end and the receive end are not limited in this embodiment of this application.

It may be understood that, in a downlink communication process, the physical layer baseband 142, the radio frequency unit 143, and the physical antenna array 144 of the network device shown in FIG. 5 are jointly equivalent to the transmit end 110 shown in FIG. 6, and the physical layer baseband 152, the radio frequency unit 153, and the physical antenna array 154 of the terminal device shown in FIG. 5 are jointly equivalent to the receive end 120 shown in FIG. 6. Similarly, in an uplink communication process, the physical layer baseband 152, the radio frequency unit 153, and the physical antenna array 154 of the terminal device shown in FIG. 5 are jointly equivalent to the transmit end 110 shown in FIG. 5 are jointly equivalent to the transmit end 110 shown in FIG. 6, and the physical layer baseband 142, the radio frequency unit 143, and the physical antenna array 144 of the network device shown in FIG. 5 are jointly equivalent to the receive end 120 shown in FIG. 6.

The foregoing content describes in detail the system architecture in embodiments of this application. To facilitate understanding of the technical solutions provided in this application, the following describes an application scenario of the communication method provided in this application.

Figure 7:
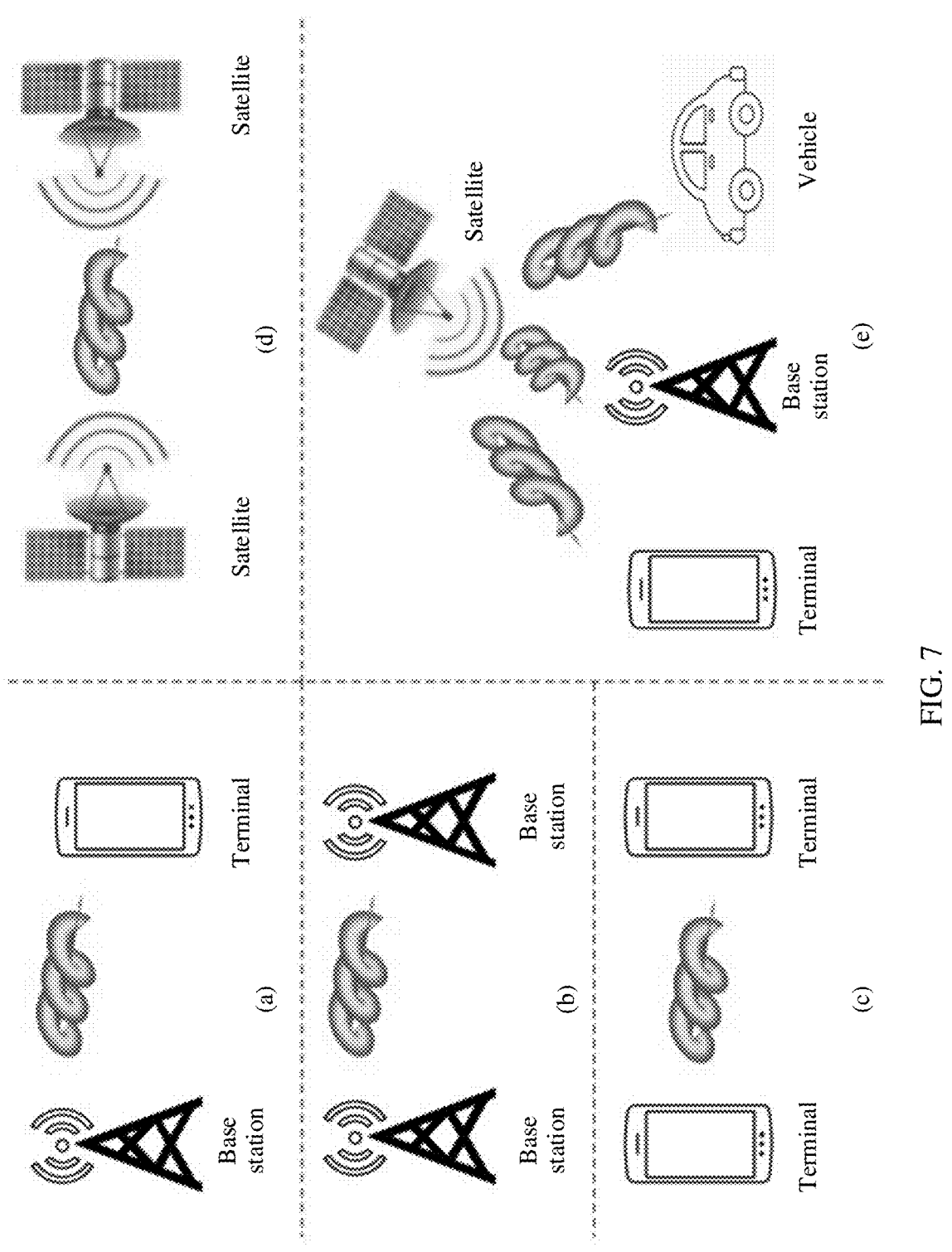
FIG. 7 is a schematic diagram of a typical application scenario according to an embodiment of this application.

FIG. 7 is a schematic diagram of a typical application scenario according to an embodiment of this application. As shown in FIG. 7, the application scenario in this embodiment of this application includes: (a) a wireless communication scenario between a base station and a terminal by using an OAM vortex wave; (b) a wireless communication scenario between base stations by using an OAM vortex wave; (c) a wireless communication scenario between terminals by using an OAM vortex wave; (d) a wireless communication scenario between satellites by using an OAM vortex wave; and (e) a wireless communication scenario between a satellite and all of a terminal, a base station, and a vehicle on the ground by using an OAM vortex wave. It may be understood that the application scenario of the communication method in this embodiment of this application includes but is not limited to the application scenario shown in FIG. 7. FIG. 7 shows only examples of some application scenarios in this embodiment of this application. The communication method in this embodiment of this application may be further applied to a networked wireless communication scenario that includes a plurality of base stations, a plurality of terminals, a plurality of satellites, a plurality of vehicles, and the like.

Figure 8:
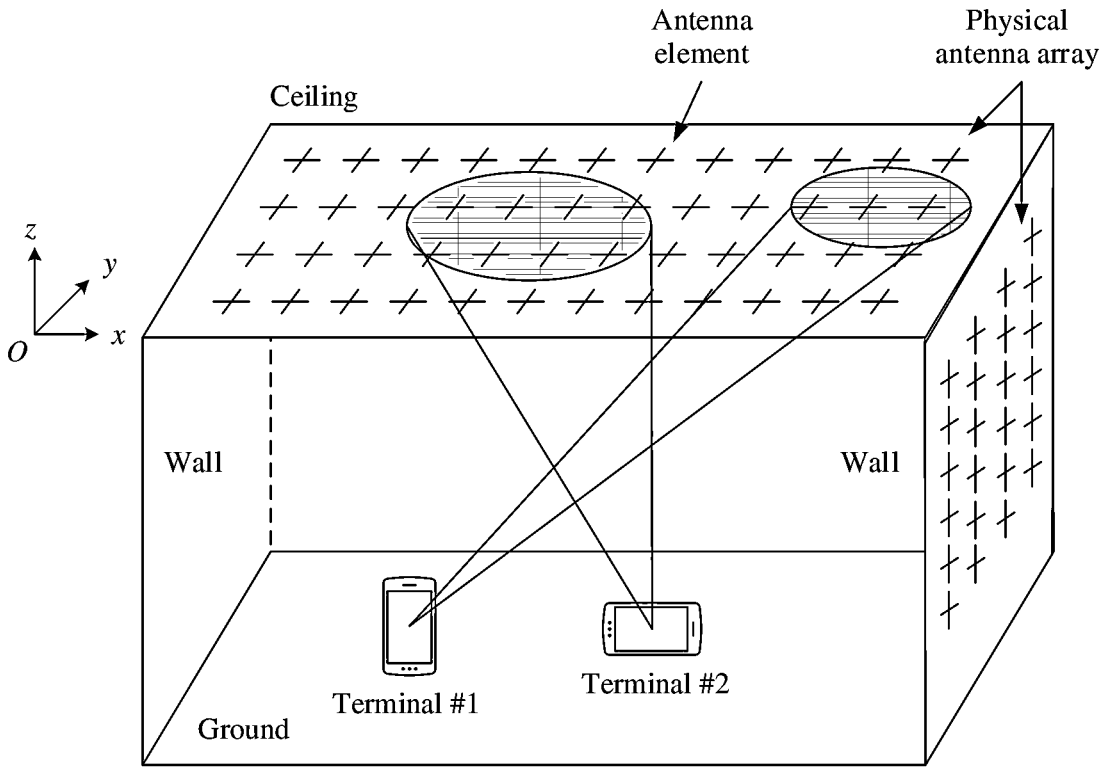
FIG. 8 is a schematic diagram of an application scenario in which a network device communicates with a terminal device according to an embodiment of this application.

Specifically, a specific scenario implementation of communication between the base station and the terminal is described by using communication between the base station and the terminal as an example. It may be understood that the base station may be referred to as a network device, and the terminal may be referred to as a terminal device. The following is described by using the network device and the terminal device. FIG. 8 is a schematic diagram of an application scenario in which a network device communicates with a terminal device according to an embodiment of this application. As shown in FIG. 8, a physical antenna array of the network device may be an ELAA or a holographic compact antenna array (holographic compact antenna array, HCAA) that is mounted on a ceiling and/or a wall indoors. The physical antenna array may support sending/receiving of a signal/data by using a plane wave that does not carry OAM, and may also support sending/receiving of a signal/data by using a vortex wave that carries OAM. Optionally, physical antenna arrays on the ceiling and the wall may belong to a same network device, or may belong to a plurality of network devices. This is not limited in this embodiment of this application. Optionally, in this embodiment of this application, it is set that the physical antenna arrays on the ceiling and the wall belong to a same network side controller. There are a large quantity of terminal devices (for example, a smartphone or a tablet computer) indoors, and there is a large probability that a screen of each terminal device faces the ceiling or the wall (namely, the antenna array on the network side) without being shielded. In this embodiment of this application, that the screen of the terminal device totally faces the ceiling or the wall is not limited. A user may carry the terminal device in a still state or a slow movement state in the classroom. The terminal device may send/receive, by using a physical antenna array mounted below the screen, a plane wave that does not carry OAM and a vortex wave that carries OAM.

Optionally, to determine a spatial location of an antenna element in the physical antenna array of the network device, in this embodiment of this application, a three-dimensional coordinate system may be established indoors. For example, a lower left corner of the indoor ceiling is denoted as the origin O of a rectangular coordinate system in entire indoor space, a horizontal direction and a vertical direction that are parallel to a plane of the ceiling are respectively denoted as the x-axis and the y-axis, and an upward direction perpendicular to the ceiling is denoted as the z-axis.

Figure 9:
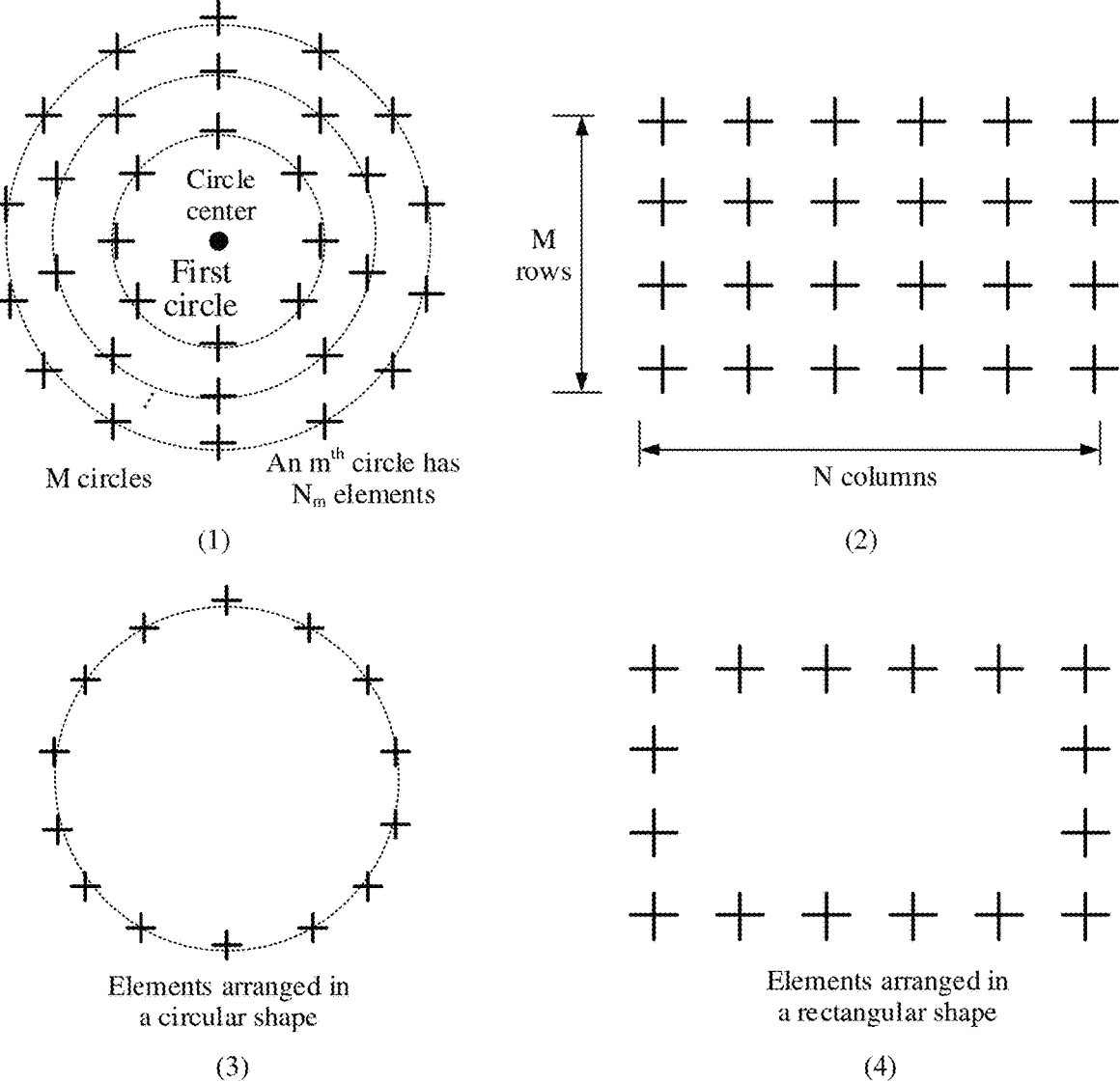
FIG. 9 is a schematic diagram of a geometric topology of a physical antenna array according to an embodiment of this application.

Optionally, geometric topology structures of the physical antenna arrays of the network device and the terminal device may be any topology structure such as a circle, M concentric circles, a grid shape, or a rectangle. FIG. 9 is a schematic diagram of a geometric topology of a physical antenna array according to an embodiment of this application. As shown in FIG. 9, the geometric topology of the physical antenna array includes: (1) arrangement of M concentric circles, where antenna elements in each concentric circle are evenly distributed, and quantities of antenna elements on the M concentric circles may be different; (2) arrangement in a grid shape including M rows and N columns; (3) even arrangement in a circle; and (4) even arrangement on an edge of a rectangular. It may be understood that, in actual application, the geometric topology structures of the physical antenna arrays of the network device and the terminal device may not be in an absolute regular shape. For example, a circular topology structure may not be an absolute circle in a mathematical sense, and an error may exist in actual application.

An antenna element deployed in the physical antenna array may be a "cross" shaped antenna element, and each "cross" shaped antenna element may be a dual polarization antenna element including a horizontal polarization element and a vertical polarization element. Alternatively, an antenna element deployed in the physical antenna array may be an X-shaped dual polarization antenna element including 45-degree polarization element and a 135-degree polarization element, or may be a triple polarization antenna element including three polarization directions of the x-axis, the y-axis, and the z-axis.

Optionally, any geometric topology structure shown in FIG. 9 and any dual polarization or triple polarization antenna element form may be used for both the physical antenna array of the network device and the physical antenna array of the terminal device. In the following descriptions of the embodiments, it is assumed that the grid-shaped topology structure is used for both the physical antenna array of the network device and the physical antenna array of the terminal device, and the "cross" shaped dual polarization antenna element is used for each antenna element in the physical antenna array.

It may be understood that an electric field has no component on the z-axis in a three-dimensional spatial coordinate system (x, y, z), and when there is no phase difference (in-phase) between two components on the x-axis and the y-axis or a phase difference (reverse-phase) between two components on the x-axis and the y-axis is 180 degrees, a composite electric field vector is linearly polarized. When a strength direction of the electric field is perpendicular to the ground, the electric wave is referred to as a vertically polarized wave. When a strength direction of the electric field is parallel to the ground, the electric wave is referred to as a horizontally polarized wave.

The foregoing content describes the application scenario of this embodiment of this application. With reference to more accompanying drawings, the following describes in detail the communication method provided in this application.

Embodiment 1

In Embodiment 1 of this application, four phases of a wireless communication process in this application are described: an initialization phase, an uplink communication phase, a downlink communication phase, and a negotiation phase of a joint transceiving manner of MIMO and OAM.

FIG. 10 is a schematic diagram of a wireless communication process according to an embodiment of this application. As shown in FIG. 10, the wireless communication process in this application includes the following steps.

S100. Execute an initialization process between a terminal device and a network device.

The initialization process between the terminal device and the network device may include three subprocesses: The network device establishes spatial location information, the terminal device initially accesses a network, and the network device performs spatial positioning on the terminal device.

S200. Execute an uplink communication process between the terminal device and the network device.

The uplink communication process between the terminal device and the network device may include five subprocesses p1 to p5:

p21. The terminal device sends an uplink beamforming (beamforming, BF) sounding reference signal (sounding reference signal, SRS), and the network device obtains, through measurement by listening to the BF-SRS, a channel response of a plane wave that does not carry OAM. For ease of description, the beamforming sounding reference signal is abbreviated to BF-SRS in this application.

p21. The terminal device sends a composite waveform of an uplink circularly polarized beam and OAM beam as a sounding signal, and the network device determines a projection location of an OAM propagation axis on a plane of an antenna array on a network side by detecting the sounding signal.

p23. The terminal device sends an uplink OAM reference signal (reference signal, RS), and the network device obtains, through measurement by listening to the OAM-RS, a channel response of a vortex wave that carries OAM. For ease of description, the OAM reference signal is abbreviated to OAM-RS in this application.

p24. The network device selects a part of antenna elements from all antenna elements of the antenna array on the network side based on the plane-wave channel response and/or the vortex-wave channel response of the antenna array on the network side, to execute a subsequent communication receiving process. Herein, a method for obtaining the channel response by the network device may be performing channel response measurement on the BF-SRS and the OAM-RS, or may be performing electromagnetic calculation based on electromagnetic field propagation features of the plane wave (BF-SRS) and the vortex wave (OAM-RS).

p25. The network device selects, for a specified terminal device based on the plane-wave channel response and/or the vortex-wave channel response, a MIMO precoding codebook and OAM parameter configuration that are recommended for use in the current uplink communication process, and then notifies the terminal device of the selected MIMO precoding codebook and OAM parameter configuration by sending OAM matrix indicator (OAM matrix indicator, OMI) signaling and OAM power indicator (OAM power indicator, OPI) signaling. Herein, the OAM parameter includes but is not limited to an OAM mode and a transmit power corresponding to the OAM mode.

S300. Execute a downlink communication process between the terminal device and the network device.

The downlink communication process between the terminal device and the network device may include five subprocesses p31 to p35:

p31. The network device sends a downlink beamforming BF channel state information CSI-reference signal RS, and the terminal device obtains, through measurement by listening to the BF-CSI-RS, a channel response of a plane wave that does not carry OAM. For ease of description, the beamforming channel state information-reference signal is abbreviated to BF-CSI-RS in this application.

p32. The network device sends a composite waveform of downlink circular polarization and OAM as a sounding signal, and the terminal device determines a projection location of an OAM propagation axis on a plane of an antenna array on a terminal side by detecting the sounding signal.

p33. The network device sends a downlink OAM-RS, and the terminal device obtains, through measurement by listening to the OAM-RS, a channel response of a vortex wave that carries OAM.

p34. The terminal device obtains the plane-wave channel response and/or the vortex-wave channel response of the antenna array on the terminal side. Optionally, the terminal device may feed back the channel response information to the network device. Herein, a method for obtaining the channel response by the terminal device may be performing channel response measurement on the BF-CSI-RS and the OAM-RS, or may be performing electromagnetic calculation based on electromagnetic field propagation features of the plane wave (BF-CSI-RS) and the vortex wave (OAM-RS).

p35. The terminal device or the network device selects, based on the plane-wave channel response and/or the vortex-wave channel response, a MIMO precoding codebook and an OAM configuration parameter that the terminal device or the network device recommends using in the current downlink communication process, and then notifies a peer device of the selected MIMO precoding codebook and OAM configuration parameter to the peer device by sending OMI signaling and OPI signaling. Herein, the OAM parameter includes but is not limited to an OAM mode and a transmit power corresponding to the OAM mode.

S400. Execute a negotiation process of the joint transceiving manner of MIMO and OAM between the terminal device and the network device.

The negotiation process of the joint transceiving manner of MIMO and OAM between the terminal device and the network device may include three subprocesses p41 to p43:

p41. The network device or the terminal device sends joint transceiving manner request (Joint-TRX-Request) signaling, to the peer end, to recommend a transmit-end communication module configuration manner and a receive-end communication module configuration manner in current communication. Herein, a transmit-end communication module configuration manner set includes: using only MIMO precoding, using only OAM mode modulation, and jointly using MIMO precoding and OAM mode modulation. A receive-end communication module configuration manner set includes: using only MIMO decoding, using only OAM mode demodulation, using OAM mode demodulation before MIMO decoding, and directly using joint receiving of OAM and MIMO.

p42. The terminal device or the network device sends joint transceiving manner response (Joint-TRX-Response) signaling to the peer end, to agree with or reject the configuration manner recommended in the joint transceiving manner request signaling.

p43. The network device or the terminal device sends joint transceiving manner acknowledgement (Joint-TRX-ACK) signaling to the peer end to acknowledge or respond to Joint-TRX-Response.

It may be understood that the foregoing four processes may be separately implemented, or any two or three of the processes may be implemented together, or the foregoing four processes may be implemented together. It may be understood that, in actual application, fewer than the foregoing four processes may exist in an implementation process of the technical solutions of this application. For example, the uplink communication process is separately implemented, the downlink communication process is separately implemented, or the negotiation process of the joint transceiving manner of MIMO and OAM is separately implemented. A plurality of processes thereof may be implemented together in the technical solutions of this application. For example, the uplink communication process and the negotiation process of the joint transceiving manner of MIMO and OAM are implemented together, or the downlink communication process and the negotiation process of the joint transceiving manner of MIMO and OAM are implemented together, or the uplink communication process and the initialization process are implemented together, or the downlink communication process and the initialization process are implemented together, or the uplink communication process, the downlink communication process, and the negotiation process of the joint transceiving manner of MIMO and OAM are implemented together, or the initialization process, the downlink communication process, and the negotiation process of the joint transceiving manner of MIMO and OAM are implemented together. This is not limited in this embodiment of this application.

In the foregoing Embodiment 1, four processes that may be included in the technical solutions of this application are briefly described. The following separately describes in detail the four processes (namely, the four processes such as the initialization process, the uplink communication process, the downlink communication process, and the negotiation process of the joint transceiving manner of MIMO and OAM).

Embodiment 2

In Embodiment 2 of this application, an initialization process (S100) between a network device and a terminal device is described. The initialization process provides a communication basis for a subsequent uplink or downlink communication process.

Figure 11:
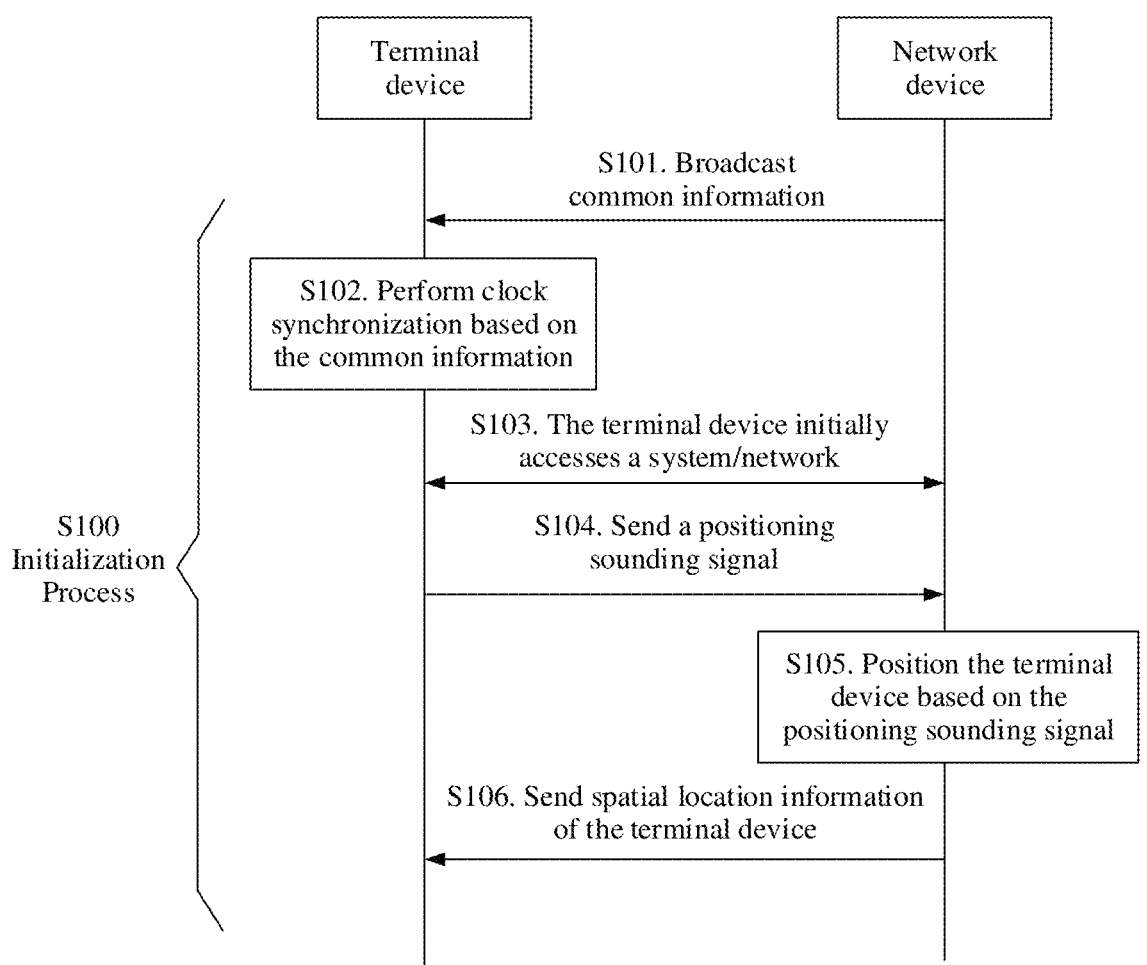
FIG. 11 is a schematic flowchart of an initialization process according to an embodiment of this application.

FIG. 11 is a schematic flowchart of an initialization process according to an embodiment of this application. As shown in FIG. 11, the initialization process provided in this embodiment of this application includes but is not limited to the following steps.

S101. The network device broadcasts common information. Correspondingly, the terminal device receives the common information.

S102. The terminal device performs clock synchronization based on the common information.

Specifically, the network device broadcasts the common information of the network device to the terminal device by using a radio channel, for example, a primary synchronization signal (primary synchronization signal, PSS), a secondary synchronization signal (secondary synchronization signal, SSS), and a system information block (system information block, SIB). The terminal device implements clock synchronization with the network device by listening to the signal such as the PSS and the SSS.

Optionally, before step S101, a network side controller may receive a global coordinate system (global coordinate system, GCS) established by a research and development person, and store the GCS information into a spatial location database for use in a subsequent electromagnetic calculation process.

S103. The terminal device initially accesses a system/network.

Specifically, the terminal device sends a preamble (preamble) by using a physical random access channel (physical random access channel, PRACH) to request to perform random access. The network device sends a random access response (random access response, RAR) to agree with random access of the terminal device. Then, the terminal device exchanges information with the network device to finally complete a random access process of the terminal device. Subsequently, the terminal device continuously listens to a cell-specific reference signal (cell specific reference signal, CRS) periodically broadcast by the network device.

S104. The terminal device sends a positioning sounding signal to the network device. Correspondingly, the network device receives the positioning sounding signal.

S105. The network device positions the terminal device based on the positioning sounding signal.

S106. The network device sends spatial location information of the terminal device to the terminal device.

Specifically, the terminal device sends a plurality of positioning sounding signals (positioning reference signal, PRS) in a plurality of spatial directions/beamforming directions. The network device obtains angles of arrival and/or times of arrival (time of arrival, TOA) of the plurality of PRSs in the plurality of spatial directions/beamforming directions through listening, estimates the spatial location information of the terminal device by using the AoA and/or the ToA, and stores the spatial location information into the spatial location database. The network device sends the spatial location information of the terminal device to the terminal device by using the radio channel It may be understood that, in this embodiment of this application, the initialization process is used to determine the spatial location information of the terminal device, complete random access of the terminal device, and the like, and may provide a communication basis for subsequent uplink/downlink communication.

Embodiment 3

Figure 12:
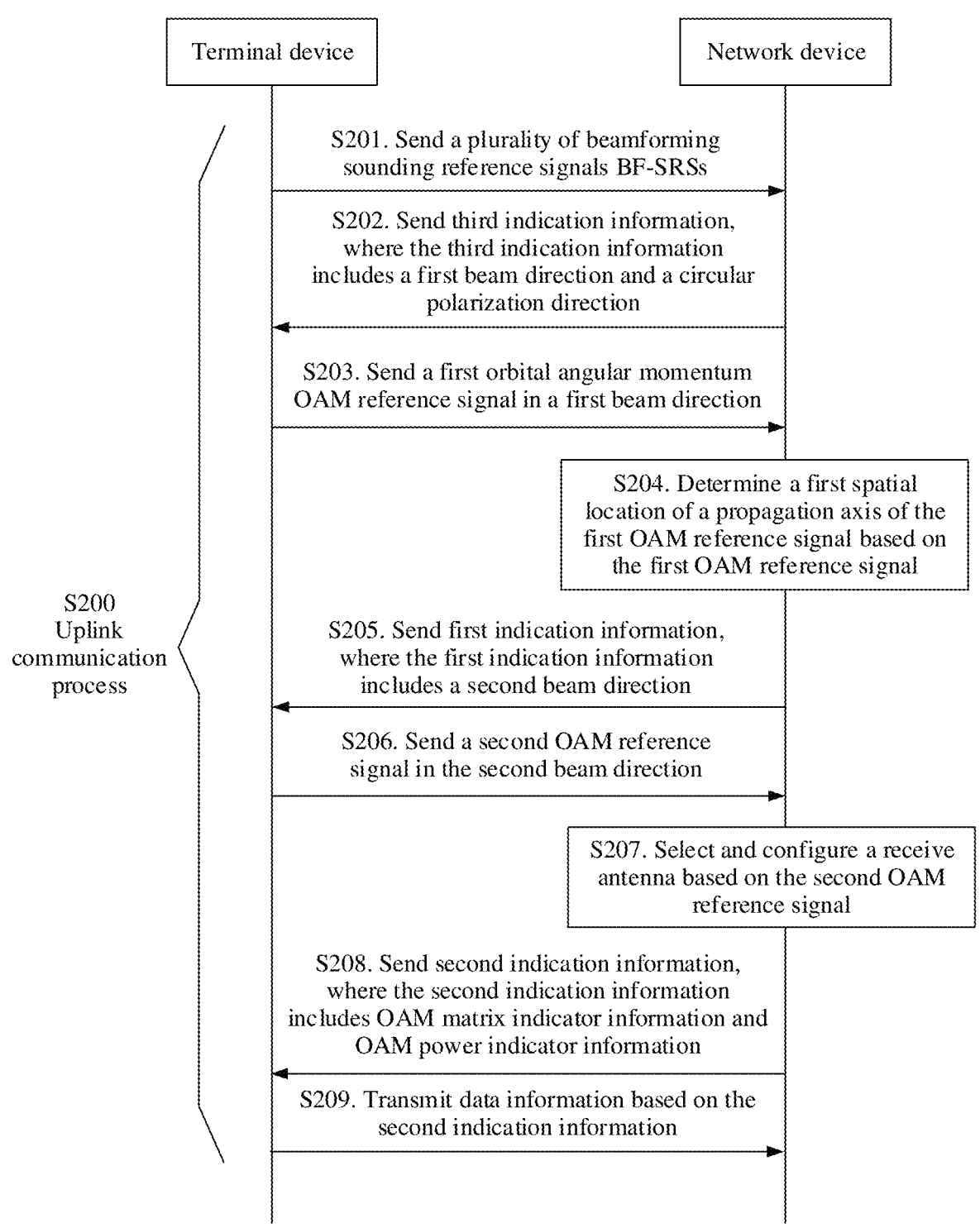
FIG. 12 is a schematic flowchart of an uplink communication process according to an embodiment of this application.

In Embodiment 3 of this application, an uplink communication process (S200) between a network device and a terminal device is described. Specifically, FIG. 12 is a schematic flowchart of an uplink communication process according to an embodiment of this application. As shown in FIG. 12, the uplink communication process provided in this embodiment of this application includes but is not limited to the following steps.

S201. The terminal device sends a plurality of beamforming sounding reference signals BF-SRSs to the network device.

Specifically, the terminal device sends, to the network device in M beamforming directions supported by a spatial filter of the terminal device, M plane waves such as a BF-SRS$_1$, a BF-SRS$_2$, . . . , and a BF-SRS$_M$ that do not carry OAM. One BF-SRS is sent in one beamforming direction. The M BF-SRSs may be sent by using a same timeslot and a same frequency, or may be sent by using different timeslots and a same frequency, or may be sent by using a same timeslot and different frequencies. Optionally, a Zadoff-Chu sequence may be used for a sending sequence of the BF-SRS. It may be understood that, in actual application, another sequence may be used. This is not limited in this embodiment of this application.

S202. The network device sends third indication information to the terminal device, where the third indication information includes a first beam direction and a circular polarization direction.

Specifically, the third indication information may be a BF-SRS resource indicator (BF-SRS resource indicator, BF-SRI). The network device estimates, by listening to the plurality of BF-SRSs, channel state information (CSI) that is of an uplink communication link from the terminal device to the network device and that exists when the plane wave does not carry OAM. Then, the network device may notify, by using the BF-SRI, the terminal device of a BF-SRS that is in a specific beamforming direction and that is selected by a network from the plurality of BF-SRSs for current communication. In a subsequent uplink communication process, the terminal device sends a signal by using a specified spatial filter solution. Herein, the spatial filter solution includes a beamforming direction (namely, the first beam direction) during next sending. In addition, the network device further specifies, to the terminal device, the circular polarization direction that is subsequently used to position an OAM propagation axis. The circular polarization direction may be left-hand circular polarization (left-hand circular polarization, LHCP) or right-hand circular polarization (right-hand circular polarization, RHCP). For ease of description, in the following descriptions, LHCP is used as a specified circular polarization direction in this application.

S203. The terminal device sends a first OAM reference signal to the network device in the first beam direction.

Specifically, the first OAM reference signal may be an OAM-RS, the first OAM reference signal may be borne on a first beam, and the first beam may be a composite sounding waveform that bears the OAM-RS. The composite sounding waveform may be a composite sounding waveform of the circular polarization direction indicated by the third indication information and the OAM-RS. The terminal device uses the specified spatial filter solution and the first beam direction to replace the plane wave that does not carry OAM with a composite waveform of LHCP and a vortex wave in an OAM mode n, then sequentially modulates an OAM-RS in an n$^{th}$ mode to the composite waveform in a polling manner, and sends a composite sounding waveform of the OAM-RS$_n$ to the network device in different timeslots in a polling manner. A value range of the mode n may be an integer between $(-N_M/2), \ldots, 0, \ldots, N_M/2$. An OAM mode 0 may represent a plane wave that does not carry OAM.

S204. The network device determines a first spatial location of a propagation axis of the first OAM reference signal based on the first OAM reference signal.

Specifically, the network device may detect, by using a physical antenna array of the network device, an electric field vector direction of the composite sounding waveform of the OAM-RS listened in a plurality of spatial locations, and then estimate, by using a centripetal rule of the electric field vector direction on a plurality of antenna elements, a mapping spatial location (namely, the foregoing first spatial location) that is of the propagation axis of the composite sounding waveform of the circular polarization direction and the OAM-RS and that is on a plane in which the physical antenna array is located.

S205. The network device sends first indication information to the terminal device, where the first indication information includes a second beam direction.

Specifically, the network device may select most appropriate beamforming directions for different terminal devices based on spatial locations of propagation axes of OAM-RSs from a plurality of different terminal devices and by comprehensively considering overall transmission performance of the plurality of terminal devices. Herein, a principle of selecting the most appropriate beamforming direction includes but is not limited to a principle of maximizing a system throughput, a principle of proportional fairness between a plurality of users, and a principle of ensuring quality of service of an edge user of a cell. Then, the network device may send the first indication information to the terminal device. The first indication information includes but is not limited to information such as the first spatial location that is estimated by the network device for the terminal device and that is of the propagation axis, a layer 1 reference signal received power (layer 1 reference signal received power, L1-RSRP) obtained by the network device by listening to the OAM-RS, and a beamforming direction (namely, the second beam direction) that is selected by the network device for the terminal device and that is used when a signal is sent next time.

S206. The terminal device sends a second OAM reference signal to the network device in the second beam direction.

Specifically, the second OAM reference signal may be borne on a second OAM composite beam, and the second OAM composite beam may be a composite beam of a linearly polarized beam and an OAM beam. The terminal device sends a plurality of OAM-RSs (namely, the second OAM reference signal) in different OAM modes in one beamforming direction (namely, the second beamforming direction) selected by the network device.

S207. The network device selects and configures a receive antenna based on the second OAM reference signal.

Specifically, the network device performs, by listening to the second OAM reference signal, channel response measurement on a vortex wave that carries OAM, to obtain a vortex-wave channel response (namely, a second channel response). The network device may further determine one physical antenna selection solution for each terminal device or a plurality of terminal devices in a same performance group based on spatial locations of propagation axes of OAM-RSs from a plurality of different terminal devices and by considering overall transmission performance of the plurality of terminal devices. Optionally, a design method for selecting a physical antenna includes: In a first step, it is determined whether the first spatial location that is of the propagation axis and that is estimated in step S204 falls within a spatial range of a physical antenna array deployed by the network device; and if the first spatial location falls within the spatial range, a second step is performed; or if the first spatial location does not fall within the spatial range, a third step is performed. In the second step, when L1-RSRPs corresponding to different OAM-RSs are all greater than or equal to a preset threshold, a plurality of antenna elements are separately deployed at spatial locations with strongest electric field amplitudes in a plurality of OAM modes, where mapping points of azimuths of the plurality of antenna elements around the propagation axis are evenly distributed. When some or all L1-RSRPs are less than a preset threshold, an OAM mode having a maximum L1-RSRP value is selected, and then a plurality of antenna elements are deployed at a spatial location with a strongest or relatively strong electric field amplitude in the OAM mode, where mapping points of azimuths of the plurality of antenna elements around the propagation axis are evenly distributed. Then, a fourth step is performed. In a third step, regardless of a specific value of an L1-RSRP, a plurality of antenna elements are deployed, at intervals as even as possible, in a maximum spatial distribution range supported by the physical antenna array. Then, a fourth step is performed. In the fourth step, in a subsequent uplink communication process, the network device uses, as a received signal, a radio channel electromagnetic wave signal listened by using the receive antenna elements selected in the first three steps, and ignores a radio channel electromagnetic wave signal that is from the terminal device and that is listened by using another antenna element that is not selected.

S208. The network device sends second indication information to the terminal device, where the second indication information includes OAM matrix indicator information and OAM power indicator information.

Specifically, the network device sends the second indication information to the terminal device based on the physical antenna selection solution and the vortex-wave channel response. The second indication information includes but is not limited to a rank indicator (rank indicator, RI), a precoding matrix indicator (precoding matrix indicator, PMI), and an orbital angular momentum matrix indicator (OAM matrix indicator, OMI for short) or an orbital angular momentum power indicator (OAM power indicator, OPI for short). For ease of description, in this application, the orbital angular momentum matrix indicator is abbreviated to OMI, and the orbital angular momentum power indicator is abbreviated to OPI.

S209. The terminal device transmits data information based on the second indication information.

Specifically, an equivalent channel determining module of the terminal device comprehensively determines, by using the second indication information (the RI, PMI, OMI, and OPI information) received in step S208 and based on uplink channel responses obtained based on the third indication information received in step S202 and the first indication information received in step S205, whether to use PMI, OMI, and OPI solutions recommended by the network device. If determining to use the PMI, OMI, and OPI solutions recommended by the network device, the terminal device may send the PMI information to a precoding weight matrix module of the terminal device, and may send the OMI and OPI information to a mode and power factor module of the terminal device, to generate a data signal. If determining not to use the PMI, OMI, and OPI solutions recommended by the network device, the equivalent channel determining module of the terminal device locally recalculates more appropriate PMI, OMI, and OPI solutions, then separately sends locally generated PMI information to a precoding weight matrix module of the terminal device, and sends locally generated OMI and OPI information to a mode and power factor module of the terminal device, to generate a data signal. After the equivalent channel determining module of the terminal device completes determining and configuration (or after the data signal is generated), the terminal device sends a data stream from a MAC and higher layer to the network device by using a physical uplink shared channel (physical uplink shared channel, PUSCH).

In this embodiment of this application, a plurality of times of channel measurement are performed by using a plurality of sounding signals that carry and do not carry OAM, a location of an OAM propagation axis is estimated by using a sounding signal that carries circularly polarized OAM, and a beamforming direction is selected. Then, a joint transceiving combination manner of MIMO and OAM is selected based on a channel response feature of the sounding signal. Finally, an OAM mode and a power factor are negotiated and configured by using control signaling exchanged between a transmit end and a receive end. Therefore, space-domain independence and uncorrelatedness can be actively constructed at the transmit end based on OAM, without depending on space-domain independence and uncorrelatedness of multipath reflection, scattering, and diffraction generated in a surrounding environment, to increase a rank of a channel matrix in a mobile scenario, and improve spectral efficiency of wireless communication.

Embodiment 4

Figure 13:
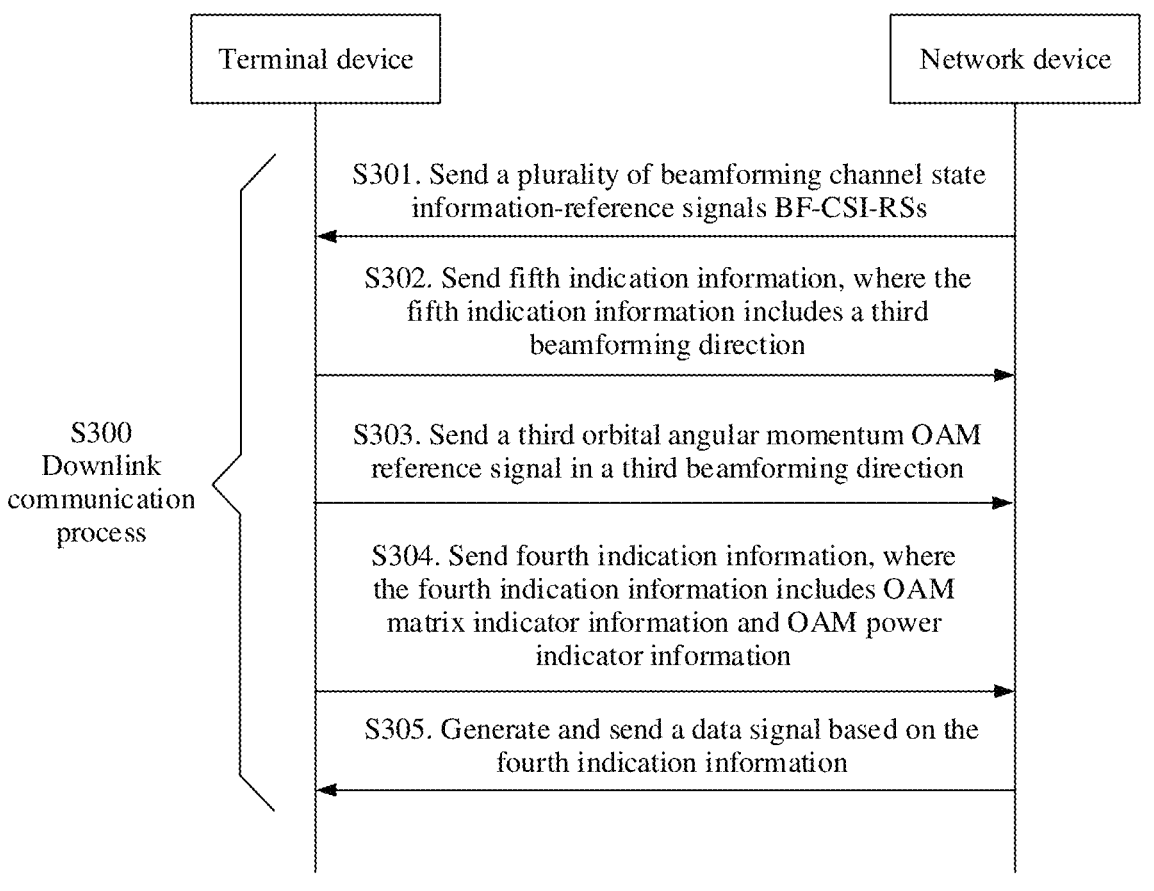
FIG. 13 is a schematic flowchart of a downlink communication process according to an embodiment of this application.

In Embodiment 4 of this application, a downlink communication process (S300) between a network device and a terminal device is described. Specifically, FIG. 13 is a schematic flowchart of a downlink communication process according to an embodiment of this application. As shown in FIG. 13, the uplink communication process provided in this embodiment of this application includes but is not limited to the following steps.

S301. The network device sends a plurality of beamforming channel state information-reference signals BF-CSI-RSs to the terminal device.

Specifically, the network device sends, to the terminal device in M beamforming directions supported by a spatial filter of the network device, M plane waves such as a BF-CSI-RS$_1$, a BF-CSI-RS$_2$, . . . , and a BF-CSI-RS$_M$ that do not carry OAM. One BF-CSI-RS is sent in one beamforming direction. The M BF-CSI-RSs may be sent by using a same timeslot and a same frequency, or may be sent by using different timeslots and a same frequency, or may be sent by using a same timeslot and different frequencies. Optionally, an orthogonal sequence such as a Gold sequence may be used for a sending sequence of the BF-CSI-RS. It may be understood that, in actual application, another sequence may be used. This is not limited in this embodiment of this application.

S302. The terminal device sends fifth indication information to the network device, where the fifth indication information includes a third beamforming direction.

Specifically, the fifth indication information may be a channel state information-resource indicator (CSI resource indicator, CSI-RI). The terminal device estimates, by listening to the plurality of BF-CSI-RSs, channel state information that is of a downlink communication link from the network device to the terminal device and that exists when the plane wave does not carry OAM. Then, the terminal device may notify, by using the CSI-RI, the network device of a BF-CSI-RS that is in a specific beamforming direction and that is selected by a network from the plurality of BF-CSI-RSs in current communication. In a subsequent downlink communication process, the network device preferably sends a signal by using a specified spatial filter solution. Herein, the spatial filter solution includes a beamforming direction (namely, the third beamforming direction) during next sending. In addition, the terminal device further feeds back, to the network device, an L1-RSRP corresponding to each BF-CSI-RS.

S303. The network device sends a third OAM reference signal to the terminal device in the third beamforming direction.

Specifically, the third OAM reference signal may be an OAM-RS. The third OAM reference signal may be borne on a composite beam of a linearly polarized beam and an OAM beam. The network device uses the specified spatial filter solution and the third beamforming direction to replace the plane wave that does not carry OAM with a vortex wave that carries an OAM mode n, then sequentially modulates an OAM-RS in an n$^{th}$ mode to the vortex wave in a polling manner, and sends an OAM-RS$_n$ vortex wave to the terminal device in different timeslots in a polling manner. A value range of the mode n may be an integer between $(-N_M/2)$, . . . , 0, . . . , $N_M/2$. An OAM mode 0 may represent a plane wave that does not carry OAM.

S304. The terminal device sends fourth indication information to the network device, where the fourth indication information includes OAM matrix indicator information and OAM power indicator information.

Specifically, the terminal device sends fourth indication information to the network device based on a channel response of the BF-CSI-RS and/or a channel response of the third OAM reference signal. The fourth indication information includes but is not limited to an RI, a PMI, an OMI, or an OPI.

S305. The network device generates and sends a data signal based on the fourth indication information.

Specifically, an equivalent channel determining module of the network device comprehensively determines, by using the fourth indication information (the RI, PMI, OMI, and OPI information) received in step S304 and based on a downlink channel response obtained based on the fifth indication information received in step S302, whether to use PMI, OMI, and OPI solutions recommended by the terminal device. If determining to use the PMI, OMI, and OPI solutions recommended by the terminal device, the network device may send the PMI information to a precoding weight matrix module of the terminal device, and may send the OMI and OPI information to a mode and power factor module of the terminal device, to generate a data signal. If determining not to use the PMI, OMI, and OPI solutions recommended by the terminal device, the equivalent channel determining module of the terminal device locally recalculates more appropriate PMI, OMI, and OPI solutions, then separately sends locally generated PMI information to a precoding weight matrix module of the terminal device, and sends OMI and OPI information to a mode and power factor module of the terminal device, to generate a data signal. After the equivalent channel determining module of the network device completes determining and configuration (or after the data signal is generated), the network device sends a data stream from a MAC and higher layer to the terminal device by using a physical downlink shared channel (physical downlink shared channel, PDSCH).

In this embodiment of this application, a plurality of times of channel measurement are performed by using a plurality of sounding signals that carry and do not carry OAM. Then, a joint transceiving combination manner of MIMO and OAM is selected based on a channel response feature of the sounding signal. Finally, an OAM mode and a power factor are negotiated and configured by using control signaling exchanged between a transmit end and a receive end. Therefore, space-domain independence and uncorrelatedness can be actively constructed at the transmit end based on OAM, without depending on space-domain independence and uncorrelatedness of multipath reflection, scattering, and diffraction generated in a surrounding environment, to increase a rank of a channel matrix in a mobile scenario, and improve spectral efficiency of wireless communication.

Embodiment 5

In Embodiment 5 of this application, a negotiation process (S400) of a joint transceiving manner of MIMO and OAM between a network device and a terminal device is described. The joint transceiving manner of MIMO and OAM is negotiated, so that a combination manner of MIMO and OAM can be changed based on a change of a radio channel, to improve communication efficiency.

Figure 14:
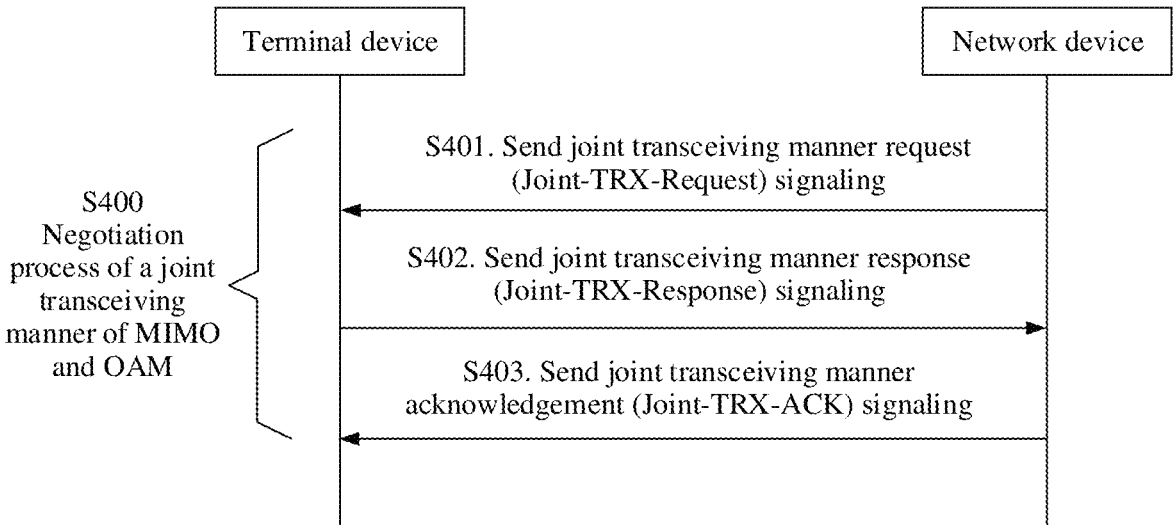
FIG. 14 is a schematic flowchart of a negotiation process of a joint transceiving manner of MIMO and OAM according to an embodiment of this application.

FIG. 14 is a schematic flowchart of a negotiation process of a joint transceiving manner of MIMO and OAM according to an embodiment of this application. As shown in FIG. 14, the negotiation process of the joint transceiving manner of MIMO and OAM provided in this embodiment of this application includes but is not limited to the following steps.

S401. The network device sends joint transceiving manner request (Joint-TRX-Request) signaling to the terminal device.

Specifically, the network device sends the joint transceiving manner request signaling to the terminal device, to recommend a transmit-end communication module configuration manner and a receive-end communication module configuration manner. Herein, the communication module configuration manner is specifically different combination manners of a MIMO transceiver module and an OAM transceiver module.

S402. The terminal device sends joint transceiving manner response (Joint-TRX-Response) signaling to the network device.

Specifically, the terminal device sends the joint transceiving manner response signaling to the network device, to agree with or reject the communication module configuration manner recommended in the Joint-TRX-Request signaling. If the Joint-TRX-Response signaling indicates to agree with the communication module configuration manner recommended in the Joint-TRX-Request signaling, the terminal device locally completes configuration of a MIMO decoding module and an OAM mode demodulation module of a receive end. If the Joint-TRX-Response signaling indicates to reject the communication module configuration manner recommended in the Joint-TRX-Request signaling, the network device may re-initiate a negotiation process, and re-recommend a transmit-end communication module configuration manner and a receive-end communication module configuration manner.

S403. The network device sends joint transceiving manner acknowledgement (Joint-TRX-ACK) signaling to the terminal device.

Specifically, if the Joint-TRX-Response signaling received by the network device carries agreement information, the network device locally completes configuration of a MIMO precoding module and an OAM mode modulation module of a transmit end. If the Joint-TRX-Response signaling received by the network device carries rejection information, the current negotiation process fails. After receiving the Joint-TRX-Response signaling, the network device may send the joint transceiving manner acknowledgement signaling to the terminal device, to acknowledge/respond that the network device has received the Joint-TRX-Response signaling.

It may be understood that, in FIG. 14, that the network device initiates negotiation is merely used as an example. In actual application, the terminal device may initiate the negotiation process. A party that initiates negotiation is not limited in this embodiment of this application.

Optionally, the negotiation process (S400) of the joint transceiving manner of MIMO and OAM may occur after step S206 and before step S207 of the uplink communication process (S200), and the network device initiates the negotiation process. Alternatively, the negotiation process may occur after step S303 and before step S304 of the downlink communication process (S300), and the terminal device initiates the negotiation process. Alternatively, the network device or the terminal device may temporarily initiate the negotiation process in any communication process based on an actual requirement, to dynamically adapt to the change of the radio channel to change the combination manner of MIMO and OAM.

Optionally, the negotiation process (S400) of the joint transceiving manner of MIMO and OAM may occur before an uplink or downlink communication process, and then the (S200) or (S300) process is executed after negotiation is completed.

In this embodiment of this application, communication modules of the transmit end and the receive end are configured by using the negotiation process of the joint transceiving manner of MIMO and OAM, so that data can be sent/received in different transceiving manners in different radio channel environments, to improve communication quality.

Embodiment 6

It may be understood that, to facilitate better understanding of the technical solutions provided in this application, the following uses an uplink communication process as an example to further describe the communication method provided in this application. Certainly, for an implementation of a downlink communication process, refer to descriptions of the uplink communication process in this application. Details are not described in this application.

It is assumed that a communication scenario in this embodiment of this application is as follows: Wireless communication coverage is performed in a large ladder classroom environment whose length, width, and height are 20 m×20 m×5 m. On a ceiling of the ladder classroom, 200×200 spatial locations are evenly marked at 10 cm intervals based on a rectangular grid geometric topology (shown by (2) in FIG. 9). A "cross" shaped dual polarization antenna element is mounted at each spatial location. All antenna elements jointly form a physical antenna array of a network side/network device. A student user sits in the classroom, and uses a laptop computer, a tablet computer, or a smartphone to connect to a wireless network by using the network device. The terminal device lies flat on the desktop and faces upward for most of the time, and there is a large probability that a screen faces the ceiling without being shielded. The student user is in a still state or a slow movement state in the classroom. It is assumed that both the network device and the terminal device can send and receive a plane wave and a vortex wave.

In an initialization process, the network device obtains a global coordinate system (GCS) of an entire wireless coverage area (the ladder classroom) by using manual input of an engineer or a laser ranging radar or in another manner, and stores the GCS of the entire wireless coverage area into a spatial information database on the network side. The network device periodically broadcasts common information of the network device by using a physical broadcast channel (physical broadcast channel, PBCH), and the information includes but is not limited to a primary synchronization signal (PSS), a secondary synchronization signal (SSS), and a system information block (SIB). One or more terminal devices implement clock synchronization with the network device by listening to the signal such as the PSS and the SSS, and then complete a random access process by using a physical random access channel (PRACH). Subsequently, the one or more terminal devices continuously listen to a cell-specific reference signal (Cell-specific reference signal, CRS) periodically broadcast by the network device. The network device notifies all the terminal devices of "an OAM mode set supported by the network device" by using downlink broadcast information. The terminal device also notifies the network device, accessed by the terminal device, of "an OAM mode set supported by the terminal device" by using terminal capability reporting signaling or the like.

In the initialization process, the terminal device further implements a beamforming effect by using a spatial filter of the terminal device, and sends, a plurality of times in different beamforming directions, a positioning sounding signal (PRS) that carries identity information of the terminal device, so that the signal (the positioning sounding signal PRS) is irradiated on a same spatial region or different spatial regions of the physical antenna array of the network device. The network device obtains angles of arrival (AOA) and/or times of arrival (TOA) of the plurality of PRSs through listening, and estimates spatial location information of the terminal device by using an AoA positioning algorithm and/or a ToA positioning algorithm. After the network device obtains the spatial location information of the terminal device, the network device stores the spatial location information of the terminal device into the spatial location database on the network side. In addition, the network device feeds back the spatial location information of the terminal device to the terminal device by using a radio channel, for example, notifies the terminal device of "a local global coordinate system (local global coordinate system, LCS) of the terminal device in the coverage area of the network device".

Optionally, when a location of the terminal device moves, the terminal device may actively send a PRS signal to trigger a spatial positioning and feedback process, or the network device may indirectly listen to a non-PRS signal (for example, uplink communication data) from the terminal device to complete a spatial positioning and feedback process, and refresh the location information of the terminal device that is stored in the spatial database on the network side. Further, optionally, the network device may perform continuous location estimation on the terminal device by using a plurality of time periods, to complete estimation of an average motion speed and a motion track of the terminal device, and store an estimated result into the spatial location database on the network side, so as to assist in scheduling and decision-making in subsequent communication performed by using an OAM vortex wave.

Figure 15:
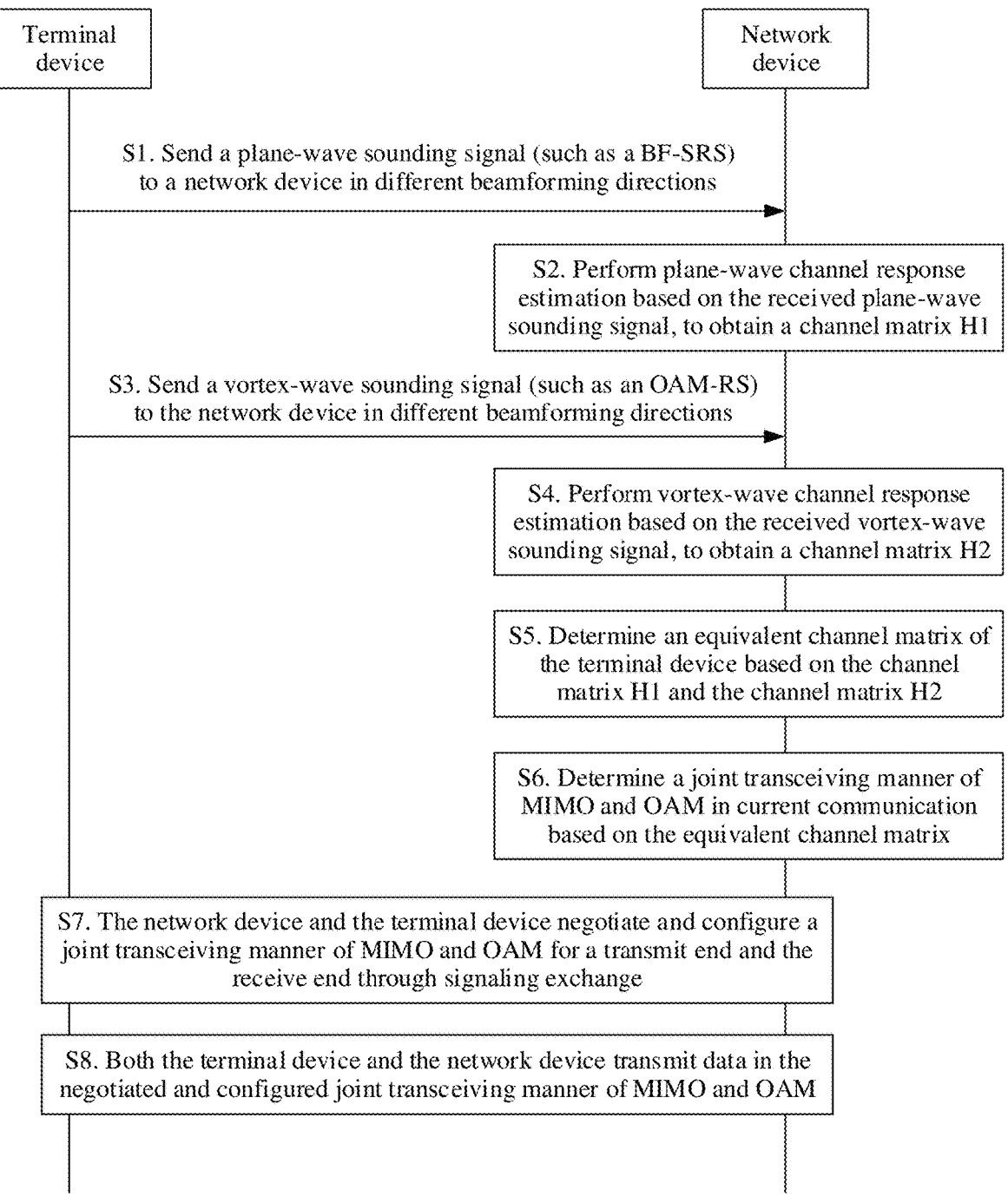
FIG. 15 is a schematic flowchart of a communication method according to an embodiment of this application.

FIG. 15 is a schematic flowchart of a communication method according to an embodiment of this application. As shown in FIG. 15, the communication method provided in this embodiment of this application includes but is not limited to the following steps.

S1. A terminal device sends a plane-wave sounding signal (such as a BF-SRS) to a network device in different beamforming directions.

S2. The network device performs plane-wave channel response estimation based on the received plane-wave sounding signal, to obtain a channel matrix H1.

Specifically, the terminal device separately sends, in all (or a part of) beamforming directions that can be supported by a spatial filter of the terminal device, the plane-wave sounding signal that does not carry OAM, for example, the BF-SRS. The network device estimates a plane-wave channel response of an uplink channel by listening to the BF-SRS, to obtain the channel matrix H1. Optionally, the network device may determine, by using the channel matrix H1, a quantity M1 of logical antenna ports that are between the terminal device and the network device and that can be supported based on a plane wave, and a quantity $N_{L1}$ of layers of data streams that are of MIMO precoding and that are best supported based on the plane wave. The network device may further estimate a multipath quantity, intensity, and delay information of a plane-wave radio channel between the terminal device and the network device by listening to spreading of an angle of arrival of the BF-SRS, intensity of a multipath impulse response, and a time interval of the multipath impulse response.

S3. The terminal device sends a vortex-wave sounding signal (such as an OAM-RS) to the network device in different beamforming directions.

S4. The network device performs vortex-wave channel response estimation based on the received vortex-wave sounding signal, to obtain a channel matrix H2.

Specifically, the terminal device sequentially sends, in all (or a part of) beamforming directions that can be supported by the local spatial filter of the terminal device, vortex-wave sounding signals that carry different OAM modes (for example, OAM modes #1, #2, . . . , #$N_M$), for example, the OAM-RS. The network device estimates a vortex-wave channel response of an uplink channel by listening to the OAM-RS, to obtain the channel matrix H2. Optionally, the network device may determine, by using the channel matrix H2, a quantity M2 of logical antenna ports that are between the terminal device and the network device and that can be supported based on a vortex wave, and a quantity $N_{L2}$ of layers of parallel data streams that are best supported based on the vortex wave. The network device may further estimate a multipath quantity, intensity, and delay information of a vortex-wave radio channel between the terminal device and the network device, and phase noise and crosstalk noise of the radio channel on the OAM vortex wave by listening to spreading of an angle of arrival of the OAM-RS, intensity and a time interval of a multipath impulse response, and signal interference between different OAM modes.

The OAM mode #1 may not be equal to a mode +1, but refers to the first element in an OAM mode set supported by the terminal device. It may be understood that, in all embodiments of this application, it is assumed that the plane wave is equivalent to a mode 0 of the OAM vortex wave, and the mode 0 always belongs to an element in OAM mode sets supported by the terminal device and the network device. To be specific, for any terminal device, no matter how bad a radio channel condition is, an OAM mode set that can be supported by the terminal device is not empty, and includes at least one set element: a mode 0 (plane wave). It may be further understood that values of OAM modes #1 in OAM mode sets supported by different terminal devices may be the same or different. To be specific, quantities and values of elements in OAM mode sets supported by different terminal devices may be different. In this embodiment of this application, the OAM mode set that can be supported by the network device includes a maximum intersection set of OAM mode sets that can be supported by all terminal devices that access the network device.

Optionally, the terminal device and the network device may estimate, by using a composite sounding waveform of circular polarization and an OAM vortex wave, a mapping location of an OAM propagation axis on a plane on which a physical antenna array of a receive end is located. For a specific process of estimating the location of the OAM propagation axis, refer to the following Embodiment 7. Details are not described in this embodiment of this application.

Optionally, the network device may also select and configure a receive antenna by listening to the OAM-RS, to improve a signal-to-noise ratio (signal-to-noise ratio, SNR)

or a signal-to-interference-plus-noise ratio (signal-to-interference-plus-noise ratio, SINR) of a received signal.

Optionally, in addition to obtaining the vortex-wave channel response (or the channel matrix H2) through measurement by listening to the OAM-RS, the network device may further obtain the vortex-wave channel response (or the channel matrix H2) through electromagnetic calculation based on a mathematical expression of an OAM waveform and by using prior information (such as spatial location information) stored in a spatial information database on a network side. For a specific process in which the network device obtains the vortex-wave channel response (or the channel matrix H2) through electromagnetic calculation, refer to the following Embodiment 8. Details are not described in this embodiment of this application. It may be understood that the channel responses obtained through electromagnetic calculation and OAM-RS measurement may be mutually referenced and combined to obtain a final vortex-wave channel response.

In this embodiment of this application, the spatial location information is obtained through measurement in an initialization process, and electromagnetic calculation is performed in a subsequent process based on the spatial location information obtained through measurement, to obtain the channel response of the OAM vortex wave. This can reduce signaling overheads that are of the sounding signal such as the BF-SRS or the OAM-RS and that are required by a system.

S5. The network device determines an equivalent channel matrix of the terminal device based on the channel matrix H1 and the channel matrix H2.

S6. The network device determines a joint transceiving manner of MIMO and OAM in current communication based on the equivalent channel matrix.

Specifically, the network device determines the equivalent channel matrix of the terminal device based on the channel matrix H1 and the channel matrix H2, and obtains the multipath quantity, the intensity, and the delay information that correspond to each of the plane wave and the vortex wave. In addition, the network device may compare the quantity $N_{L1}$ of layers of data streams that are of MIMO precoding and that can be supported by the plane wave with the quantity $N_{L2}$ of layers of parallel data streams that can be supported by the vortex wave, to determine the joint transceiving manner of MIMO and OAM in current communication. Herein, a possible transceiving manner combination is shown in the following Table 1. An optional set of sending manners includes MIMO sending, OAM sending, and joint sending of MIMO+OAM. An optional set of receiving manners includes MIMO receiving, OAM receiving, and joint receiving of MIMO+OAM. A selection basis of different sending manners may be selecting a sending manner with a maximum transmission throughput. Based on a wireless communication principle, a main factor for determining a throughput includes a quantity $N_L$ of layers of data streams and an RSRP corresponding to each layer, and the information has been obtained by using the foregoing steps. For a specific process of determining the joint transceiving manner of MIMO and OAM based on the equivalent channel model, refer to the following Embodiment 9. Details are not described in this embodiment of this application.

TABLE 1

| Combination set of joint transceiving manners of MIMO and OAM | | | |
| --- | --- | --- | --- |
| | MIMO receiving | OAM receiving | Joint receiving of MIMO + OAM |
| MIMO sending | (1, 1) | / | / |
| OAM sending | / | (2, 2) | (2, 3) |
| Joint sending of MIMO + OAM | / | / | (3, 3) |

In a possible implementation, the combination set of joint transceiving manners of MIMO and OAM includes the combination manner shown in the foregoing Table 1, and may also include MIMO sending and joint receiving of MIMO+OAM.

In this embodiment of this application, the vortex-wave channel response is obtained through measurement by using the sounding signal that carries OAM, and then an optimal joint transceiving manner of MIMO and OAM is dynamically selected based on the equivalent channel matrix, so that switching between a plurality of combination manners such as independent MIMO sending/receiving, independent OAM sending/receiving, and joint sending/receiving of MIMO+OAM is allowed. Therefore, the joint transceiving manner of MIMO and OAM can be dynamically adjusted based on a change of the radio channel, a channel capacity can be maximized, and communication spectral efficiency can be improved.

It may be understood that the network device may directly obtain uplink channel information by using the BF-SRS and the OAM-RS. For a method for obtaining downlink channel information, the network device may directly estimate the downlink channel information by using the uplink channel information on the premise that uplink and downlink channels are reciprocal. Alternatively, the network device may actively send a BF-CSI-RS and an OAM-RS to the terminal to obtain the downlink channel information. In this embodiment of this application, to simplify and clearly describe a main process, it is assumed that the premise that the uplink and downlink channels are reciprocal is established. In this case, the downlink channel information is directly estimated by using the uplink channel information. For a more detailed process of obtaining the downlink channel information based on the BF-CSI-RS and the OAM-RS, refer to descriptions of the downlink communication process in the foregoing Embodiment 4. Details are not described herein again.

S7. The network device and the terminal device negotiate and configure a joint transceiving manner of MIMO and OAM for a transmit end and the receive end through signaling exchange.

Specifically, the network device and the terminal device complete the negotiation process between the transmit end and the receive end by using three pieces of signaling such as Joint-TRX-Request signaling, Joint-TRX-Response signaling, and Joint-TRX-ACK signaling. For a specific process, refer to descriptions of the negotiation process in the foregoing Embodiment 5. Details are not described herein again. Then, the network device and the terminal device complete, by using RI, PMI, OMI, and OPI signaling, an information exchange and configuration process of a MIMO precoding codebook and/or an OAM parameter of a corresponding sending manner.

It may be understood that the joint transceiving manner of MIMO and OAM determined by the network device in step S6 may be different from or the same as the joint transceiving manner of MIMO and OAM negotiated by the network device and the terminal device through signaling exchange.

S8. Both the terminal device and the network device transmit data in the negotiated and configured joint transceiving manner of MIMO and OAM.

Specifically, the terminal device and the network device transmit service data by using PUSCH and PDSCH channels and based on the joint transceiving manner of MIMO and OAM and codebook parameter configuration that are selected by the network device in step S6. For a signal processing process during sending/receiving in different joint transceiving manners of MIMO and OAM, refer to the following Embodiment 10. Details are not described in this embodiment of this application.

Optionally, when a location of the terminal device moves or transmission performance of the service data decreases significantly, the foregoing step S1 to step S6 may be repeatedly performed, to re-select a joint transceiving manner of MIMO and OAM for data transmission.

In this embodiment of this application, the OAM vortex wave is introduced into the sounding signal, to increase space-domain independence and uncorrelatedness of subchannels between different antenna element pairs of the terminal device and the network device, and increase a quantity of logical antenna ports and a quantity of layers of parallel data streams of the radio channel between the terminal device and the network device, so as to obtain a better rank of a channel matrix and higher spectral efficiency than that in LOS-MIMO. In this embodiment of this application, the joint transceiving manner of MIMO and OAM such as the transceiving manners (2, 3) and (3, 3) in Table 1 or the manner of MIMO sending and joint receiving of MIMO+OAM is further introduced between the transmit end and the receive end. This may improve a receiving effect in a non-ideal condition such as axis misalignment between antenna arrays of the transmit end and the receive end, to support vortex-wave communication in a mobile scenario.

Embodiment 7

In Embodiment 7 of this application, the method for estimating a location of an OAM propagation axis and the method for using spatial location information that are mentioned in the foregoing Embodiment 6 are described in detail. It may be understood that the location of the OAM propagation axis mentioned in this embodiment of this application is a mapping spatial location of the OAM propagation axis on a plane on which a physical antenna array of a receive end is located.

For ease of understanding, in Embodiment 7 of this application, it is assumed that a physical antenna array of a terminal device is a rectangular grid topology structure (shown by (2) in FIG. 9). It is assumed that the terminal device includes M rows and N columns of "cross" shaped dual polarization antenna elements. Spacings between every two adjacent elements in the M rows are equal, and are denoted as $d_m$. Spacings between two adjacent elements in the N columns are equal, and are denoted as $d_n$. Specific values of $d_m$ and $d_n$ may be equal, or may not be equal. In an $m^{th}$ row and an $n^{th}$ column, a vertical polarization element (element of vertical polarization element) is denoted as $e_v(m, n)$, and a horizontal polarization element (element of horizontal polarization) is denoted as $e_h(m, n)$.

As a transmit end, the terminal device sends a composite sounding waveform of left-hand circular polarization (LHCP) and an OAM vortex wave in a specified beamforming direction. A network device estimates, by obtaining an electric field vector direction of the composite sounding waveform through listening, a mapping spatial location of an OAM propagation axis on a plane in which a physical antenna array of a receive end is located.

(1) To generate an LHCP waveform, an excitation electric fields of the elements $e_v(m, n)$ and $e_h(m, n)$ at a moment t are respectively shown in the following Formulas (2-1) and (2-2):

$$E_v(m, n) = x(t) \cdot \sin(\omega_0 t + \varphi_{m,n}) \qquad (2-1)$$

$$E_h(m, n) = x(t) \cdot \sin(\omega_0 t + \varphi_{m,n}) \qquad (2-2)$$

where $\omega_0$ represents an angular frequency of a carrier, $\varphi_{m,n}$ represents initial phases of the horizontal and vertical polarization antenna elements in the $m^{th}$ row and the $n^{th}$ column, and x(t) represents a training sequence or user data that is sent at the moment t. If an LHCP plane wave that does not carry OAM is generated, initial phases of antenna elements in all the M rows and N columns may be set as follows: $\varphi_{m,n}=0$. Optionally, a Gold sequence that includes identity information of the terminal device may be used for the training sequence x(t) used to estimate the location of the OAM propagation axis.

(2) To further superpose a vortex wave in an OAM mode k on the basis of the LHCP waveform to obtain a composite sounding waveform, initial phases of the horizontal and vertical polarization antenna elements in the $m^{th}$ row and the $n^{th}$ column in the OAM mode k are denoted as $\varphi^k_{m,n}$. Herein, a superscript k represents the OAM mode k, and a subscript m, n represents the $m^{th}$ row and the $n^{th}$ column. Specifically, the terminal device generates the OAM mode k based on the M rows and N columns of antenna elements of the rectangular grid topology structure, and sets the OAM propagation axis to be at a center location of a rectangle of the physical antenna array of the transmit end. In this case, the initial phases of the elements $e_v(m, n)$ and $e_h(m, n)$ in the OAM mode k are shown in the following Formula (2-3):

$$\varphi^k_{m,n} = k \cdot \arctan\left[\frac{\left(n - 1 - \frac{N-1}{2}\right)d_n}{\left(m - 1 - \frac{M-1}{2}\right)d_m}\right] \qquad (2-3)$$

where arctan(*) represents an inverse tangent function of a trigonometric function, M represents a total quantity of rows, N represents a total quantity of columns, m, n represents the antenna elements in the $m^{th}$ row and the $n^{th}$ column, k represents an OAM mode value, $\varphi^k_{m,n}$ represented in Formula (2-3) is substituted in the foregoing Formulas (2-1) and (2-2) to replace $\varphi_{m,n}$, so that the composite sounding waveform of LHCP and the OAM mode k can be generated.

(3) Because the composite sounding waveform generated by using the foregoing Formulas (2-1), (2-2), and (2-3) has no additional beamforming direction, a propagation direction of the composite sounding waveform is perpendicular to a plane of the antenna array of the transmit end, and is outward. A feasible beamforming method for an antenna array with a rectangular grid topology structure is shown in the following Formula (2-4):

$$a_{m,n}(\theta, \psi) = e^{-j \cdot k_0 \cdot \sin\theta \cdot \sin\psi \sqrt{(m \cdot d_m)^2 + (n \cdot d_n)^2}} \qquad (2\text{-}4)$$

where $\theta$ is a spherical coordinate elevation angle of a target direction relative to a center location of a rectangle, $\psi$ is a spherical coordinate azimuth of the target direction relative to the center location of the rectangle, $k_0=2\pi/\lambda$ represents a wave number (wave number) of a carrier, $\lambda$ represents a wavelength (wavelength) of a carrier, m, n represents the antenna elements in the $m^{th}$ row and the $n^{th}$ column, $d_m$ and $d_n$ represent a row spacing and a column spacing between adjacent elements, $\alpha_{m,n}(\theta, \psi)$ represents a weight coefficient of a steering vector (steering vector) on the antenna elements in the $m^{th}$ row and the $n^{th}$ column, and $a_{m,n}(\theta, \psi)$ is also a weighting coefficient used to point to a direction $(\theta, \psi)$ in beamforming.

In conclusion, based on Formulas (2-1) to (2-4), the composite sounding waveform that is sent by the terminal device as the transmit end in a specified beamforming direction and that is of left-hand circular polarization (LHCP) and the OAM vortex wave is shown in the following Formulas (2-5) and (2-6):

$$E_v(m, n) = x(t) \cdot \sin(\omega_0 t + \varphi_{m,n}^k) \cdot a_{m,n}(\theta, \psi) \qquad (2-5)$$

$$E_h(m, n) = x(t) \cdot \sin(\omega_0 t + \varphi_{m,n}^k) \cdot a_{m,n}(\theta, \psi) \qquad (2-6)$$

It is assumed that $N_T=N_R=M \cdot N=64$ for the terminal device, where M=N=8. It is assumed that $N_T=N_R=40000$ for the network device, where M=N=200. The foregoing specific operation of generating the composite sounding waveform by using Formula (2-5) and Formula (2-6) is completed by a spatial filter module and $N_T$ physical antennas of the terminal device. Then, the composite sounding waveform is sent to a radio channel, and $N_R$ physical antennas and a spatial filter module of the network device complete a receiving action.

Figure 16:
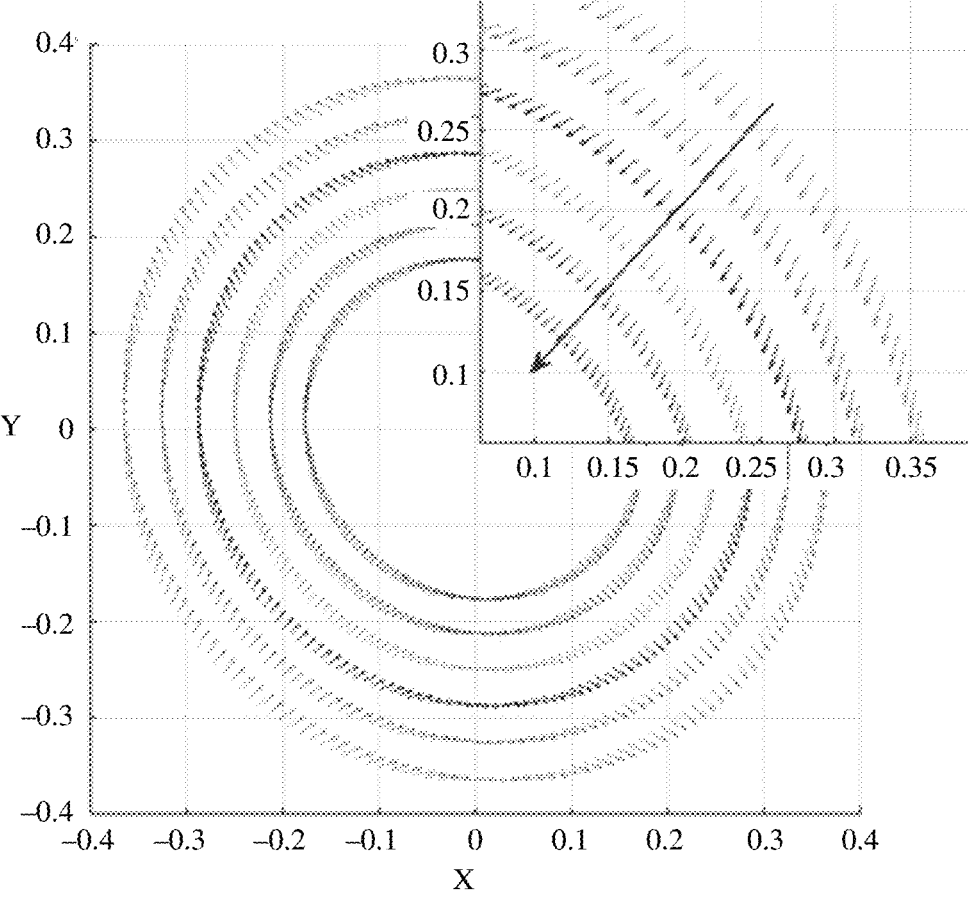
FIG. 16 is a schematic diagram of electric field vector distribution of a composite sounding waveform of LHCP waveform and a vortex wave that carries in an OAM mode +1 according to an embodiment of this application.

For example, FIG. 16 is a schematic diagram of electric field vector distribution of a composite sounding waveform of LHCP and a vortex wave in an OAM mode +1 according to an embodiment of this application. FIG. 16 shows electric field vector direction distribution of an incident cross section of an electromagnetic wave to which the receive end listens for the composite sounding waveform of LHCP and a vortex wave in an OAM mode +1. A direction pointed by each arrow in FIG. 12 represents an electric field vector direction obtained through listening by "cross" shaped dual polarization antenna elements at a spatial location of the $m^{th}$ row and the $n^{th}$ column. A method for calculating an electric field vector direction $\beta_{m,n}$ at spatial locations of the antenna elements in the $m^{th}$ row and the $n^{th}$ column is shown in the following Formula (2-7):

$$\beta_{m,n} = \arcsin\left(\frac{E_v^r(m, n)}{E_h^r(m, n)}\right) \qquad (2-7)$$

where $E_v^r(m, n)$ and $E_h^r(m, n)$ respectively represent electric field responses received by a vertical polarization element and a horizontal polarization element in an $m^{th}$ row and an $n^{th}$ column of the receive end.

The network device listens to the composite sounding waveform from the terminal device, and obtains, through calculation by using the foregoing Formula (2-7), an electric field vector distribution diagram at spatial locations of $N_R$ physical antennas that is shown in FIG. 16. Then, the spatial filter module of the network device searches the electric field vector distribution diagram for coordinate values that correspond to a spatial location (m, n) and that have a same $\beta_{m,n}$ value, and connects at least two adjacent spatial locations (m, n) and (m', n') that have a same $\beta$ value (or an error is less than a preset threshold) to form a straight line. The network device obtains at least two non-parallel straight lines through searching and connection by using different $\beta$ values. Then, the network device obtains an intersection point P of extension lines of the at least two straight lines, and uses a spatial location of the intersection point P as the mapping spatial location that is estimated for the composite sounding wave and that is of the propagation axis of the composite sounding waveform in the OAM mode k on the plane on which the physical antenna array of the network device is located.

Optionally, after determining the location of the OAM propagation axis, the network device may store the spatial location information of the propagation axis of the composite sounding waveform in the OAM mode k into a spatial location database on a network side.

Optionally, the network device may notify the terminal device of the spatial location of the OAM propagation axis by using feedback signaling.

Optionally, in a process in which the network device obtains, through calculation, the electric field vector distribution diagram shown in FIG. 16, the network device may further obtain electric field power strength distribution information of the OAM mode k received by antenna elements at all spatial locations (m, n) from the terminal device. The network device may also store the electric field power strength distribution information of the OAM mode k into the spatial location database on the network side, and use the information as reference information for subsequently selecting and configuring a physical antenna of the receive end.

In this embodiment of this application, in the method for estimating a location of an OAM propagation axis by using a composite sounding waveform of circular polarization and an OAM vortex wave, good axis estimation accuracy can be obtained, and an actual axis location may not be required to fall within a range of a physical antenna array to enable the method to effectively work, so that algorithm robustness is good. In this embodiment of this application, a physical feature that an energy hole is unique to the location of the propagation axis of the OAM vortex wave and a power density diffusion speed of the vortex wave is greater than that of the plane wave is used, to accurately estimate the location of the OAM propagation axis. This may improve an SNR or an SINR of the receive end, and therefore improve a transmission rate and a throughput of an entire system.

Embodiment 8

In Embodiment 8 of this application, the specific process, mentioned in the foregoing Embodiment 6, of obtaining a vortex-wave channel response (or a channel matrix H2) through electromagnetic calculation is described in detail.

In Embodiment 8 of this application, it is assumed that in an initialization process and a process of estimating a location of an OAM propagation axis in the foregoing Embodiment 7, a network device has fully obtained spatial location information in a wireless coverage area, and the information includes but is not limited to the following information: a deployment location of a physical antenna of the network device, a location of a terminal device in the wireless coverage area, and a mapping spatial location that is of a propagation axis of a composite sounding waveform, in an OAM mode k, sent by the terminal device and that is on a plane on which a physical antenna array of the network device is located. For ease of description, the mapping spatial location of the propagation axis on the plane on which the physical antenna array of the network device is located is referred to as an axis mapping location below.

It may be understood that the "location" mentioned in this embodiment of this application is a spatial location.

In Embodiment 8 of this application, a linearly polarized OAM vortex wave is used to perform signaling interaction and data transmission. When the location of the propagation axis needs to be estimated, a circularly polarized waveform is superposed on the OAM vortex wave. Therefore, in Embodiment 8 of this application, a method for obtaining a channel response of a linearly polarized OAM vortex wave by using an electromagnetic calculation method is mainly described. Regardless of using the terminal device or the network device as a transmit end of the OAM vortex wave, the electromagnetic calculation method is the same. Therefore, for ease of description in Embodiment 8 of this application, the transmit end is not distinguished between the terminal device and the network device in Embodiment 8 of this application. Only a "calculation end" is used to refer to an execution body of the electromagnetic calculation process.

Optionally, in Embodiment 8 of this application, it is assumed that electromagnetic calculation priori information known by the calculation end includes but is not limited to the following information: an OAM mode k and a mode beam divergence angle $\zeta_k$ corresponding to the OAM mode k, a wave number $k_0$ of a carrier, and a relative spatial location (r, θ, ψ) between a transmit antenna ($r_0$, $\theta_0$, $\psi_0$) and a receive antenna ($r_0$+r, $\theta_0$+θ, $\psi_0$+ψ). The relative spatial location includes information such as a distance r, an elevation angle θ, and an azimuth ψ. A feasible electromagnetic calculation manner of the channel response of the OAM vortex wave is shown in the following Formula (2-8):

$$E_{k,\zeta_k}(r, \theta, \psi) = \tag{2-8}$$
$$\mu \cdot J_k(k_0 \cdot r \cdot \sin\theta \cdot \sin\zeta_k) \cdot e^{j(k_0 \cdot r \cdot \cos(\theta+\zeta_k)-\omega_0 t+k\psi)} \cdot e^{-j \cdot k_0 \cdot \sin\theta \cdot \sin\psi}$$

where $E_{k,\zeta_k}(r, \theta, \psi)$ represents an electric field response of a vortex wave with a mode k and a divergence angle $\zeta k$ at a relative spatial location (r, θ, ψ), and on the right of an equal sign of the foregoing Formula (2-8), the first item μ represents a fixed coefficient of large-scale channel fading, the second item $J_k(k_0 \cdot r \cdot \sin \theta \cdot \sin \zeta_k)$ represents electric field amplitude information of a Bessel function of the first kind of an order k at the relative spatial location (r, θ, ψ), the third item $e^{j(k_0 \cdot r \cdot \cos(\theta+\zeta_k)-\omega_0 t+k\psi)}$ represents electric field phase information of the vortex wave with the mode k and the divergence angle $\zeta k$ at the relative spatial location (r, θ, ψ), and the fourth item $e^{-j \cdot k_0 \cdot \sin \theta \cdot \sin \psi}$ represents correction phase information of a pointing angle (θ, ψ) in beamforming.

When a plurality of OAM modes are sent in parallel at the same time, it is assumed that combination information ($k_1$, $\zeta_{k_1}$) ($k_2$, $\zeta_{k_2}$), . . . , and ($k_N$, $\zeta_{k_N}$) is known. In this case, after combination and superposition, a channel response obtained through electromagnetic calculation is shown in the following Formula (2-9):

$$E(r, \theta, \psi) = \sum_{k \in \{k_n\}} E_{k,\zeta_k}(r, \theta, \psi) \tag{2-9}$$

where k∈ {$k_n$} indicates that k belongs to an OAM mode set sent in parallel.

It may be understood that the mode beam divergence angle $\zeta_k$ corresponding to the mode k is not necessarily a fixed value. For a mode k, there are several methods to adjust a divergence angle $\zeta_k$ corresponding to the mode k. A feasible method for adjusting a divergence angle $\zeta_k$ is to reduce $\zeta_k$ by increasing an area of a physical antenna array of the transmit end, for example, increasing a row quantity and a column quantity of a rectangular grid geometric topology of antenna elements used to transmit a signal, and to increase $\zeta_k$ by reducing the area of the physical antenna array of the transmit end, for example, reducing the row quantity and the column quantity of the rectangular grid geometric topology of the antenna elements used for transmission. Another feasible method for adjusting a divergence angle $\zeta_k$ is to add an additional convex lens in front of a physical antenna array of the transmit end, and then adjust the divergence angle by adjusting a refractive index of the convex lens.

Optionally, the channel responses obtained through electromagnetic calculation and OAM-RS measurement may be mutually referenced and combined to obtain a final vortex-wave channel response. After the calculation end obtains a plane-wave channel response H1 and a vortex-wave channel response H2 through measurement by using a sounding signal such as a BF-SRS, a BF-CSI-RS, or an OAM-RS, a method for obtaining a channel response by combining the measurement method and the electromagnetic calculation method described in this embodiment of this application includes:

1. A value of the first item u on the right of the equal sign of the foregoing Formula (2-8) is estimated by using the plane-wave channel response H1 obtained through measurement, that is, a large-scale channel fading coefficient of a radio channel is estimated by using a plane wave.

2. A channel elements $h_{q,p}$ of the vortex-wave channel response H2 obtained through measurement is used as a correction reference point of a channel response E (r, θ, ψ) obtained through electromagnetic calculation, where $h_{q,p}$ represents a channel response between a $p^{th}$ transmit antenna and a $q^{th}$ receive antenna. The calculation end knows the relative spatial location (r, θ, ψ) between the transmit antenna ($r_0$, $\theta_0$, $\psi_0$) and the receive antenna ($r_0$+r, $\theta_0$+θ, $\psi_0$+ψ), and the network device knows global spatial location information of the terminal device. The relative spatial location information is combined with the global spatial location information of the terminal device, so that global spatial location information of a receive antenna of the network device can be obtained, and the global spatial location information of the receive antenna can be converted into spatial location information of antenna elements in an $m^{th}$ row and an $n^{th}$ column of a physical antenna array with a rectangular grid topology structure. To be specific, E (r, θ, ψ) is converted into E (m, n) through spatial location mapping. A mapping relationship between the antenna elements (m, n) in the $m^{th}$ row and the $n^{th}$ column and the $q^{th}$ receive antenna of the channel element $h_{q,p}$ may be obtained by querying the spatial location database on the network side, so that the channel element $h_{q,p}$ can be used to correct the channel response E (m, n) that is from the terminal device to the network device and that is obtained through electromagnetic calculation.

Optionally, for a physical antenna array with a large quantity of antenna elements, in a process of obtaining a channel response through sounding signal measurement, there is no need to perform measurement once in each receive and transmit antenna element pair (q, p). In this embodiment of this application, to reduce measurement complexity, in this embodiment of this application, sounding signal measurement may be performed on a part of sparse antenna elements (a row spacing and a column spacing are large). For another antenna element in the middle, supplement is performed for completeness based on electromagnetic calculation and by using an interpolation algorithm, so that a large-scale matrix inversion calculation amount and a processing and calculation amount of a large quantity of wireless signals can be reduced.

In conclusion, in this embodiment of this application, a main idea of obtaining a channel response by combining electromagnetic calculation and OAM-RS signal measurement is as follows: Based on a result of electromagnetic calculation, the result of electromagnetic calculation is dynamically and slightly corrected by using a result of signal measurement.

In this embodiment of this application, the electromagnetic calculation method is used to estimate a basic channel response of an OAM vortex wave, and then a small quantity of sounding signals are measured to correct the basic channel response, to finally obtain an actually available channel response of the OAM vortex wave. This can reduce radio resource overheads and a calculation amount in a channel measurement process, and save radio resources in a channel measurement process for transmitting wanted data, to improve a system throughput.

In an optional embodiment, after the network device obtains, through electromagnetic calculation and/or sounding signal measurement, a channel response of an OAM vortex wave from the terminal device on physical antenna elements at different spatial locations, the network device may obtain electric field power strength distribution information of the OAM vortex wave received by antenna elements at all spatial locations (m, n) from the terminal device. The network device selects, for the terminal device based on the electric field power strength information and estimated OAM propagation axis information, a part of antenna elements from the physical antenna array of the network device as receive antenna elements for receiving the OAM vortex wave from the terminal device.

Figure 17:
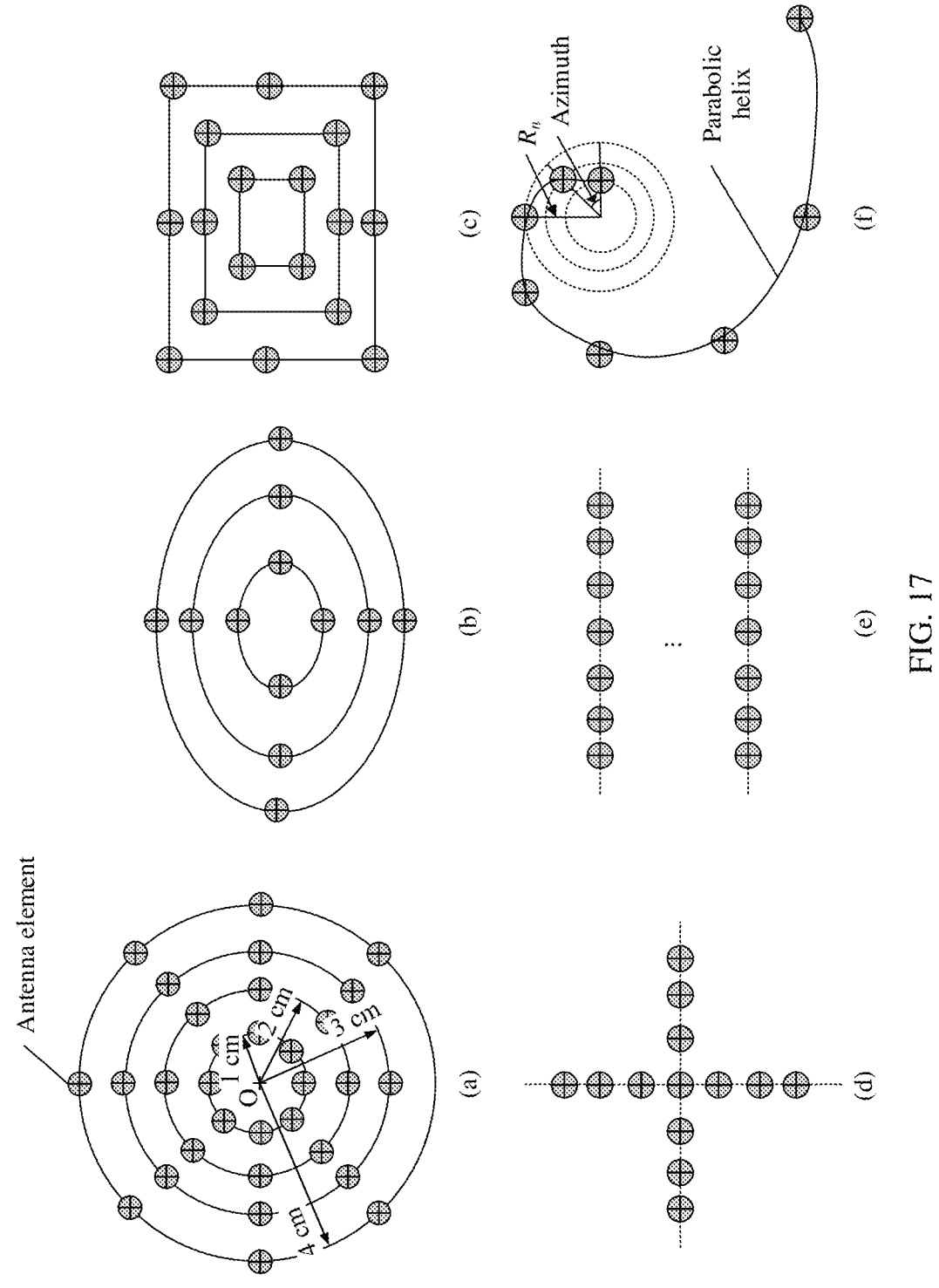
FIG. 17 is a schematic arrangement diagram of a geometric topology of a receive antenna subset according to an embodiment of this application.

Optionally, a part of antenna elements are selected from M rows and N columns of physical antenna elements of the network device as a receive antenna subset. FIG. 17 is a schematic arrangement diagram of a geometric topology of a receive antenna subset according to an embodiment of this application. As shown in FIG. 17, (a) in FIG. 17 indicates that the geometric topology structure of the receive antenna subset is a plurality of evenly distributed concentric circles, (b) in FIG. 17 indicates that the geometric topology structure of the receive antenna subset is a plurality of evenly distributed ellipses, (c) in FIG. 17 indicates that the geometric topology structure of the receive antenna subset is a plurality of evenly distributed rectangles, (d) in FIG. 17 indicates that the geometric topology structure of the receive antenna subset is even distribution in a "cross" shape, (e) in FIG. 17 indicates that the geometric topology structure of the receive antenna subset is even distribution in a plurality of parallel rows, and (f) in FIG. 17 indicates that the geometric topology structure of the receive antenna subset is parabolic helix distribution.

In the parabolic helix distribution shown in (f) in FIG. 17, a radius length $R_n$ between an $n^{th}$ antenna element and a center of a circle is equal to an x-axis coordinate of a curve (the diagram of the curves of the Bessel functions of the first kind of the orders 0, 1, and 2 shown in FIG. 2) of a Bessel function $J_n$ (x) of the first kind of an $n^{th}$ OAM mode at a y-axis peak value, that is, $R_n = x_n$, and $|J_n(x_n)| \geq |J_n(x)|$ and $\forall x \neq x_n$ are met; x-axis coordinates, namely, radius lengths $R_n$, of $J_n$ (x) corresponding to N OAM modes at the y-axis peak value are obtained, where n=1, 2, . . . , N; N antenna elements are obtained in N circles formed by N radius lengths $R_n$; one antenna element is obtained in each circle as a receive antenna; and an azimuth difference between two adjacent antenna elements in the N antenna elements is $2\pi/N$.

Optionally, the geometric topology structure of the receive antenna subset used by the network device in this embodiment of this application may be the parabolic helix distribution shown in (f) in FIG. 17. It may be understood that a location of an origin of the parabolic helix shown in (f) in FIG. 17 coincides with the estimated mapping spatial location of the OAM propagation axis in the foregoing Embodiment 7. In $J_n$ (x), a value of n is the same as a value of an OAM mode sent by the terminal device, where n=1, 2, . . . , N.

In conclusion, a method for selecting a receive antenna subset by the network device includes:

(1) A mapping spatial location of an OAM propagation axis falls within a coverage area of the physical antenna array of the network device.

Method 1: The mapping spatial location of the OAM propagation axis is used as an origin, and all receive antenna elements are evenly distributed around the origin. Method 2: The mapping spatial location of the OAM propagation axis is used as an origin, and a distance $R_n$ between an $n^{th}$ receive antenna element and the origin is equal to an x-axis coordinate value of a Bessel function $J_n$ (x) of the first kind of an OAM mode n at a peak value. Method 3: If a quantity N of receive antenna elements is greater than a total quantity M of OAM modes of the transmit end, the first M receive antenna elements are deployed based on the foregoing method 2, and an OAM mode k corresponding to a maximum SNR is selected based on a water filling principle, so that the last (N−M) receive antenna elements are distributed in a circle formed by a radius value obtained at a peak value of $J_k$ (x). With an axis location as an origin, azimuths of the N receive antenna elements are evenly distributed around the origin.

(2) A mapping spatial location of an OAM propagation axis falls outside a coverage area of the physical antenna array of the network device.

Method 4: All receive antenna elements are distributed within the coverage area of the physical antenna array as evenly as possible. Even distribution herein may have an error, and does not represent absolute evenness. Method 5: All receive antenna elements are distributed as much as possible at a spatial location with a large received power.

It may be understood that, when the physical antenna array of the network device includes a large quantity of antenna elements, if a signal from a terminal device is received by using all antenna elements of the network device, a large calculation amount and processing complexity are caused during signal receiving. This embodiment of this application provides a method for selecting a receive antenna subset. Unevenness of a power amplitude of the OAM vortex wave relative to the plane wave in spatial distribution is fully used, and a signal is received by using a small quantity of antenna elements. This can reduce a signal processing calculation amount and complexity of the network device, and can also reduce interference existing when a plurality of terminal devices simultaneously perform uplink transmission.

Embodiment 9

In Embodiment 9 of this application, the specific process, mentioned in the foregoing Embodiment 6, in which a network device determines a joint transceiving manner of MIMO and OAM based on an equivalent channel model is described in detail.

In Embodiment 9 of this application, it is assumed that related information of a plane-wave channel matrix H1 in the foregoing Embodiment 6 is known priori information, and specifically includes: a quantity M1, that is determined by the network device by using the channel matrix H1, of logical antenna ports that are between the terminal device and the network device and that can be supported based on a plane wave, and a quantity Nu, that is determined by the network device by using the channel matrix H1, of layers of data streams that are of MIMO precoding and that can be best supported based on the plane wave; and a multipath quantity, intensity, and delay information of a plane-wave radio channel between the terminal device and the network device that are estimated by the network device by listening to spreading of an angle of arrival of a BF-SRS and intensity and a time interval of a multipath impulse response.

In Embodiment 9 of this application, it is assumed that related information of a vortex-wave channel matrix H2 in the foregoing Embodiment 6 is known priori information, and specifically includes: a quantity M2, that is determined by the network device by using the channel matrix H2, of logical antenna ports that are between the terminal device and the network device and that can be supported based on a vortex wave, and a quantity $N_{L2}$, that is determined by the network device by using the channel matrix H2, of layers of parallel data streams that are of MIMO precoding and that can be best supported based on the vortex wave; and a multipath quantity, intensity, and delay information of a vortex-wave radio channel between the terminal device and the network device and phase interference and crosstalk interference of the radio channel on the OAM vortex wave that are estimated by the network device by listening to spreading of an angle of arrival of an OAM-RS, intensity and a time interval of a multipath impulse response, and signal interference between different OAM modes.

Figure 18:
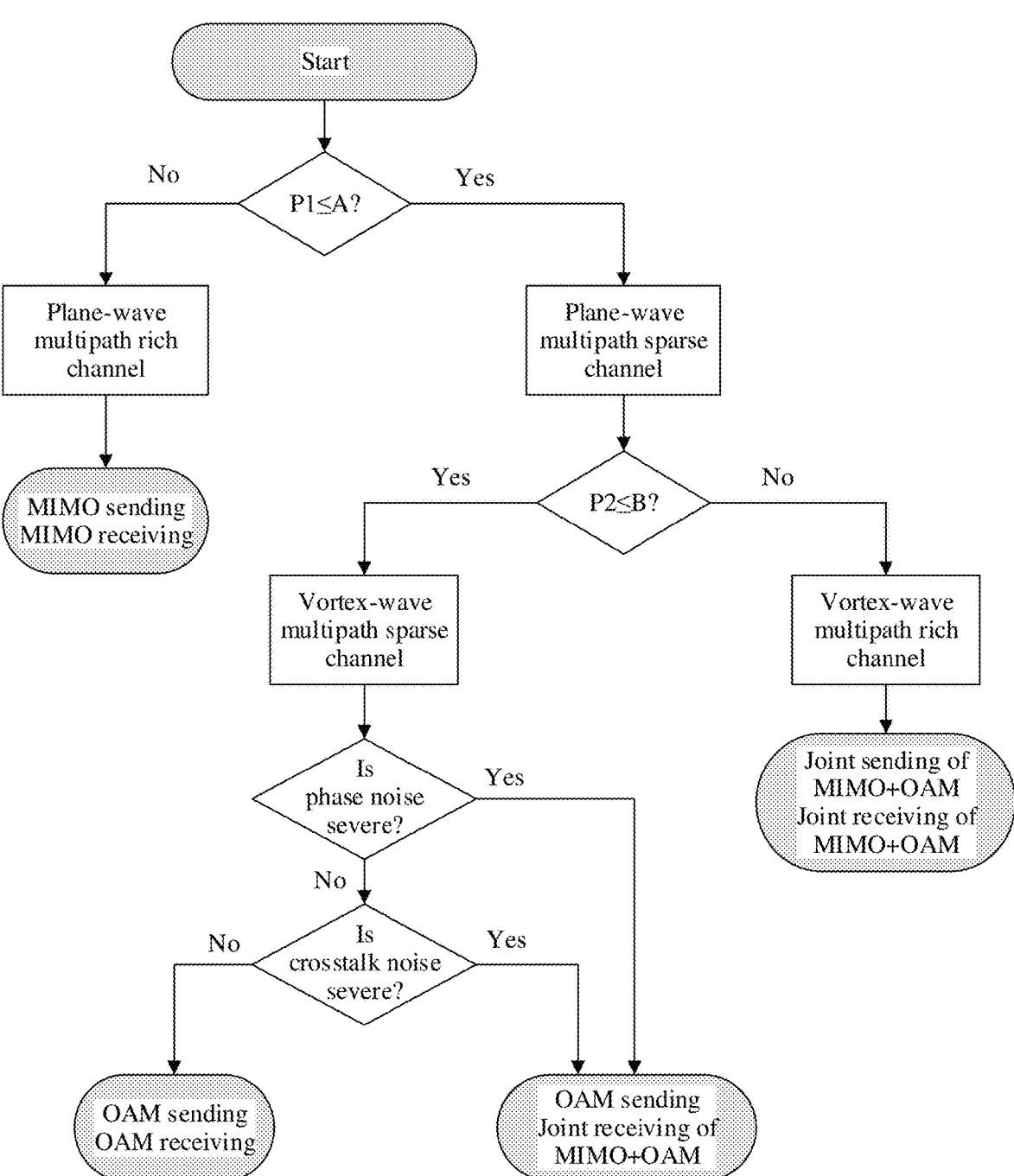
FIG. 18 is a schematic logical flowchart of determining a joint transceiving manner of MIMO and OAM according to an embodiment of this application.

FIG. 18 is a schematic logical flowchart of determining a joint transceiving manner of MIMO and OAM according to an embodiment of this application. A multipath channel quantity provided by the plane-wave channel response H1 is denoted as P1, and a preset threshold for whether a plane-wave multipath is rich is denoted as A. A multipath channel quantity provided by the vortex-wave channel response H2 is denoted as P2, and a preset threshold for whether a vortex-wave multipath is rich is denoted as B. Values of the two preset thresholds A and B may be equal, or may not be equal. In this embodiment of this application, it is set that A=4 and B=2. It may be understood that, in actual application, A and B may have another value. Specific values of A and B are not limited in this embodiment of this application.

As shown in FIG. 18, a specific working process in which the network device determines the joint transceiving manner of MIMO and OAM includes: First, the network device determines whether the multipath channel quantity P1 corresponding to the plane-wave channel response H1 is less than or equal to the preset threshold A. If the multipath channel quantity P1 is greater than the preset threshold A, it indicates that the radio channel is a plane-wave multipath rich channel, and the network device determines to use a transceiving manner of MIMO sending and MIMO receiving. If the multipath channel quantity P1 is less than or equal to the preset threshold A, it indicates that the radio channel is a plane-wave multipath sparse channel, and the network device determines whether the multipath channel quantity P2 corresponding to the vortex-wave channel response H2 is less than or equal to the preset threshold B. If the multipath channel quantity P2 is greater than the preset threshold B, it indicates that the radio channel is a vortex-wave multipath rich channel, and the network device determines to use a transceiving manner of joint sending of MIMO+OAM and joint receiving of MIMO+OAM. If the multipath channel quantity P2 is less than or equal to the preset threshold B, it indicates that the radio channel is a vortex-wave multipath sparse channel, and the network device determines a specific transceiving manner based on a value of phase noise and/or a value of crosstalk noise. For example, the network device determines whether the phase noise is severe (the network device may compare the phase noise with a threshold to determine whether the phase noise is severe, for example, if the value of the phase noise is greater than or equal to the threshold, the network device considers that the phase noise is severe, and on the contrary, if the value of the phase noise is less than the threshold, the network device considers that the phase noise is not severe). If the phase noise is severe, the network device determines to use a transceiving manner of OAM sending and joint receiving of MIMO+OAM. If the phase noise is not severe, the network device determines whether the crosstalk noise is severe (the network device may compare the crosstalk noise with a threshold to determine whether the crosstalk noise is severe, for example, if the value of the crosstalk noise is greater than or equal to the threshold, the network device considers that the crosstalk noise is severe, and on the contrary, if the value of the crosstalk noise is less than the threshold, the network device considers that the crosstalk noise is not severe). If the crosstalk noise is severe, the network device determines to use a transceiving manner of OAM sending and joint receiving of MIMO+OAM. If the crosstalk noise is not severe, the network device determines to use a transceiving manner of OAM sending and OAM receiving.

In a possible implementation, if the multipath channel quantity P1 is greater than the preset threshold A, it indicates that the radio channel is a plane-wave multipath rich channel, and the network device determines to use a transceiving manner of MIMO sending and MIMO receiving or a transceiving manner of MIMO sending and joint receiving of MIMO+OAM. For example, when the radio channel is a plane-wave multipath rich channel and another OAM interferes with communication, the transceiving manner of MIMO sending and joint receiving of MIMO+OAM is used. When the radio channel is a plane-wave multipath rich channel and there is no another OAM that interferes with communication, the transceiving manner of MIMO sending and MIMO receiving is used.

In this embodiment of this application, whether the multipath channel quantity provided by the plane wave is rich and whether the multipath channel quantity provided by the vortex wave is rich are separately determined, to determine the joint transceiving manner of MIMO and OAM, so that a best matching transceiving combination manner of MIMO or OAM or MIMO+OAM can be adaptively selected, to match an optimal parallel multi-stream transmission manner of a channel, so as to improve a system throughput.

Embodiment 10

In Embodiment 10 of this application, a signal processing process during sending/receiving in different joint transceiving manners of MIMO and OAM mentioned in the foregoing Embodiment 6 is described in detail.

In Embodiment 10 of this application, it is assumed that a terminal device is a transmit end and a network device is a receive end. It is assumed that the network device completes an estimation process of a plane-wave channel response and a vortex-wave channel response by listening to a sounding signal such as a BF-SRS and an OAM-RS, and has fed back, by using control signaling, an OMI and an OPI to the terminal device as an OMI and an OPI that are recommended for use in a current communication process. It is assumed that the terminal device determines to use the OMI and OPI solutions fed back by the network device, and inputs the OMI and the OPI into a mode and power factor module of the terminal device, to determine a transmit power by using mode modulation module.

To facilitate better understanding of the signal processing process during sending/receiving, this embodiment of this application is described based on the foregoing physical layer baseband system shown in FIG. 6. For ease of description, in this embodiment of this application, a function of a MIMO precoding module is denoted as W, a function of the OAM mode modulation module is denoted as G, a function of a spatial filter module is denoted as F, and a radio channel response function is denoted as H. In addition, $N_L$ parallel data streams of the transmit end are denoted as X, and signals received by the receive end from $N_R$ physical antennas are denoted as Y.

X is an $N_L \times 1$ matrix, Y is an $N_R \times 1$ matrix, H is an $N_R \times N_L$ matrix, F is an $N_T \times N_M$ matrix, G is an $N_M \times M$ matrix, and W is an $M \times N_L$ matrix. Specific presentation forms thereof are as follows:

$$X = \begin{bmatrix} x_1 \\ x_2 \\ \cdots \\ x_{N_L} \end{bmatrix}_{N_L \times 1} \quad (2\text{-}10)$$

$$Y = \begin{bmatrix} y_1 \\ y_2 \\ \cdots \\ y_{N_R} \end{bmatrix}_{N_R \times 1} \quad (2\text{-}11)$$

$$H = \begin{bmatrix} h_{1,1}, \ldots, h_{1,N_T} \\ \cdots \\ h_{N_R,1}, \ldots, h_{N_R,N_T} \end{bmatrix}_{N_R \times N_T} \quad (2\text{-}12)$$

$$F = \begin{bmatrix} f_{1,1}, \ldots, f_{1,N_M} \\ \cdots \\ f_{N_T,1}, \ldots, f_{N_T,N_M} \end{bmatrix}_{N_T \times N_M} \quad (2\text{-}13)$$

$$G = \begin{bmatrix} g_{1,1}, \ldots, g_{1,M} \\ \cdots \\ g_{N_M,1}, \ldots, g_{N_M,M} \end{bmatrix}_{N_M \times M} \quad (2\text{-}14)$$

48

-continued $$W = \begin{bmatrix} w_{1,1}, \ldots, w_{1,N_L} \\ \cdots \\ w_{M,1}, \ldots, w_{M,N_L} \end{bmatrix}_{M \times N_L} \quad (2\text{-}15)$$

It is assumed that additive white Gaussian noise (additive white gaussian noise, AWGN) of the receive end is denoted as $N_0$. In this case, an entire signal input/output relationship shown in FIG. 19 may meet the following Formula (2-16):

$$Y_{N_R \times 1} = H_{N_R \times N_T} \cdot F_{N_T \times N_M} \cdot G_{N_M \times M} \cdot W_{M \times N_L} \cdot X_{N_L \times 1} + N_0 \quad (2\text{-}16)$$

The radio channel response function H and the additive white Gaussian noise $N_0$ depend on an objective environment that is not controlled by the transmit end or the receive end. The function F of the spatial filter is mainly used to implement different beamforming directions by adjusting phases of different antenna elements.

For ease of subsequent description, a matrix symbol $I_{K \times K}$ is defined to represent an identity matrix with K rows and K columns. All diagonal elements from an upper left corner to a lower right corner are 1, and all other elements are 0.

The terminal device and the network device transmit service data by using PUSCH and PDSCH channels, to respectively correspond to five specific combinations in Table 1: MIMO sending and MIMO receiving, OAM sending and OAM receiving, joint receiving of MIMO+OAM, MIMO sending and joint receiving of MIMO+OAM, and joint sending and joint receiving. The following separately describes processing methods of G and H of the transmit end in the five combination manners.

Combination 1: MIMO sending and MIMO receiving. To be specific, the transmit end disables an OAM mode modulation module 112 related to OAM, and the receive end disables an OAM mode demodulation module 122. In this case, an equivalent channel determining module 114 of the transmit end sets a parameter $N_M = M$. A precoding weight matrix module 115 of the transmit end selects W based on a precoding codebook specified in the 3GPP standard protocol. A mode and power factor module 116 of the transmit end configures $G = G_{N_M \times M} = G_{M \times M} = I_{M \times M}$. In this case, the foregoing Formula (2-16) may be equivalent to the following Formula (2-17). The receive end may complete a subsequent receiving process by using a MIMO decoding algorithm:

$$\begin{aligned} Y_{N_R \times 1} &= H_{N_R \times N_T} \cdot F_{N_T \times N_M} \cdot I_{M \times M} \cdot W_{M \times N_L} \cdot X_{N_L \times 1} + N_0 \quad (2\text{-}17) \\ &= H_{N_R \times N_T} \cdot F_{N_T \times N_M} \cdot W_{M \times N_L} \cdot X_{N_L \times 1} + N_0 \end{aligned}$$

Combination 2: OAM sending and OAM receiving. To be specific, the transmit end disables a MIMO precoding module 111 related to MIMO, and the receive end disables a MIMO decoding module 121. In this case, an equivalent channel determining module 114 of the transmit end sets a parameter $M = N_L$. A precoding weight matrix module 115 of the transmit end configures a precoding codebook $W = W_{M \times N_L} = W_{N_L \times N_L} = I_{N_L \times N_L}$. A mode and power factor module 116 of the transmit end configures $G = G_{N_M \times M} \times G_{N_M \times N_L}$. In this case, the foregoing Formula (2-16) may be equivalent to the following Formula (2-18). The receive end may complete a subsequent receiving process by using an OAM mode demodulation algorithm:

$$Y_{N_R \times 1} = H_{N_R \times N_T} \cdot F_{N_T \times N_M} \cdot G_{N_M \times N_L} \cdot I_{N_L \times N_L} \cdot X_{N_L \times 1} + N_0 \qquad (2\text{-}18)$$

$$= H_{N_R \times N_T} \cdot F_{N_T \times N_M} \cdot G_{N_M \times N_L} \cdot X_{N_L \times 1} + N_0$$

Combination 3: OAM sending and joint receiving of MIMO+OAM. To be specific, the transmit end disables a MIMO precoding module 111 related to MIMO, and the receive end enables a MIMO decoding module 121. A signal processing process of the transmit end is the same as that in the foregoing combination 2, and an expression of $Y_{N_R \times 1}$ of the receive end is the same as the foregoing Formula (2-18). The receive end completes a subsequent receiving process through joint receiving of MIMO+OAM. A processing manner of joint receiving of MIMO+OAM is as follows:

An equivalent channel response matrix $\tilde{H}$ of an OAM vortex wave is obtained by listening to an OAM-RS sounding channel, $\tilde{H}$ meets the following Formula (2-19), and correspondingly, $Y_{N_R \times 1}$ of the receive end meets the following Formula (2-20):

$$\tilde{H}_{N_R \times N_T} \approx H_{N_R \times N_T} \cdot F_{N_T \times N_M} \cdot G_{N_M \times N_L} \qquad (2\text{-}19)$$

$$Y_{N_R \times 1} = \tilde{H}_{N_R \times N_L} \cdot X_{N_L \times 1} + N_0 \qquad (2\text{-}20)$$

Then, a process in which the receive end restores and recovers a plurality of parallel data streams borne in a plurality of OAM modes is completed by using a zero forcing (zero forcing, ZF) algorithm. The plurality of parallel data streams $\tilde{X}_{N_R \times 1}$, restored by the receive end meet the following Formula (2-21):

$$\tilde{X}_{N_t \times 1} = (\tilde{H}_{N_R \times N_L})^{-1} \cdot Y_{N_R \times 1} \qquad (2\text{-}21)$$

Combination 4: MIMO sending and joint receiving of MIMO+OAM. To be specific, the transmit end disables an OAM mode modulation module 112 related to OAM, and both a MIMO decoding module 121 and an OAM mode demodulation module 122 of the receive end are in a working state. A signal processing process of the transmit end is the same as that in the foregoing combination 1, and an expression of $Y_{N_R \times 1}$ of the receive end is the same as the foregoing Formula (2-17). The receive end completes a subsequent receiving process through joint receiving of MIMO+OAM. A processing manner of joint receiving of MIMO+OAM is the same as the foregoing Formulas (2-19), (2-20), and (2-21).

Combination 5: Joint sending of MIMO+OAM and joint receiving of MIMO+OAM. To be specific, both a MIMO precoding module 111 and an OAM mode modulation module 112 of the transmit end are in a working state, and both a MIMO decoding module 121 and an OAM mode demodulation module 122 of the receive end are in a working state. In this case, a precoding weight matrix module 115 of the transmit end needs to select W, and a mode and power factor module 116 of the transmit end needs to select G. This embodiment of this application provides a method for selecting a matrix G and a matrix W. FIG. 19 is a schematic flowchart of a method for selecting a matrix G and a matrix W according to an embodiment of this application. In this case, the entire signal input/output relationship meets the foregoing Formula (2-16), the matrix G meets $G=G_{N_M \times M}$, and the matrix W meets $W=W_{M \times N_L}$. As shown in FIG. 19, the method for selecting a matrix G and a matrix W includes the following steps:

1. The mode and power factor module 116 of the transmit end generates, based on a known OMI and a known OPI, the matrix $G=G_{N_M \times M}$ corresponding to the OAM mode modulation module 112.

2. The precoding weight matrix module 115 of the transmit end obtains an equivalent channel response matrix H2=H·F·G of an OAM vortex wave based on the known matrices F and G and by listening to an OAM-RS sounding channel 3. The precoding weight matrix module 115 of the transmit end performs a singular value decomposition (singular value decomposition, SVD) operation on the equivalent channel matrix H2 to obtain svd(H2)=U·D·V, and then enables a precoding codebook to be equal to a conjugate transposed matrix of the right-most matrix V of the equation, that is, $W=V^T$. $V^T$ represents the conjugate transposed matrix of the matrix V.

After the precoding codebook W and the matrix G are obtained, the precoding codebook W and the matrix G are substituted into the foregoing Formula (2-16) to complete a joint sending process of MIMO and OAM at the transmit end. The receive end may use the zeroing algorithm in joint receiving of MIMO and OAM described in the combination 3 to complete a receiving process.

Optionally, a specific method for generating the OAM matrix G based on the OMI and the OPI is described below: The OMI is denoted as a row vector whose length is equal to a quantity M of logical antenna ports:

$$OMI = \{k_1, k_2, \ldots, k_m, \ldots, k_M\}, 1 \le m \le M \qquad (2\text{-}22)$$

where $k_m \in Z$, that is, $k_m$ belongs to an integer set, and $k_m$ represents a selected $m^{th}$ OAM mode. It may be understood that $k_m$ is not equal to ±m, that is, an $m^{th}$ mode does not mean that a value of the mode is m. It may be further understood that the OMI allows $k_m=0$, that is, the OMI allows an OAM mode 0 (plane wave). The OMI also allows $k_m=kn$ and m≠n, that is, the OMI allows values of different elements of the vector to be the same.

For example, it is assumed that an OMI is set to {0, 0, 1, 2, 3, 1, 2, 2} in a communication process, and the OMI includes M=8 vector elements, including four types of OAM modes 0/1/2/3, and even two plane waves.

The OPI is denoted as a row vector whose length is the same as that of the OMI:

$$OPI = \{p_1, p_2, \ldots, p_m, \ldots, p_M\}, 1 \le m \le M \qquad (2\text{-}23)$$

where $p_m \in R$, that is, $p_m$ belongs to a real number set, and $p_m$ represents a power factor corresponding to the selected $m^{th}$ OAM mode. The $m^{th}$ power factor $p_m$ of the OPI is in a one-to-one correspondence with the $m^{th}$ mode $k_m$ of the OMI.

For example, it is assumed that an OPI is set to {0.1, 0.1, 0.5, 0.7, 1.0, 0.5, 0.7, 0.7} in a communication process, and the OPI includes M=8 vector elements, including four power factors 0.1/0.5/0.7/1.0. Optionally, a low OAM mode corresponds to a low power factor, and a high OAM mode corresponds to a high power factor. For example, a power factor corresponding to an OAM mode 0 is 0.1, a power factor corresponding to an OAM mode 1 is 0.5, a power factor corresponding to an OAM mode 2 is 0.7, and a power factor corresponding to an OAM mode 3 is 1.0.

After the mode and power factor module 116 of the transmit end obtains the OMI and the OPI, the OAM matrix $G=G_{N_M \times M}$ is considered as a set $\{Q_m\}$ of M column vectors, where $1 \leq m \leq M$. Each column vector $Q_m$ includes $N_M$ elements, and $Q_m$ meets the following Formula (2-24):

$$Q_m = \begin{bmatrix} p_m \cdot e^{j\varphi_1(k_m)} \\ p_m \cdot e^{j\varphi_2(k_m)} \\ \cdots \\ p_m \cdot e^{j\varphi_{N_m}(k_m)} \end{bmatrix}_{N_m \times 1} \quad (2\text{-}24)$$

where $p_m$ is the power factor, of the $m^{th}$ OAM mode, given by the OPI, $k_m$ is a value of the selected $m^{th}$ OAM mode, and $\varphi_n(k_m)$ represents an initial phase of an OAM mode $k_m$ on an $n^{th}$ antenna element of a physical antenna array of the transmit end. The OAM matrix G generated based on the OMI and the OPI meets the following Formula (2-25):

$$G = \begin{bmatrix} p_1 \cdot e^{j\varphi_1(k_1)}, & p_2 \cdot e^{j\varphi_1(k_2)}, & \ldots, & p_M \cdot e^{j\varphi_1(k_M)} \\ p_1 \cdot e^{j\varphi_2(k_1)}, & p_2 \cdot e^{j\varphi_2(k_2)}, & \ldots, & p_M \cdot e^{j\varphi_2(k_M)} \\ \cdots \\ p_1 \cdot e^{j\varphi_{N_m}(k_1)}, & p_1 \cdot e^{j\varphi_{N_m}(k_2)}, & \ldots, & p_M \cdot e^{j\varphi_{N_m}(k_M)} \end{bmatrix}_{N_m \times M} \quad (2\text{-}25)$$

The OAM matrix G generated by using the foregoing Formula (2-25) is substituted into the foregoing Formula (2-16), Formula (2-17), and Formula (2-18), so that signal processing processes in various transceiving combination scenarios can be obtained.

This embodiment of this application proposes a complete joint transceiving process, to dynamically adapt to a change of a radio channel condition and obtain a higher system throughput in a best matching communication manner. This embodiment of this application further provides an OMI and OPI representation method. Then, independent OAM sending or joint sending of MIMO+OAM is performed based on a dynamic mode combination and power allocation. This can further dynamically adapt to the change of the radio channel condition, and further obtain a higher system throughput.

It may be understood that the foregoing content describes the technical solutions of this application in different aspects. It should be understood that the foregoing embodiments and beneficial effects may be mutually referenced, and features of the embodiments may also be combined.

The foregoing content describes the method in this application in detail. To better implement the foregoing solutions in embodiments of this application, embodiments of this application further provide a corresponding apparatus or device.

FIG. 20 is a schematic diagram of a first structure of a communication apparatus according to an embodiment of this application. The communication apparatus may be a terminal device or a chip or a circuit that may be disposed in the terminal device. As shown in FIG. 20, a communication apparatus 1 may include:

a transceiver unit 11, configured to send a first OAM reference signal in a first beam direction, where the transceiver unit 11 is further configured to receive first indication information, where the first indication information includes a second beam direction; the transceiver unit 11 is further configured to send a second OAM reference signal in the second beam direction; and the transceiver unit 11 is further configured to receive second indication information, where the second indication information includes OAM matrix indicator information and OAM power indicator information, the second indication information is used to determine a transmission manner, and the transmission manner includes OAM beam transmission, plane wave transmission, or joint transmission of OAM and a plane wave.

The first OAM reference signal is borne on a first beam. The first beam is a composite beam of a circularly polarized beam and an OAM beam. The first OAM reference signal is used to determine a first spatial location of a propagation axis of the first OAM reference signal. The first spatial location is used to determine the second beam direction from the first beam direction. The second OAM reference signal is used to determine antenna information and a second channel response of the second OAM reference signal. The second channel response and the antenna information are used to determine the second indication information. The second OAM reference signal is borne on a composite beam of a linearly polarized beam and an OAM beam.

Optionally, the transceiver unit 11 is further configured to send a plurality of sounding reference signals SRSs; and the transceiver unit 11 is further configured to receive third indication information, where the third indication information includes the first beam direction and a circular polarization direction.

One sounding reference signal corresponds to one beam direction, the sounding reference signal is used to determine a first channel response of the sounding reference signal, and the first channel response is used to determine the first beam direction from a plurality of beam directions. Each sounding reference signal is a plane-wave reference signal.

Optionally, the second OAM reference signal is borne on a second beam. The second beam is a composite beam of a linearly polarized beam and an OAM beam.

Optionally, the communication apparatus 1 further includes a processing unit 12, configured to transmit data information based on the second indication information.

Optionally, the second indication information further includes rank indicator RI information and precoding matrix indicator PMI information.

Optionally, the OAM power indicator information includes an OAM mode parameter and a power parameter corresponding to an OAM mode in the OAM mode parameter.

In a specific implementation, for an implementation of each module or unit, correspondingly refer to corresponding descriptions of the terminal device in the foregoing uplink communication embodiments, to perform the method and the function that are performed by the terminal device in the foregoing uplink communication embodiments.

FIG. 21 is a schematic diagram of a second structure of a communication apparatus according to an embodiment of this application. The communication apparatus may be a network device or a chip or a circuit that may be disposed in the network device. As shown in FIG. 21, a communication apparatus 2 may include:

a transceiver unit 21, configured to receive a first OAM reference signal in a first beam direction, where the transceiver unit 21 is further configured to send first indication information to a terminal device, where the first indication information includes a second beam direction; the transceiver unit 21 is further configured to receive a second OAM reference signal in the second beam direction; and the transceiver unit 21 is further configured to send second indication information, where the second indication information includes OAM matrix indicator information and OAM power indicator information, the second indication information is used to determine a transmission manner, and the transmission manner includes OAM beam transmission, plane wave transmission, or joint transmission of OAM and a plane wave.

The communication apparatus 2 further includes a processing unit 22, configured to: determine a first spatial location of a propagation axis of the first OAM reference signal based on the first OAM reference signal, or determine antenna information and a second channel response of the second OAM reference signal based on the second OAM reference signal, or the like.

The first OAM reference signal is borne on a first beam. The first beam is a composite beam of a circularly polarized beam and an OAM beam. The first OAM reference signal is used to determine the first spatial location of the propagation axis of the first OAM reference signal. The first spatial location is used to determine the second beam direction from the first beam direction. The second OAM reference signal is used to determine the antenna information and the second channel response of the second OAM reference signal. The second channel response and the receive antenna information are used to determine the second indication information. The second OAM reference signal is borne on a composite beam of a linearly polarized beam and an OAM beam.

Optionally, the transceiver unit 21 is further configured to receive a plurality of sounding reference signals; and the transceiver unit 21 is further configured to send third indication information, where the third indication information includes the first beam direction and a circular polarization direction.

A circular polarization direction of the foregoing circularly polarized beam is the same as the circular polarization direction included in the third indication information. One sounding reference signal corresponds to one beam direction, the sounding reference signal is used to obtain a first channel response in the beam direction through measurement, and the first channel response is used to determine the first beam direction from a plurality of beam directions. Each sounding reference signal is a plane-wave reference signal.

Optionally, the second OAM reference signal is borne on a second beam. The second beam is a composite beam of a linearly polarized beam and an OAM beam.

Optionally, the transceiver unit 21 is further configured to receive data information based on the receive antenna information.

Optionally, the second indication information further includes rank indicator RI information and precoding matrix indicator PMI information.

Optionally, the OAM power indicator information includes an OAM mode parameter and a power parameter corresponding to an OAM mode in the OAM mode parameter.

In a specific implementation, for an implementation of each module or unit, correspondingly refer to corresponding descriptions of the network device in the foregoing uplink communication embodiments, to perform the method and the function that are performed by the network device in the foregoing uplink communication embodiments.

In this embodiment of this application, a plurality of times of channel measurement are performed by using a plurality of sounding signals that carry and do not carry OAM. Then, a joint transceiving combination manner of MIMO and OAM is selected based on a channel response feature of the sounding signal. Finally, an OAM mode and a power factor are negotiated and configured by using control signaling exchanged between a transmit end and a receive end. Therefore, space-domain independence and uncorrelatedness can be actively constructed based on OAM, without depending on space-domain independence and uncorrelatedness of multipath reflection, scattering, and diffraction generated in a surrounding environment, to increase a rank of a channel matrix in a mobile scenario, and improve spectral efficiency of wireless communication.

Figure 22:
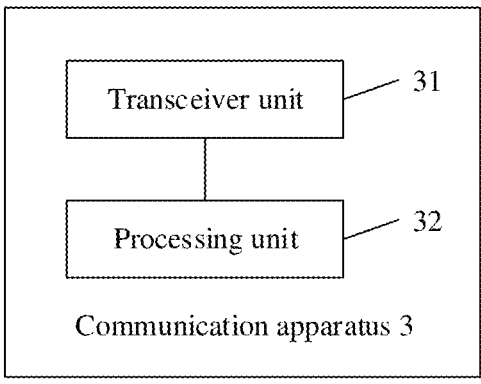
FIG. 22 is a schematic diagram of a third structure of a communication apparatus according to an embodiment of this application.

FIG. 22 is a schematic diagram of a third structure of a communication apparatus according to an embodiment of this application. The communication apparatus may be a network device or a chip or a circuit that may be disposed in the network device. As shown in FIG. 22, a communication apparatus 3 may include:

a transceiver unit 31, configured to send a third OAM reference signal in a third beam direction, where the transceiver unit 31 is further configured to receive fourth indication information, where the fourth indication information includes OAM matrix indicator information and OAM power indicator information, the fourth indication information is used to determine a transmission manner, and the transmission manner includes OAM beam transmission, plane wave transmission, or joint transmission of OAM and a plane wave.

The third OAM reference signal is used to determine a third channel response of the third OAM reference signal. The third channel response is used to determine the fourth indication information. The third OAM reference signal is borne on a composite beam of a linearly polarized beam and an OAM beam.

Optionally, the transceiver unit 31 is further configured to send a plurality of channel state information-reference signals CSI-RSs to a terminal device; and the transceiver unit 31 is further configured to receive fifth indication information from the terminal device, where the fifth indication information includes the third beam direction.

A plurality of beam directions corresponding to the plurality of channel state information-reference signals are different, one channel state information-reference signal corresponds to one beam direction, the channel state information-reference signal is used to determine a fourth channel response of the channel state information-reference signal, and the fourth channel response is used to determine the third beam direction from a plurality of beam directions.

The fifth indication information further includes a layer 1 reference signal received power corresponding to each channel state information-reference signal, and the layer 1 reference signal received power is used to determine a power used by the network device when transmitting data.

Optionally, the third OAM reference signal is borne on a third beam. The third beam is a composite beam of a linearly polarized beam and an OAM beam.

Optionally, the communication apparatus 3 further includes a processing unit 32, configured to transmit data information based on the fourth indication information.

Optionally, the fourth indication information further includes rank indicator RI information and precoding matrix indicator PMI information.

Optionally, the OAM power indicator information includes an OAM mode parameter and a power parameter corresponding to an OAM mode in the OAM mode parameter.

In a specific implementation, for an implementation of each module or unit, correspondingly refer to corresponding descriptions of the network device in the foregoing downlink communication embodiments, to perform the method and the function that are performed by the network device in the foregoing downlink communication embodiments.

Figure 23:
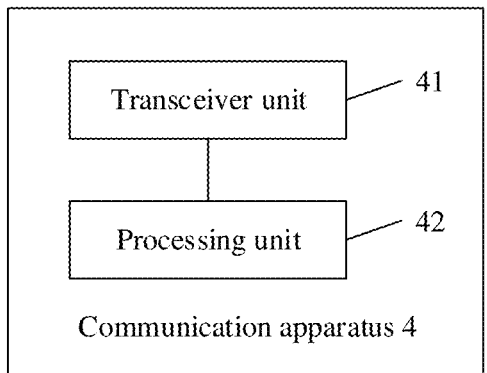
FIG. 23 is a schematic diagram of a fourth structure of a communication apparatus according to an embodiment of this application.

FIG. 23 is a schematic diagram of a fourth structure of a communication apparatus according to an embodiment of this application. The communication apparatus may be a terminal device or a chip or a circuit that may be disposed in the terminal device. As shown in FIG. 23, a communication apparatus 4 may include:

a transceiver unit 41, configured to receive a third OAM reference signal in a third beam direction from a network device, where the transceiver unit 41 is further configured to send fourth indication information to the network device, where the fourth indication information includes OAM matrix indicator information and OAM power indicator information, the fourth indication information is used to determine a transmission manner, and the transmission manner includes OAM beam transmission, plane wave transmission, or joint transmission of OAM and a plane wave.

The communication apparatus 4 further includes a processing unit 42, configured to generate a third OAM reference signal and/or signaling.

The third OAM reference signal is used to determine a third channel response of the third OAM reference signal. The third channel response is used to determine the fourth indication information. The third OAM reference signal is borne on a composite beam of a linearly polarized beam and an OAM beam.

Optionally, the transceiver unit 41 is further configured to receive a plurality of channel state information-reference signals; and the transceiver unit 41 is further configured to send fifth indication information, where the fifth indication information includes the third beam direction.

One channel state information-reference signal corresponds to one beam direction, the channel state information-reference signal is used to determine a fourth channel response of the channel state information-reference signal, and the fourth channel response is used to determine the third beam direction from a plurality of beam directions.

The fifth indication information further includes a layer 1 reference signal received power corresponding to each channel state information-reference signal, and the layer 1 reference signal received power is used to determine a power used by the network device when transmitting data.

Optionally, the third OAM reference signal is borne on a third beam. The third beam is a composite beam of a linearly polarized beam and an OAM beam.

Optionally, the transceiver unit 41 is further configured to receive data information.

Optionally, the fourth indication information further includes rank indicator RI information and precoding matrix indicator PMI information.

Optionally, the OAM power indicator information includes an OAM mode parameter and a power parameter corresponding to an OAM mode in the OAM mode parameter.

In a specific implementation, for an implementation of each module or unit, correspondingly refer to corresponding descriptions of the terminal device in the foregoing downlink communication embodiments, to perform the method and the function that are performed by the terminal device in the foregoing downlink communication embodiments.

Figure 24:
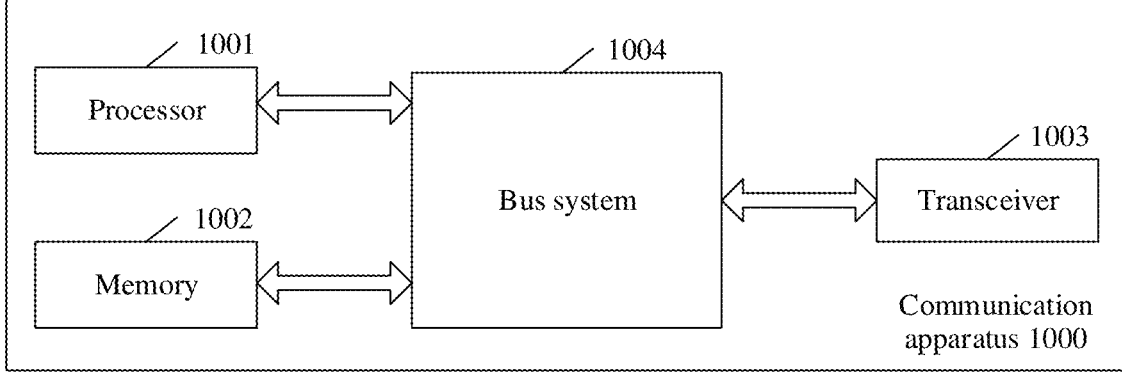
FIG. 24 is a schematic diagram of a fifth structure of a communication apparatus according to an embodiment of this application.

FIG. 24 is a schematic diagram of a fifth structure of a communication apparatus according to an embodiment of this application. As shown in FIG. 24, a communication apparatus 1000 provided in this embodiment of this application includes a processor 1001, a memory 1002, a transceiver 1003, and a bus system 1004. The communication apparatus provided in this embodiment of this application may be either a terminal device or a network device.

The processor 1001, the memory 1002, and the transceiver 1003 are connected by using the bus system 1004.

The memory 1002 is configured to store a program. Specifically, the program may include program code, and the program code includes computer operation instructions. The memory 1002 includes but is not limited to a random access memory (random access memory, RAM), a read-only memory (read-only memory, ROM), an erasable programmable read only memory (erasable programmable read only memory, EPROM), or a compact disc read-only memory (compact disc read-only memory, CD-ROM). Only one memory is shown in FIG. 11. Certainly, a plurality of memories may be disposed based on a requirement. Alternatively, the memory 1002 may be a memory in the processor 1001. This is not limited herein.

The memory 1002 stores the following elements: an executable unit or a data structure, a subset thereof, or an extended set thereof:

an operation instruction: including various operation instructions and used to implement various operations; and an operating system, including various system programs and configured to implement various basic services and process a hardware-based task.

The processor 1001 controls an operation of the communication apparatus 1000. The processor 1001 may be one or more central processing units (central processing unit, CPU). When the processor 1001 is one CPU, the CPU may be a single-core CPU, or may be a multi-core CPU.

During specific application, components of the communication apparatus 1000 are coupled together by using the bus system 1004. In addition to a data bus, the bus system 1004 may further include a power bus, a control bus, a status signal bus, and the like. However, for clear descriptions, various buses in FIG. 24 are marked as the bus system 1004. For ease of representation, FIG. 24 is merely an example for illustration.

The method that is performed by the terminal device and that is provided in any one of the foregoing embodiments or the method that is performed by the network device and that is provided in any one of the foregoing embodiments may be applied to the processor 1001 or implemented by the processor 1001. The processor 1001 may be an integrated circuit chip and has a signal processing capability. In an implementation process, steps in the foregoing methods can be implemented by using a hardware integrated logical circuit in the processor 1001, or by using instructions in a form of software. The processor 1001 may be a general purpose processor, a digital signal processor (digital signal processor, DSP), an application-specific integrated circuit (application specific integrated circuit, ASIC), a field programmable gate array (field-programmable gate array, FPGA) or another programmable logic device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1002. The processor 1001 reads information from the memory 1002, and performs, based on hardware thereof, steps of the method that is performed by the terminal device and that is described in any one of the foregoing embodiments, or performs, based on hardware thereof, steps of the method that is performed by the network device and that is described in any one of the foregoing embodiments.

An embodiment of this application further provides a computer program product. The computer program product includes computer program code. When the computer program code is run on a computer, the computer is enabled to perform steps of the method that is performed by the terminal device and that is described in any one of the foregoing embodiments. Alternatively, when the computer program code is run on a computer, the computer is enabled to perform steps of the method that is performed by the network device and that is described in any one of the foregoing embodiments.

An embodiment of this application further provides an apparatus. The apparatus may be a chip. The chip includes a processor. The processor is configured to read and execute a computer program stored in a memory, to perform the communication method in any of the possible implementations of any one of the foregoing embodiments. Optionally, the chip further includes a memory, and the memory is connected to the processor by using a circuit or a wire. Further, optionally, the chip further includes a communication interface, and the processor is connected to the communication interface. The communication interface is configured to receive data and/or information that need/needs to be processed. The processor obtains the data and/or the information from the communication interface, processes the data and/or the information, and outputs a processing result by using the communication interface. The communication interface may be an input/output interface.

Optionally, the processor and the memory may be physically independent units, or the memory and the processor may be integrated together.

Another embodiment of this application further provides a communication system. The communication system includes a terminal device and a network device. For example, the terminal device may be the terminal device in any one of the foregoing embodiments, and the network device may be the network device in any one of the foregoing embodiments.

Persons of ordinary skill in the art may understand that all or some of the procedures of the methods in the embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   sending, by a first communication apparatus, a first orbital angular momentum (OAM) reference signal in a first beam direction, wherein the first OAM reference signal is used to determine a second beam direction from the first beam direction;
   receiving, by the first communication apparatus, first indication information, wherein the first indication information comprises information about the second beam direction;
   sending, by the first communication apparatus, a second OAM reference signal in the second beam direction, wherein the second OAM reference signal is used to determine antenna information and a second channel response of the second OAM reference signal; and
   receiving, by the first communication apparatus, second indication information, wherein the second indication information is determined based on the second channel response and the antenna information, the second indication information is used to determine a transmission manner, and the transmission manner comprises OAM wave transmission, plane wave transmission, or joint transmission of OAM and a plane wave.

2. The communication method according to claim 1, wherein before sending, by the first communication apparatus, the first OAM reference signal in the first beam direction, the method further comprises:
   sending, by the first communication apparatus, a plurality of sounding reference signals (SRSs), wherein one sounding reference signal corresponds to one beam direction, the sounding reference signal is used to determine a first channel response of the sounding reference signal, and the first channel response is used to determine the first beam direction from a plurality of beam directions; and
   receiving, by the first communication apparatus, third indication information, wherein the third indication information comprises the first beam direction and a circular polarization direction.

3. The communication method according to claim 2, wherein the first OAM reference signal is borne on a first beam, the first beam is a composite beam of a circularly polarized beam and an OAM beam, and a circular polarization direction of the circularly polarized beam is the same as the circular polarization direction included in the third indication information.

4. The communication method according to claim 1, wherein the second OAM reference signal is borne on a second beam, and the second beam is a composite beam of a linearly polarized beam and an OAM beam.

5. The communication method according to claim 1, wherein after receiving, by the first communication apparatus, second indication information, the method further comprises:

transmitting, by the first communication apparatus, data information based on the second indication information.

6. The communication method according to claim 1, wherein the second indication information comprises OAM matrix indicator information and OAM power indicator information.

7. The communication method according to claim 1, wherein the second indication information comprises rank indicator (RI) information and precoding matrix indicator (PMI) information.

8. An apparatus, comprising:

a processor; and a non-transitory computer-readable medium including computer-executable instructions stored thereon that, when executed by the processor, cause the apparatus to:

send a first orbital angular momentum (OAM) reference signal in a first beam direction, wherein the first OAM reference signal is used to determine a second beam direction from the first beam direction;

receive first indication information, wherein the first indication information comprises information about the second beam direction;

send a second OAM reference signal in the second beam direction, wherein the second OAM reference signal is used to determine antenna information and a second channel response of the second OAM reference signal; and receive second indication information, wherein the second indication information is determined based on the second channel response and the antenna information, the second indication information is used to determine a transmission manner, and the transmission manner comprises OAM wave transmission, plane wave transmission, or joint transmission of OAM and a plane wave.

9. The apparatus according to claim 8, wherein before sending the first OAM reference signal in the first beam direction, the apparatus is further caused to:

send a plurality of sounding reference signals (SRSs), wherein one sounding reference signal corresponds to one beam direction, the sounding reference signal is used to determine a first channel response of the sounding reference signal, and the first channel response is used to determine the first beam direction from a plurality of beam directions; and receive third indication information, wherein the third indication information comprises the first beam direction and a circular polarization direction.

10. The apparatus according to claim 9, wherein the first OAM reference signal is borne on a first beam, the first beam is a composite beam of a circularly polarized beam and an OAM beam, and a circular polarization direction of the circularly polarized beam is the same as the circular polarization direction included in the third indication information.

11. The apparatus according to claim 8, wherein the second OAM reference signal is borne on a second beam, and the second beam is a composite beam of a linearly polarized beam and an OAM beam.

12. The apparatus according to claim 8, wherein after receiving the second indication information, the apparatus is further caused to:

transmit data information based on the second indication information.

13. The apparatus according to claim 8, wherein the second indication information comprises OAM matrix indicator information and OAM power indicator information.

14. The apparatus according to claim 8, wherein the second indication information further comprises rank indicator RI information and precoding matrix indicator PMI information.

15. An apparatus, comprising:

a processor; and a non-transitory computer-readable medium including computer-executable instructions stored thereon that, when executed by the processor, cause the apparatus to:

receive a first OAM reference signal in a first beam direction, wherein the first OAM reference signal is used to determine a second beam direction from the first beam direction;

send first indication information, wherein the first indication information comprises information about the second beam direction;

receive a second OAM reference signal in the second beam direction, wherein the second OAM reference signal is used to determine antenna information and a second channel response of the second OAM reference signal; and send second indication information, wherein the second indication information is determined based on the second channel response and the antenna information, the second indication information is used to determine a transmission manner, and the transmission manner comprises OAM wave transmission, plane wave transmission, or joint transmission of OAM and a plane wave.

16. The apparatus according to claim 15, wherein before receiving the first OAM reference signal in the first beam direction, the apparatus is further caused to:

receive a plurality of sounding reference signals, wherein one sounding reference signal corresponds to one beam direction, the sounding reference signal is used to determine a first channel response of the sounding reference signal, and the first channel response is used to determine the first beam direction from a plurality of beam directions; and send third indication information, wherein the third indication information comprises the first beam direction and a circular polarization direction.

17. The apparatus according to claim 16, wherein the first OAM reference signal is borne on a first beam, the first beam is a composite beam of a circularly polarized beam and an OAM beam, and a circular polarization direction of the circularly polarized beam is the same as the circular polarization direction included in the third indication information.

18. The apparatus according to claim 15, wherein the second OAM reference signal is borne on a second beam, and the second beam is a composite beam of a linearly polarized beam and an OAM beam.

19. The apparatus according to claim 15, wherein after sending the second indication information, the apparatus is further caused to:

receive data information based on the antenna information.

20. The apparatus according to claim 15, wherein the second indication information comprises OAM matrix indicator information and OAM power indicator information.

* * * * *